(12) United States Patent
Kakutani

(10) Patent No.: US 7,580,156 B2
(45) Date of Patent: Aug. 25, 2009

(54) IMAGE PROCESSING SYSTEM, IMAGE PROCESSING DEVICE, DOT DATA PROCESSING DEVICE, AND METHOD AND PROGRAM PRODUCT THEREFOR

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 463 days.

(21) Appl. No.: 11/169,224

(22) Filed: Jun. 27, 2005

(65) Prior Publication Data

US 2006/0285165 A1 Dec. 21, 2006

(30) Foreign Application Priority Data

Jun. 28, 2004 (JP) ............................. 2004-189866

(51) Int. Cl.
G06K 15/00 (2006.01)
H04N 1/40 (2006.01)
(52) U.S. Cl. .................... 358/3.13; 358/3.09; 358/3.14; 358/3.21
(58) Field of Classification Search ................. 358/1.1, 358/1.9, 3.01, 3.06, 3.23, 3.13, 3.09, 3.12, 358/3.14, 3.16, 3.21
See application file for complete search history.

(56) References Cited

U.S. PATENT DOCUMENTS

| | | | | |
|---|---|---|---|---|
| 5,258,849 A | * | 11/1993 | Tai et al. ..................... | 358/3.12 |
| 5,287,209 A | * | 2/1994 | Hiratsuka et al. ............ | 358/1.9 |
| 5,642,439 A | * | 6/1997 | Sato et al. ................... | 382/254 |
| 6,208,432 B1 | * | 3/2001 | Kohtani et al. .............. | 358/444 |
| 6,801,337 B2 | * | 10/2004 | Bhaskar et al. .............. | 358/1.9 |

(Continued)

FOREIGN PATENT DOCUMENTS

JP  2002-185785  6/2002

(Continued)

OTHER PUBLICATIONS

Abstract of Japanese Patent Publication No. 2002-185789, Pub. Date: Jun. 28, 2002, Patent Abstracts of Japan.

(Continued)

Primary Examiner—Mark K Zimmerman
Assistant Examiner—Ming Hon
(74) Attorney, Agent, or Firm—Martine Penilla & Gencarella, LLP

(57) ABSTRACT

Pixels are grouped into groups of pixels, comprising a plurality of pixels each, and representative tone values are determined for each of a plurality of regions into which the groups of pixels are split. Decisions are made as to whether or not to output dots to the individual pixels in the group of pixels based on the multilevel halftoning resultant values obtained through performing multilevel halftoning on the representative tone values, to thereby output an image. The multilevel halftoning resultant values can accelerate the creation and transfer of data, enabling rapid outputting of images. Moreover, based on tone values of the individual pixels within a group of pixels, a decision is made as to whether or not to split the group of pixels, where, for groups of pixels for which the decision is to not split the group of pixels, the representative tone value obtained for the group of pixels may be subjected to multilevel halftoning to determine whether or not to form dots, based on the multilevel halftoning resultant values. The present composition enables the high speed outputting of high quality images using simple processes.

26 Claims, 43 Drawing Sheets

U.S. PATENT DOCUMENTS

| | | |
|---|---|---|
| 7,251,060 B2 | 7/2007 | Tonami et al. |
| 7,268,919 B2 | 9/2007 | Katsuyama |
| 2004/0085553 A1 * | 5/2004 | Couwenhoven et al. ...... 358/1.9 |

FOREIGN PATENT DOCUMENTS

| | | |
|---|---|---|
| JP | 2002-185789 | 6/2002 |
| JP | 2003-219168 | 7/2003 |

OTHER PUBLICATIONS

Abstract of Japanese Patent Publication No. 2002-185785, Pub. Date: Jun. 28, 2002, Patent Abstracts of Japan.

Abstract of Japanese Patent Publication No. 2003-219168, Pub. Date: Jul. 31, 2003, Patent Abstracts of Japan.

* cited by examiner

PRIMARY SCAN DIRECTION

SECONDARY SCAN DIRECTION

Fig.8a

| 97 | 97 | 97 | 97 | 97 | 97 | 98 | 98 |
|---|---|---|---|---|---|---|---|
| 97 | 97 | 97 | 97 | 97 | 97 | 98 | 98 |
| 97 | 97 | 97 | 97 | 97 | 97 | 97 | 97 |
| 96 | 97 | 97 | 97 | 97 | 97 | 97 | 97 |

Fig.8b

| 1 | 177 | 58 | 170 | 70 | 186 | 79 | 161 |
|---|---|---|---|---|---|---|---|
| 255 | 109 | 212 | 42 | 242 | 5 | 223 | 48 |
| 123 | 33 | 127 | 181 | 83 | 155 | 105 | 140 |
| 219 | 91 | 237 | 22 | 121 | 198 | 61 | 188 |

| 3 | 4 |
|---|---|
| 3 | 2 |

Fig.9a
| 3 | 4 |
|---|---|
| 3 | 2 |
Fig.9b
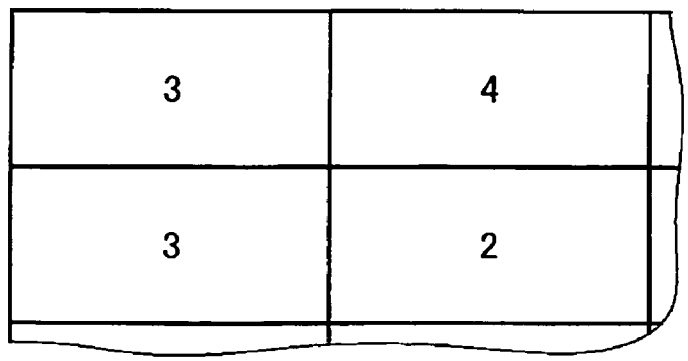
Fig.9c
Fig.9d
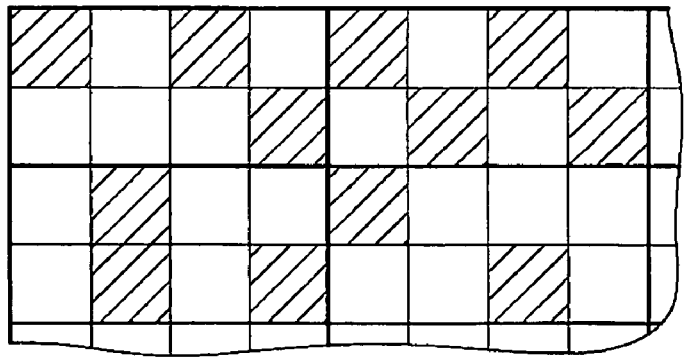

Fig.12a
 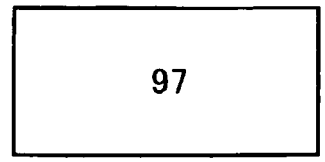
Fig.12b
 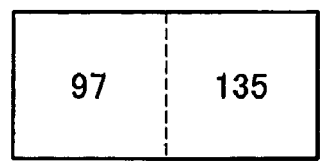
Fig.12c
 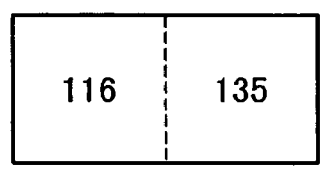
Fig.12d
 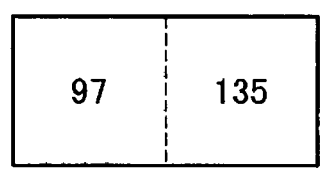
Fig.12e
 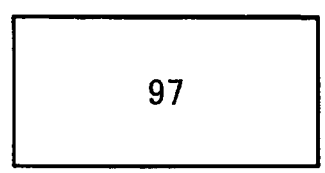
Fig.12f
 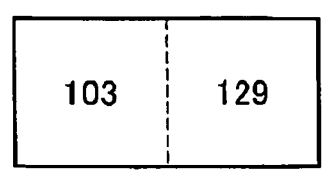

Fig.14a
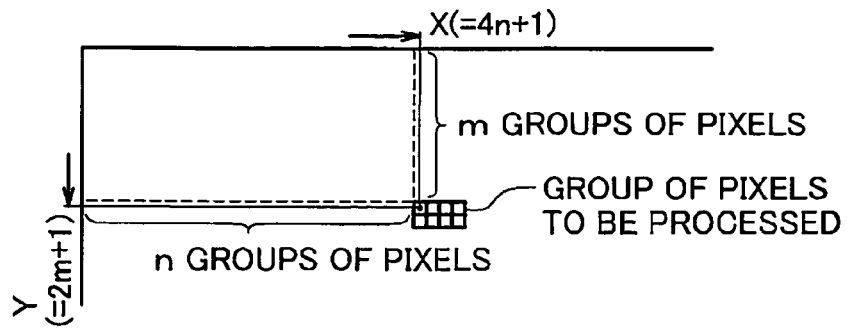
Fig.14b
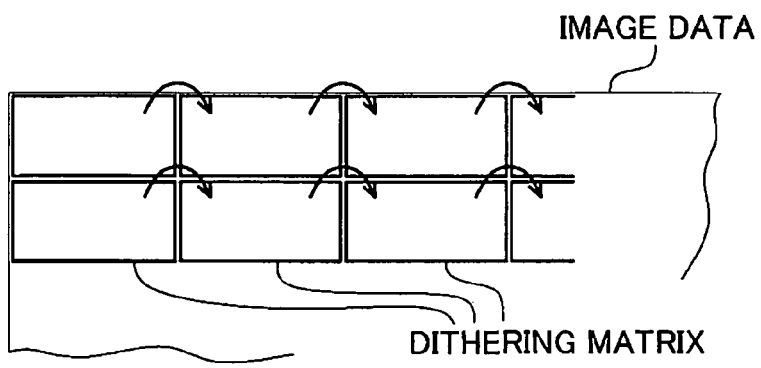
Fig.14c
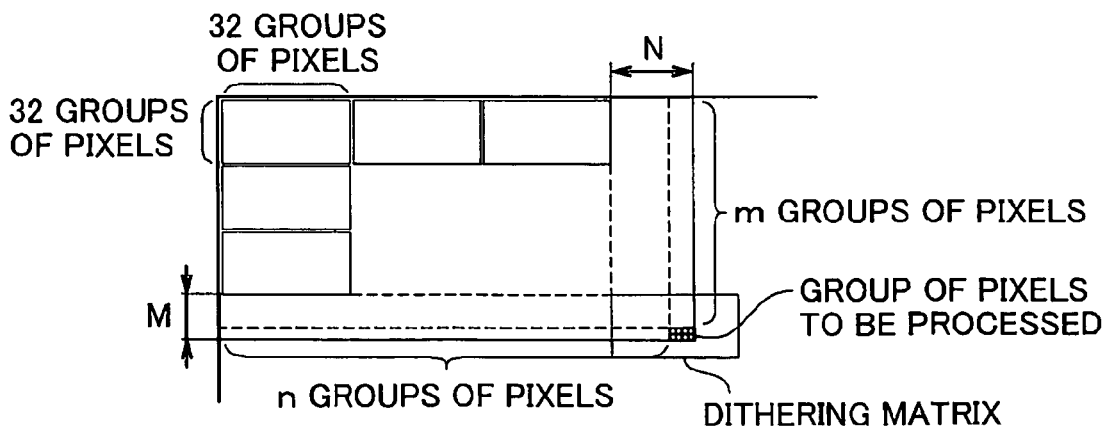
Fig.14d
$$\begin{cases} N = n - \text{int}(n/32) \times 32 + 1 \\ M = m - \text{int}(m/32) \times 32 + 1 \end{cases}$$

Fig.15

(a)  X  :  |1|2|3|4|5|6|7|8|9|10|  ⎞ SHIFT TWO BITS
                                    ⎠ TO THE RIGHT (b)  n  :  |0|0|1|2|3|4|5|6|7|8|    ⎞ SHIFT FIVE BITS
                                    ⎠ TO THE RIGHT (c)  int (n/32)  :  |0|0|0|0|0|0|0|1|2|3|  ⎞ SHIFT FIVE BITS
                                           ⎠ TO THE LEFT (d)  int (n/32)×32:  |0|0|1|2|3|0|0|0|0|0|

(e)  n − int (n/32)×32:  |0|0|0|0|0|4|5|6|7|8|

(f)  MASK DATA  :  |0|0|0|0|0|1|1|1|1|1|

(g)  MASK DATA  :  |0|0|0|1|1|1|1|1|0|0|

Fig.16

| | REPRESENTATIVE TONE VALUE | | | | | | | | | |
|---|---|---|---|---|---|---|---|---|---|---|
| | 0 | 1 | 2 | 3 | 4 | 5 | ... | 253 | 254 | 255 |
| CLASSIFICATION NUMBER 1 | 0 | 1 | 1 | 1 | 1 | 1 | | 7 | 7 | 8 |
| 2 | 0 | 0 | 0 | 0 | 0 | 1 | | 8 | 8 | 8 |
| 3 | 0 | 0 | 0 | 0 | 0 | | | 8 | 8 | 8 |
| 4 | 0 | 0 | 0 | 0 | | | | | 8 | 8 |
| 5 | 0 | 0 | 0 | 0 | | | | | 8 | 8 |
| 6 | 0 | 0 | 0 | | | | | | 8 | 8 |
| 7 | 0 | 0 | | | | | | | | |
| 8 | 0 | | | | | | | | | |
| 9 | 0 | | | | | | | | | |
| 10 | | | | | | | | | | |

↓ UP TO 1024

Fig.23a
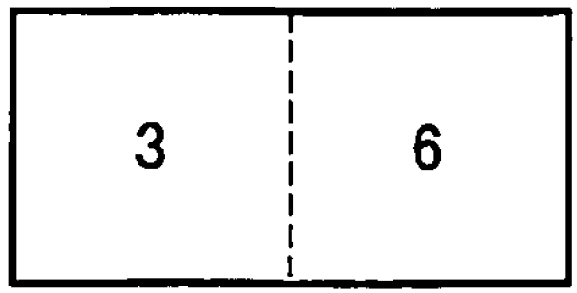
Fig.23b
| 1 | 6 | 3 | 5 |
|---|---|---|---|
| 8 | 4 | 7 | 2 |
Fig.23c
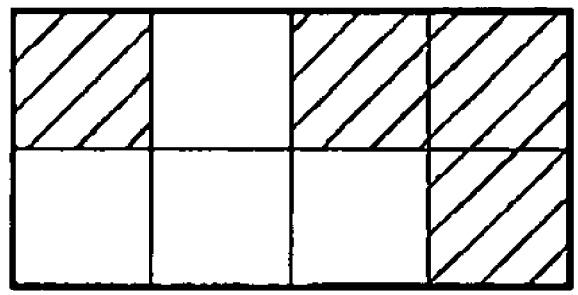

Fig.24

|   | \multicolumn{9}{c|}{MULTILEVEL HALFTONING RESULTANT VALUE} |
|---|---|---|---|---|---|---|---|---|---|
|   | 0 | 1 | 2 | 3 | 4 | 5 | 6 | 7 | 8 |
| 1 | 0 | 1 | 1 | 1 | 1 | 1 | 1 | 1 | 1 |
| 2 | 0 | 0 | 1 | 1 | 1 | 1 | 1 | 1 | 1 |
| 3 | 0 | 0 | 0 | 1 | 1 | 1 | 1 | 1 | 1 |
| 4 | 0 | 0 | 0 | 0 | 1 | 1 | 1 | 1 | 1 |
| 5 | 0 | 0 | 0 | 0 | 0 | 1 | 1 | 1 | 1 |
| 6 | 0 | 0 | 0 | 0 | 0 | 0 | 1 | 1 | 1 |
| 7 | 0 | 0 | 0 | 0 | 0 | 0 | 0 | 1 | 1 |
| 8 | 0 | 0 | 0 | 0 | 0 | 0 | 0 | 0 | 1 |

(SEQUENCE VALUE on vertical axis)

Fig.26

| DATA | CONTENTS | DATA | CONTENTS |
|---|---|---|---|
| 0 | MULTILEVEL HALFTONING RESULTANT VALUES | 8 | MULTILEVEL HALFTONING RESULTANT VALUE |
| 1 | | 9 | SPLITTING PATTERN 7 |
| 2 | | 10 | SPLITTING PATTERN 6 |
| 3 | | 11 | SPLITTING PATTERN 5 |
| 4 | | 12 | SPLITTING PATTERN 4 |
| 5 | | 13 | SPLITTING PATTERN 3 |
| 6 | | 14 | SPLITTING PATTERN 2 |
| 7 | | 15 | SPLITTING PATTERN 1 |

Fig.31

| (LARGE,MEDIUM, SMALL)= (1, 2, 1) | (0,4,0) | (0,3,1) |
|---|---|---|
| (0,3,0) | (0,2,1) | (1,1,0) |
| (0,2,3) | (1,2,1) | (0,3,0) |

Fig.32

| NUMBER OF DOTS | | | MULTILEVEL HALFTONING RESULTANT VALUE |
|---|---|---|---|
| LARGE | MEDIUM | SMALL | |
| 0 | 0 | 0 | 0 |
| 0 | 0 | 1 | 1 |
| 0 | 0 | 2 | 2 |
| 0 | 0 | 3 | 3 |
| 6 | 2 | 0 | 160 |
| 7 | 0 | 0 | 161 |
| 7 | 0 | 1 | 162 |
| 7 | 1 | 0 | 163 |
| 8 | 0 | 0 | 164 |

Fig.34

| CLASSIFICATION NUMBERS | REPRESENTATIVE TONE VALUES | | | | | | | ... | | | |
|---|---|---|---|---|---|---|---|---|---|---|---|
| | | 0 | 1 | 2 | 3 | 4 | 5 | | 253 | 254 | 255 |
| 1 | | 0 | 1 | 1 | 2 | 2 | 2 | | 163 | 163 | 164 |
| 2 | | 0 | 0 | 0 | 0 | 1 | 1 | | 163 | 164 | 164 |
| 3 | | 0 | 0 | 1 | 1 | 1 | | | 163 | 164 | 164 |
| 4 | | 0 | 0 | 1 | 1 | | | | | 163 | 164 |
| 5 | | 0 | 0 | 0 | 1 | | | | | 164 | 164 |
| 6 | | 0 | 1 | 1 | | | | | | 163 | 164 |
| 7 | | 0 | 0 | | | | | | | | |
| 8 | | 0 | | | | | | | | | |
| 9 | | 0 | | | | | | | | | |
| 10 | | | | | | | | | | | |

| 8-BIT DATA | DATA CONTENTS |
|---|---|
| 0 | |
| 1 | |
| 2 | |
| 3 | MULTILEVEL HALFTONING RESULTANT VALUES |
| 4 | |
| ⋮ | |
| 126 | |
| 127 | |

| 8-BIT DATA | DATA CONTENTS |
|---|---|
| 128 | MULTILEVEL HALFTONING RESULTANT VALUES |
| ⋮ | |
| 164 | |
| 165 | OPEN |
| ⋮ | |
| 254 | |
| 255 | ESC CODE |

Fig.38

| MULTILEVEL HALFTONING RESULTANT VALUE | INTERMEDIATE DATA | CORRESPONDING NUMBER OF DOTS | | |
|---|---|---|---|---|
| | | LARGE | MEDIUM | SMALL |
| 0 | 00000000 | 0 | 0 | 0 |
| 1 | 00000001 | 0 | 0 | 1 |
| 2 | 00000011 | 0 | 0 | 2 |
| 3 | 00000111 | 0 | 0 | 3 |
| 160 | 22333333 | 6 | 2 | 0 |
| 161 | 03333333 | 7 | 0 | 0 |
| 162 | 13333333 | 7 | 0 | 1 |
| 163 | 23333333 | 7 | 1 | 0 |
| 164 | 33333333 | 8 | 0 | 0 |

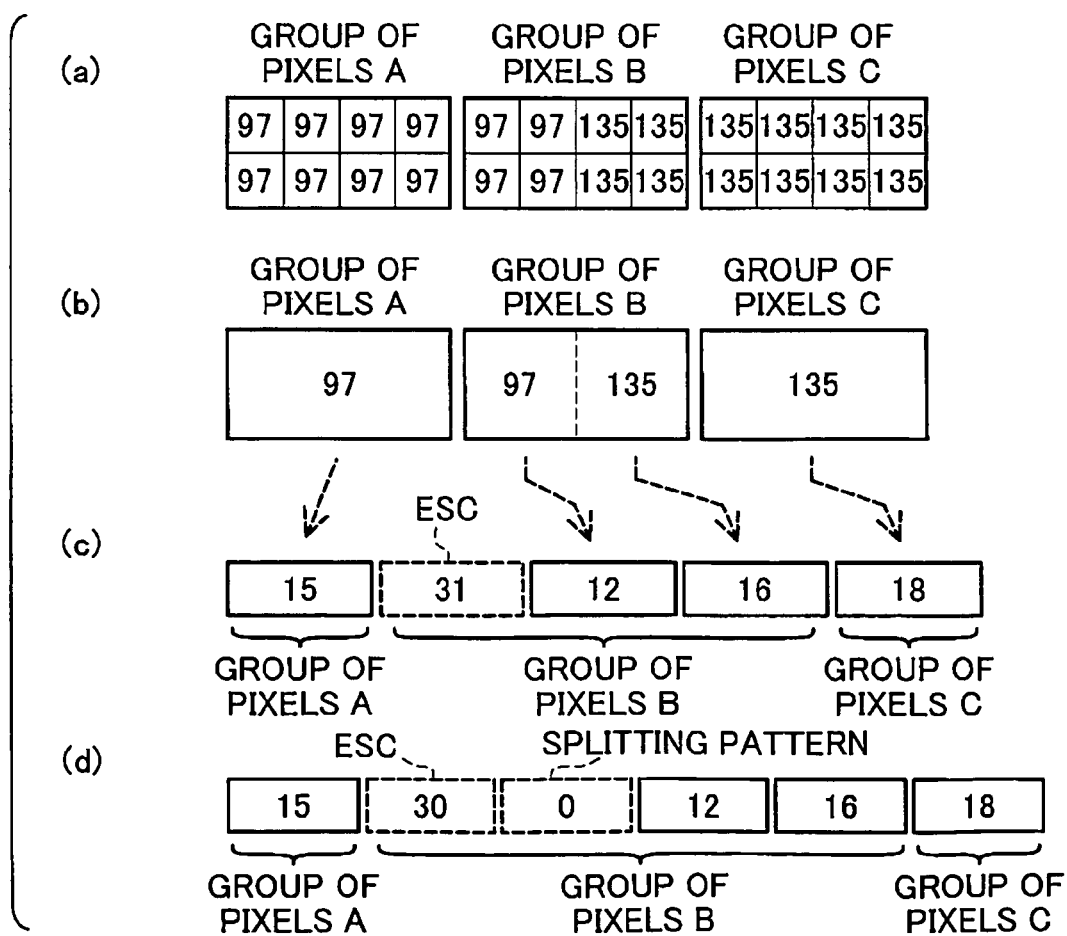

Fig.46a
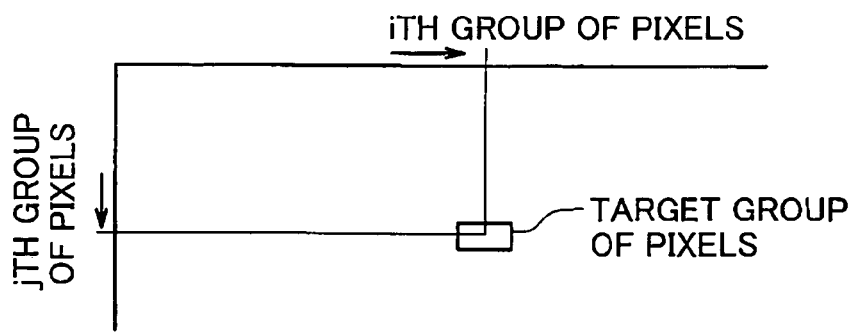
Fig.46b
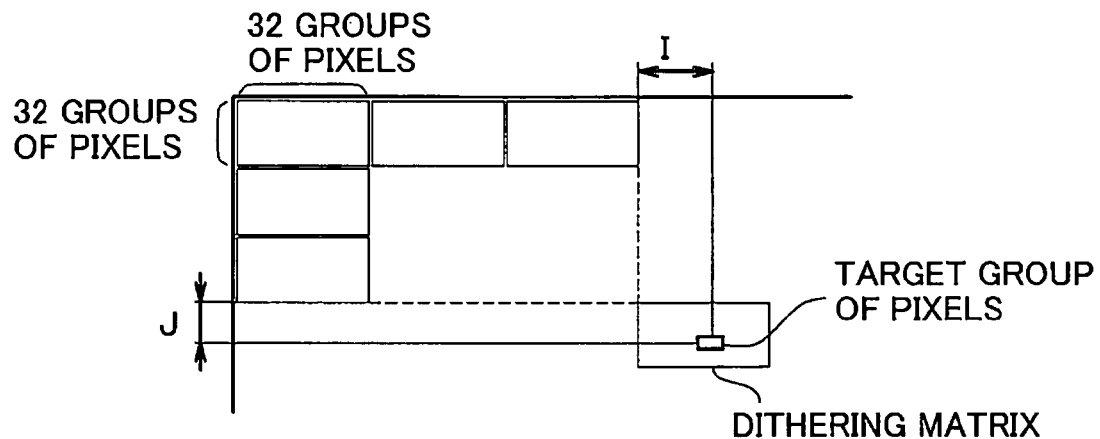
Fig.46c
$$\begin{cases} I = i - \text{int}(i/32) \times 32 \\ J = j - \text{int}(j/32) \times 32 \end{cases}$$

Fig.47

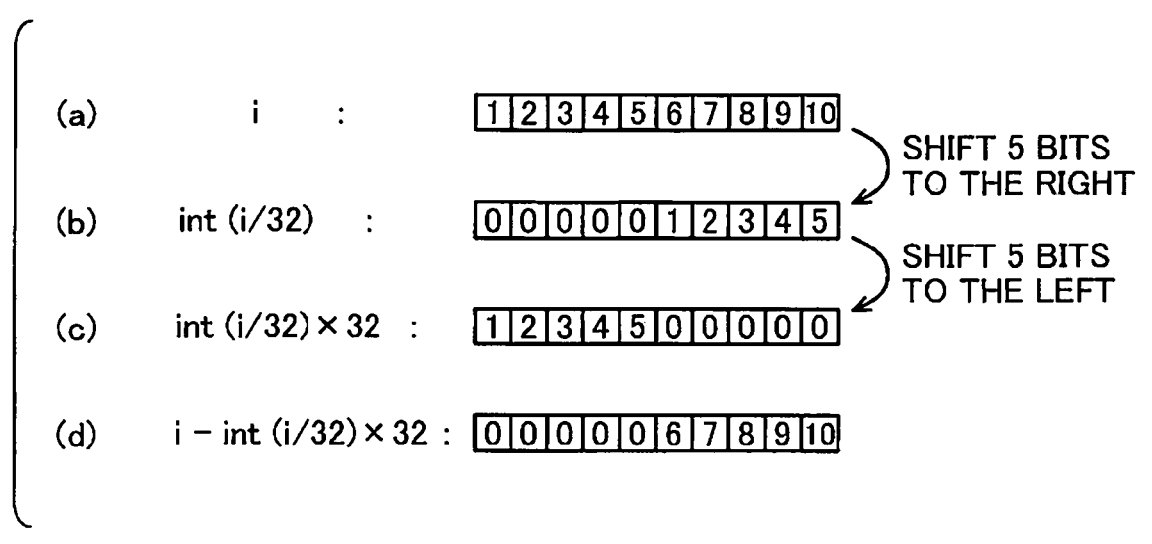

$\Biggl\{$
(a)  i  :  |1|2|3|4|5|6|7|8|9|10|  ⎞ SHIFT 5 BITS
                                    ⎠ TO THE RIGHT (b)  int (i/32)  :  |0|0|0|0|0|1|2|3|4|5|  ⎞ SHIFT 5 BITS
                                            ⎠ TO THE LEFT (c)  int (i/32) × 32  :  |1|2|3|4|5|0|0|0|0|0|

(d)  i − int (i/32) × 32  :  |0|0|0|0|0|6|7|8|9|10|

Fig.48

|  | | MULTILEVEL HALFTONING RESULTANT VALUES | | | | | | |
|---|---|---|---|---|---|---|---|---|
|  | | 0 | 1 | 2 | 3 | 4 | 5 | 6 |
| CLASSIFICATION NUMBERS | 1 | DD(1,0) | DD(1,1) | DD(1,2) | DD(1,3) | DD(1,4) | DD(1,5) | DD(1,6) |
| | 2 | DD(2,0) | DD(2,1) | DD(2,2) | DD(2,3) | DD(2,4) | DD(2,5) | D |
| | 3 | DD(3,0) | DD(3,1) | DD(3,2) | DD(3,3) | DD(3,4) | DD(3,5) | |
| | 4 | DD(4,0) | DD(4,1) | DD(4,2) | DD(4,3) | DD(4,4) | DD(4,5) | |
| | 5 | DD(5,0) | DD(5,1) | DD(5,2) | DD(5,3) | DD(5,4) | | |
| | 6 | DD(6,0) | DD(6,1) | DD(6,2) | DD(6 | | | |
| | 7 | DD(7 | | | | | | |

UP TO 1024

IMAGE PROCESSING SYSTEM, IMAGE PROCESSING DEVICE, DOT DATA PROCESSING DEVICE, AND METHOD AND PROGRAM PRODUCT THEREFOR

CLAIM OF PRIORITY

The present application claims priority from Japanese Application P2004-489866, filed on Jun. 28, 2004, the content of which is hereby incorporated by reference into this application.

BACKGROUND

1. Field of the Invention

The present invention relates to technologies that output images based on image data, and, in particular, relates to inventions that output images by generating an appropriate density of dots through performing specific image processing on image data.

2. Description of the Related Art

Image output devices for outputting images by forming dots on various types of output media such as printed media or liquid crystal displays, are widely known as output devices for various types of imaging devices. In these image output devices, the images are handled in a form where they are finely divided into minute regions known as pixels, and dots are formed in these pixels. When dots are formed in pixels, examining the individual pixels, of course, will reveal only the state of whether or not dots are formed. However, viewing an adequately broad region can cause the dots that have been formed to appear as a rough tone density, making it possible to output a multitone image through changing the density of the dots that are formed. For example, when forming dots from black ink on printing paper, regions wherein the dots are formed densely will appear to be dark, and, conversely regions wherein the dots are sparse will appear to be light. Consequently, controlling appropriately the density with which the dots are formed enables the outputting of multitone images. The data for controlling the formation of dots so as to be able to obtain the appropriate dot creation density in this way is produced through executing specific image processing on the images to be outputted.

Recent years have seen a demand for larger and higher quality outputted images in these image outputting devices. Splitting the images into finer pixels is effective in responding to the demands for high quality images. Making the pixels smaller enables an increase in the image quality because the dots that make up the images become indiscernible, and thus produce higher image quality. Conversely, the demands for larger images are handled by increasing the number of pixels. While, of course, the output images can be made larger by enlarging the individual pixels, doing so would lead to a reduction in the image quality, so increasing the number of pixels is an effective response to the demand for larger images.

Naturally, when the number of pixels comprising the image is increased, more time is required for image processing, making it difficult to output the images quickly. Given this, a technology able to perform imaging processing quickly has been proposed. (Japanese Unexamined Patent Application Publication 2002-185789)

However, even if the image processing is performed quickly, time is required for transferring the original image data, and for transferring again the image data after processing has been completed, and thus there are also limits on the effect of the aforementioned technology on speeding up the outputting of the images.

Moreover, in recent years there have been demands by those who wish to directly output images by supplying image data taken from, for example, digital cameras, directly to image output devices such as printing devices. In such cases, performing image processing using image processing devices equipped with high levels of processing capabilities, such as in so-called personal computers, is not possible. Consequently, image processing must be simple, such as can be performed on the image capture device, such as a digital camera, or on the image output device, or jointly between the two.

The present invention was created in order to solve the problem described above in the conventional technology, and the object thereof is to provide a simple image processing technology wherein image processing and data transfer can be performed at high speeds, while maintaining an adequate output image quality.

SUMMARY

In order to solve, at least partially, the problem regions described above, the image output system according to the present invention uses a structure such as described below. The point is an image processing system for performing specific image processing on image data and for outputting dot data for forming dots on a recording medium based on the results of said image processing, comprising:

correspondence relationship preparation unit that prepares in advance, for each group of pixels, each comprising a plurality of pixels, a correspondence relationship between a representative tone value, which is a tone value that represents said group of pixels, and a multilevel halftoning resultant value that represents the results of performing multilevel halftoning on each individual pixel that structures said group of pixels;

representative tone value determining unit that splits said groups of pixels, sequentially extracted from said image, into a plurality of regions and, for each region, determining a representative tone value for representing the tone value of said region;

multilevel halftoning unit that uses said determined representative tone values for each region to obtain a multilevel halftoning resultant value, for each of said regions, through referencing said correspondence relationships assigned to said groups of pixels belonging to said regions;

sequence value specifying unit that specifies sequence values that indicate the sequence in which will be formed the dots in each pixel in said pixel groups according to the correspondence relationships referenced when obtaining said multilevel halftoning resultant values;

dot data generating unit that generates dot data indicating whether or not to form a dot for each pixel within each of said regions based on said specified sequence value for said group of pixels to which region belongs and on said multilevel halftoning resultant values obtained for each of said regions; and output unit that outputs said dot data.

Moreover, the image processing method according to the present invention, corresponding to the image process system described above, is an image processing method for performing specific image processes on image data to output dot data for forming dots on a recording medium based on the results of said image processing, wherein:

correspondence relationships between representative tone values, which are tone values for representing groups of pixels, comprising a plurality of pixels, and multilevel halftoning resultant values for expressing the results of multilevel halftoning for each pixel that comprises said group of pixels are prepared in advance for each group of pixels;

said groups of pixels, extracted sequentially from said image, are split into a plurality of regions, and a representative tone value for representing a tone value for said region is determined for each of said regions;

said representative tone value established for each of said regions is used to obtain a multilevel halftoning resultant value for each of said regions through referencing said correspondence relationship assigned to said group of pixels to which said region belongs;

sequence values for indicating the sequence in which dots are formed in each pixel within said group of pixels are specified according to the correspondence relationships referenced when extracting said multilevel halftoning resultant values;

dot data for indicating whether or not to form dots for each of the pixels within each of said regions is generated based on said specified sequence values for said groups of pixels belonging to said regions and said multilevel halftoning resultant values obtained for each of said regions; and said dot data is outputted.

Representative tone values, for representing the tone values in each region, are established for a plurality of regions into which the groups of pixels are split in the image processing system and image processing method according to the present invention. Here the groups of pixels may always be groups of pixels with the same number of pixels, but might instead be sets of different numbers of pixels, according to a specific pattern or a specific decision rule, for example. Next, by referencing the correspondence relationships for multilevel halftoning, the representative tone values determined for each region are converted into multilevel halftoning resultant values. Associations between the representative tone values and the multilevel halftoning resultant values obtained through multilevel halftoning of the representative tone values are established for each group of pixels in the correspondence relationships for multilevel halftoning, enabling the rapid conversion of the representative tone values into multilevel halftoning resultant values through referencing the correspondence relationships for multilevel halftoning.

Note that the correspondence relationships for multilevel halftoning, enabling a single multilevel halftoning value to be determined as long as the representative tone value and the group of pixels has been determined, may be in any of a variety of forms, for example, the correspondence relationships for multilevel halftoning may assume the form of a correspondence table or a mathematical functions. Conversely, as will be described below these correspondence relationships for multilevel halftoning may assume the form of threshold values stored in memory for comparison with representative tone values for determining the multilevel halftoning resultant values. Furthermore, because the associations between the representative tone values and the multilevel halftoning resultant values are established for each group of pixels in the correspondence relationship for multilevel halftoning, the multilevel halftoning resultant values may be resultant values that can only be interpreted in combination with the group of pixels that has produced the specific resultant value, or the resultant values may be such that these resultant values may be interpreted by the multilevel halftoning resultant values alone, without dependency on the group of pixels.

The determination of whether or not to form a dot for each pixel within a region is made based on the multilevel halftoning resultant value obtained for each region in this way. The determination of whether or not to form a dot is made as follows. First, for each pixel within a group of pixels, a sequence value of indicating the sequence in which dots are formed within the group of pixels is determined, where this determination is performed for each group of pixels. Although a variety of different methods may be applied as the method for determining the sequence values in each group of pixels, one method is to store a sequence value for each pixel in advance for each group of pixels and then readout the sequence values that have been stored. If sequence values are specified for each pixel within the group of pixels, then whether or not to form dots for the individual pixels can be determined for each region based on the multilevel halftoning resultant values that have been obtained for each of the regions within the groups of pixels, and on the sequence values that have been specified.

Although the detailed principles will be described below, the reason why it is possible to determine, for each region, whether or not to form a dot, based on the sequence value and on the multilevel halftoning resultant values for each region, is as follows. First, knowing the sequence values for each pixel within the group of pixels, and the multilevel halftoning resultant values for each group of pixels enables the determination, for each individual pixel within the group of pixels, as to whether or not to form a dot. This is due to the general reasoning below.

As will be described below, the multilevel halftoning resultant values include those multilevel halftoning resultant values that are dependent on the group of pixels for their meaning, and those that are not, and in either case the multilevel halftoning resultant values are determined based on the representative tone values of the group of pixels. On the other hand, as will be explained in detail below, the number of dots to be formed within the group of pixels is also determined according to the representative tone value for the group of pixels, and thus an indirect correspondence relationship is established, via the representative tone values, between the number of dots to be formed in the group of pixels and the multilevel halftoning resultant values. Given this, the relationship between the multilevel halftoning resultant values and the numbers of dots to be formed within the group of pixels can be established in advance, enabling the determination of the number of dots to be formed in a group of pixels based on the multilevel halftoning value. Moreover, being able to specify the order (sequence values) for forming dots within a plurality of pixels within the group of pixels enables the determination of the specific pixels, within the group of pixels, wherein these dots are to be formed. For reasons such as this, knowing the sequence values for each of the pixels within the group of pixels, and knowing the multilevel halftoning resultant value for the group of pixels makes it possible to determine, for each pixel within the group of pixels, whether or not to form a dot.

Next let us consider the case wherein the group of pixels is split into a plurality of regions and a multilevel halftoning resultant value is obtained for one of those regions. The multilevel halftoning resultant value that was obtained being a value relating to the group of pixels enables the determination, for each pixel within the group of pixels, whether or not to form a dot, for the reason described above. Given this, once decisions as to whether or not to form a dot have been made for every one of the individual pixels within the group of pixels, then extracting the determination results for each of the pixels within a region in question should make it possible to know, for each individual pixel within the region, whether or not to form a dot, based on the multilevel halftoning resultant values in that region and on the sequence values for the group of pixels. In practice, the process for determining whether or not to form dots, for each region, from the sequence values and the multilevel halftoning resultant values for each region, is not limited to the process described above. However, given the reason described above, receiving the multilevel halftoning resultant values for each region enables, for each pixel within the region, the determination of whether or not to form a dot.

Insofar as dot data is generated indicating whether or not to form a dot for the each of the individual pixels obtained in this way, this data can be outputted without further modification, so the image can also be outputted by actually forming dots on the print medium. For example, dots can be formed on a medium such as a print medium or a liquid crystal screen to output images on these media.

As will be described in detail below, in comparison to data that indicates whether or not to form a dot, for each of the individual pixels in the image, the multilevel halftoning resultant values can express the image in an extremely reduced quantity of data. This enables the data to be handled quickly, making it possible to output the image quickly. Moreover, when performing multilevel halftoning on the representative tone values, the multilevel halftoning can be performed quickly through performing multilevel halftoning while referencing the correspondence relationships for multilevel halftoning.

Additionally, a correspondence between the representative tone value and the multilevel halftoning resultant value is assigned for each group of pixels in the correspondence relationships for multilevel halftoning that are referenced when performing multilevel halftoning of the representative tone values. This is to say, if the groups of pixels are different, then even if the representative tone values are different, multilevel halftoning to the same multilevel halftoning values is possible. Consequently, when compared to the case wherein there is a simple assignment of relationships between representative tone values and multilevel halftoning resultant values, this makes it possible to also reduce the number of multilevel halftoning resultant values obtained. The smaller the number of multilevel halftoning resultant values obtained, the smaller the quantity of the data that is required for expressing the multilevel halftoning resultant values, thus enabling the transfer of data to be that much faster, and, by extension, enabling the image to be outputted more quickly.

Moreover, the decisions as to whether or not to form a dot for each individual pixel are made for each region, based on the multilevel halftoning resultant values generated for each region. In other words, the correspondence relationships for multilevel halftoning, the sequence values, and so forth, referenced when performing the processing, can use that which is set for each group of pixels, regardless of whether or not the sequence of processes is performed for each region into which the group of pixels is split. This unit that the same correspondence relationships for multilevel halftoning and the same sequence values can be used even when the sizes of the regions that serve as the processing units are different. Because of this, the image processing system and image outputting method described above can be used to structure a system and a method with broad applicability, greatly independent of the size of the regions used as the processing units.

In addition, the image processing system and first image outputting system described above not only have high levels of general applicability, they also have the benefit of being able to reduce the amount of data in the correspondence relationships for multilevel halftoning. In other words, the sizes of the groups of pixels may be larger than the sizes of the regions that are the processing groups. Moreover, as will be discussed in detail below, the larger the groups of pixels, the fewer the types of groups of pixels required.

At this point, the fewer the types of groups of pixels, the less the quantity of data for the correspondence relationships for the multilevel halftoning, because the correspondence relationships for multilevel halftoning establish the associations between the representative tone values and the multilevel halftoning resultant values for each group of pixels. Consequently, the image processing system and image outputting method described above can produce the benefit of being able to store the correspondence relationships for multilevel halftoning using relatively little storage space.

Specifying, for each group of pixels, the sequence values, which indicate the order in which the dots will be formed, for each pixel within the group of pixels, enables appropriate determinations, for each pixel, as to whether or not to form a dot, based on the sequence values for each of the groups of pixels and on the multilevel halftoning resultant values obtained for each group of pixels. This enables high quality images to be outputted rapidly. In addition, because groups of pixels are split into a plurality of regions for processing, appropriate determinations can be made as to whether or not to form dots based on the valuation resultant values obtained for each region, even when there are large differences in tone values within a group of pixels, thus enabling the output of higher quality images.

Moreover, the process for generating the multilevel halftoning resultant values can be a simple process of referencing correspondence relationships established in advance. This enables entirely practical processing speeds, even in devices lacking sophisticated processing functions such as those in computers. Consequently, image data, for example, can be provided directly to image outputting devices, without passing through a computer, or the like, enabling the outputting of appropriate images through performing these image processes on the image data within the image outputting device.

In this type of image processing system and the first image outputting method, the decisions as to whether or not to split the group of pixels may be made based on the tone values for each of the pixels within the group of pixels, and, for those groups of pixels that are not split, the multilevel halftoning may be performed on the representative tone value that represents the group of pixels. Moreover, for the groups of pixels that have received only a single multilevel halftoning resultant value, a decision may be made, for each of the pixels within the group of pixels, as to whether or not to form a dot to output the image.

Because, given the above, only a single multilevel halftoning resultant value need be outputted for a group of pixels that is not split, the transfer of the multilevel halftoning resultant values can be faster than the case wherein multilevel halftoning resultant values are outputted for each region within the group of pixels. Thus the image can be outputted quickly.

Moreover, a plurality of correspondence relationships may be prepared through defining a set of threshold values, which compiles a plurality of threshold values corresponding to the number of pixels included in the group of pixels, and structuring this set of threshold values from a plurality of threshold values selected from a dithering matrix wherein threshold values with differing values are laid out according to specific characteristics, while changing sequentially the positions from which the threshold values are obtained. Doing so enables the decisions regarding the groups of pixels to take into account the characteristics of the dithering matrix.

The number of threshold values included in this type of dithering matrix may be larger than the number of tones in said image to make a global dithering matrix. The use of a global dithering matrix reduces the likelihood of a repeating pattern occurring in the formation of the dots after multilevel halftoning. This also facilitates the achievement of blue noise and green noise mask characteristics, and the like.

The classification numbers that specifies each correspondence relationship of the plurality of correspondence relationships can be assigned according to the position at which the threshold value is obtained from a dithering matrix of this type. In such a case, the classification number of the correspondence relationship used in the generation of the multilevel halftoning resultant values for the group of pixels can be determined according to the position of the group of pixels within the image, thus enabling the specification of the sequence values according to the correspondence relationships established by the classification numbers. In other words, the groups of pixels can be specified when determining the positions of the pixels for which to form dots, and the correspondence relationships can be specified when performing the multilevel halftoning, using the positions of the groups of pixels within the image. The result is that the amount of data that is transferred is reduced through the use of the information regarding the positions of the groups of pixels within the image.

The decision, for each pixel, as to whether or not to form a dot, based on the multilevel halftoning resultant value, is made on the image outputting device side, enabling the rapid outputting of images through providing also the multilevel halftoning resultant values as control data to this type of image outputting device. Focusing on this point, the present invention can be seen to be an image processing device such as follows. The image processing device according to the present invention is an image processing device for generating, and outputting to an image outputting device, control data that is used for said image outputting device, for forming dots to output images, to determine the form of said dots; comprising:

correspondence relationship preparation unit that prepares in advance, for each group of pixels, each comprising a plurality of pixels, a correspondence relationship between a representative tone value, which is a tone value that represents said group of pixels, and a multilevel halftoning resultant value that represents the results of performing multilevel halftoning on each individual pixel that structures said group of pixels;

representative tone value determining unit that splits said groups of pixels, sequentially extracted from said image, into a plurality of regions and, for each region, determining a representative tone value for representing the tone value of said region;

multilevel halftoning unit that uses said determined representative tone values for each region to obtain a multilevel halftoning resultant value, for each of said regions, through referencing said correspondence relationships assigned to said groups of pixels belonging to said regions;

and control data output unit that outputs said obtained multilevel halftoning resultant values, as said control data, to said image outputting device.

Moreover, the image processing method according to the present invention, corresponding to the image processing device described above is an image processing method for generating control data, to be used, by an image outputting device for outputting images by forming dots, when determining the formation of said dots, and outputting said control data to said image outputting device, wherein:

correspondence relationships between representative tone values, which are tone values for representing groups of pixels, comprising a plurality of pixels, and multilevel halftoning resultant values for expressing the results of multilevel halftoning for each pixel that comprises said group of pixels are prepared in advance for each group of pixels;

said groups of pixels, extracted sequentially from said image, are split into a plurality of regions, and a representative tone value for representing a tone value for said region is determined for each of said regions;

said representative tone value established for each of said regions is used to obtain a multilevel halftoning resultant value for each of said regions through referencing said correspondence relationship assigned to said group of pixels to which said region belongs; and said obtained multilevel halftoning resultant values are outputted to said image outputting device as said control data.

In this image processing device and image processing method, representative tone values are determined for each of a plurality of regions into which the groups of pixels are split. Consequently, by referencing the correspondence relationships for the multilevel halftoning, each of the representative tone values is subjected to multilevel halftoning, and the multilevel halftoning resultant values obtained are outputted as control data.

Because the amount of data is small in the multilevel halftoning resultant values, outputting the multilevel halftoning resultant values as the control data enables the outputting to be rapid. Performing the multilevel halftoning on the representative tone values by referencing the correspondence relationships for multilevel halftoning enables the multilevel halftoning resultant values to be found rapidly, enabling the outputting of the control data to be that much faster. Furthermore, because multilevel halftoning is performed on representative tone values obtained for each of the plurality of regions into which the groups of pixels are split, appropriate multilevel halftoning resultant values can be obtained even when there are large deviations in the tone values within a group of pixels, thus enabling the outputting of appropriate control data.

In another form of an image processing device of this type, the decisions as to whether or not to split the group of pixels may be made based on specific conditions. The tone values of each of the pixels within the group of pixels, for example, may be considered for use as a condition for the decision. For those groups of pixels that are not split, a representative tone value may be determined for the entirety of the group of pixels, multilevel halftoning may be performed thereon, and the multilevel halftoning resultant value thus obtained may be outputted as the control data.

Because only a single multilevel halftoning resultant value need be outputted for the non-split group of pixels when this is done, the outputting of the control data may be performed more quickly than in the case wherein multilevel halftoning resultant values are outputted for each of the regions within the group of pixels.

In this type of image processing device, the groups of pixels within an image may be categorized into a plurality of types according to their positions within the image, where a classification number may be assigned to each individual group of pixels according to the categorization results. Moreover, the multilevel halftoning of the representative tone values may be performed through referencing the correspondence relationships for multilevel halftoning wherein associations have been made between multilevel halftoning resultant values for combinations of classification numbers and representative tone values.

Assigning classification numbers to groups of pixels enables simple and reliable identification of groups of pixels. Furthermore, because the multilevel halftoning resultant values are determined based on representative tone values and classification numbers, the multilevel halftoning resultant values can be distributed appropriately by the appropriate assignment of classification numbers according to the positions of the groups of pixels within the image, thereby enabling the outputting of appropriate control data.

Furthermore, when performing multilevel halftoning on the representative tone values, multilevel halftoning may be performed to produce values that indicate the number of dots to be formed within the group of pixels. Here the values that indicate the number of dots are not limited to the actual number of dots itself, but rather can be at any value that can be converted into the number of dots through an appropriate method.

Doing this is desirable as it enables the outputting, as control data, data that indicates the number of dots to be formed within the group of pixels, thereby enabling the simplification of the processing that determines whether or not to form a dot in each of the individual pixels.

Additionally, in this type of image processing device, the state of splitting of groups of pixels may be set in advance so as to determine the representative tone value for each of the plurality of regions into which the groups of pixels are split.

Doing so enables the simplification of the processing by which to determine the representative tone value for each of the plurality of regions into which the groups of pixels are split, and is thus preferred.

Moreover, when splitting the groups of pixels, the splitting may be into a plurality of regions wherein each has a mutually identical size. In particular, the group of pixels may be split into two equal parts. Here the "regions having a mutually equal size" refers to including an identical number of pixels within each region.

The sizes of each of the regions being identical enables the process for determining the representative tone value to determine the multilevel halftoning resultant value to be performed in essentially an identical manner for each of the regions, enabling the image processing overall to be simplified. Splitting the group of pixels into two equal regions enables splitting into identical states, even given somewhat different distributions of tone values within the group of pixels. The case wherein the group of pixels is divided into two equal parts, a left region and a right region, will be described as an example. Even in the case wherein a pixel with a different tone value is in only the left-hand region within the group of pixels, or, conversely, only within the right-hand region within the group of pixels, the state of splitting wherein the group of pixels is split into two equal regions, on the left and on the right, can be applied to any of the cases. When the split state is one in which the group of pixels is split into equal parts in this manner, a split state can be applied to more tone value distributions, thus making the image process even simpler.

On the other hand, when splitting the groups of pixels, the splitting can be performed as appropriate according to the tone value distribution within the group of pixels when the group of pixels is split into a plurality of regions with mutually differing sizes, enabling more appropriate multilevel halftoning resultant values to be obtained. Moreover, even in this type of case, the groups of pixels may be split into two regions. Although this will be described in detail below, the tone values for each of the pixels within a group of pixels tend to have values that are near to each other, and so it is not often necessary to split a single group of pixels into more than two regions. Consequently, in most cases the image quality can be improved adequately through splitting the group of pixels into only two regions.

Moreover, in this type of image processing device, the multilevel halftoning resultant values may be outputted as described below when splitting the groups of pixels. First a plurality of splitting patterns, which indicate the status of the splitting of the group of pixels, is stored in advance. Following this, when splitting the groups of pixels, splitting is performed according to one pattern selected from the plurality of splitting patterns that has been stored in advance, to thereby perform multilevel halftoning on the representative tone value determined for each individual region. Data indicating the splitting pattern that was selected may be outputted along with the multilevel halftoning resultant values obtained.

Doing so enables the selection of the appropriate patterns from a plurality of splitting patterns, thus enabling the outputting of the appropriate multilevel halftoning resultant values. Moreover, the region, within the group of pixels, to which a resultant value that has been obtained applies can be known for each of the multilevel halftoning resultant values when determining, for each pixel, whether or not to form dots, based on the multilevel halftoning resultant values, thus enabling the appropriate determination, for each pixel, as to whether or not to form a dot.

In this type of image processing device, the multilevel halftoning may be performed for the representative tone values through referencing correspondence relationships for multilevel halftoning wherein associations between representative tone values and multilevel halftoning resultant values have been assigned, doing so for each of at least 100 types of groups of pixels.

When multilevel halftoning is performed for each group of pixels, the multilevel halftoning resultant values thus obtained may iterate the same pattern over a plurality of groups of pixels. Of course associations are assigned, for each group of pixels, between the representative tone values and the multilevel halftoning resultant values in the correspondence relationships for multilevel halftoning, referenced when performing multilevel halftoning of the representative tone values in the present application, and thus it can be said that, when compared to the case wherein relationships are assigned nearly between the representative tone values and the multilevel halftoning resultant values, it is less likely for a single pattern to appear. However, adequately preventing the appearance of such repeating patterns is difficult when there are not enough types of groups of pixels. To avoid the appearance of patterns, preferably the associations between the representative tone values and the multilevel halftoning resultant values is performed for as many different types of groups of pixels as possible; however, experimentally it has been possible to control the appearance of a single pattern, to the degree that problems do not appear in practice, by creating the associations for at least 100 different types of groups of pixels.

Conversely, in this type of image processing device, the arithmetic produce to multiplying the number of types of groups of pixels for which correspondence relationships for multilevel halftoning has been established by the number of pixels combined in a group of pixels may be set so as to be, at least, 1,000.

When determining, for each pixel within a group of pixels, whether or not to form dots, a sequence value that indicates the order in which the dots will be formed, for each pixel within each group of pixels, may be considered in addition to the multilevel halftoning resultant values, and thus even if the multilevel halftoning resultant values are the same, if the sequence values are different, a different pattern of dots will be produced within the group of pixels. In consideration of the fact that the larger the number of pixels that are grouped together in a group of pixels, the larger the number of types of sequence values that can be obtained, the occurrence of the same pattern across a plurality of groups of pixels can be prevented if the number of pixels that are grouped together in a group of pixels is large, even if the types of groups of pixels for which corresponding relationships have been established for multilevel halftoning is small. Experimentally, setting to a value that is at least 1,000 the arithmetic product of multiplying the number of pixels grouped together in a group of pixels with the number of types of groups of pixels for which correspondence relations for multilevel halftoning have been established enables the control of the occurrence of identical dot patterns to the degree that such occurrences are not a problem in practice.

The image processing device and image processing method described above, if taken to be specifying the devices and processes until the point at which the multilevel halftoning resultant values are outputted as control data, then it can be seen that the processing after the multilevel halftoning resultant values have been received is also an invention. In other words, the dot data processing device according to the present invention is a dot data processing device for converting image data, which expresses an image that is expressed in a specific number of tones, into data for dots to be formed on a medium through the use of groups of pixels, comprising a plurality of pixels, through receiving multilevel halftoning resultant values that are the results of performing multilevel halftoning; wherein said multilevel halftoning resultant values are generated through referencing, based on representative tone values of various regions wherein said groups of pixels are split into a plurality of regions, a single correspondence relationship selected from a plurality of correspondence relationships that have been prepared in advance regarding the multilevel halftoning resultant values that express the results of multilevel halftoning for each pixel that comprises said groups of pixels and the representative tone values that are tone values that represent said groups of pixels;

said dot data processing device comprising:

resultant value receiving unit that receives said multilevel halftoning resultant values for each of the plurality of regions into which said groups of pixels are divided for each of said groups of pixels;

sequence value specifying unit that specifies sequence values, which are sequences of pixels for forming dots within said groups of pixels, according to correspondence relationships referenced when generating said multilevel halftoning resultant values for said groups of pixels; and dot data generating unit that generates dot data that indicates whether or not a dot will be formed for each pixel within each of said regions based on said specified sequence value for said group of pixels to which said region belongs and on said multilevel halftoning resultant values obtained for each of said regions.

The dot data processing method according to the present invention, corresponding to the dot data processing device described above, is a dot data processing method for receiving multilevel halftoning resultant values, which are results of multilevel halftoning using groups of pixels, comprising a plurality of pixels, for image data for expressing images expressed in a specific number of tones and converting into dot data to be formed on a medium, wherein:

said multilevel halftoning resultant values are generated through referencing, based on representative tone values of various regions wherein said groups of pixels are split into a plurality of regions, a single correspondence relationship selected from a plurality of correspondence relationships that have been prepared in advance regarding the multilevel halftoning resultant values that express the results of multilevel halftoning for each pixel that comprises said groups of pixels and the representative tone values that are tone values that represent said groups of pixels;

said multilevel halftoning resultant values are received for each individual region of the plurality of regions for splitting said groups of pixels for each of said groups of pixels;

the sequence values for indicating the sequence of pixels for forming dots within said groups of pixels are specified according to correspondence relationships referenced when generating multilevel halftoning resultant values for said groups of pixels; and dot data for indicating whether or not to form dots for the individual pixels in each of said regions is generated based on said multilevel halftoning resultant values obtained for each of said regions and on said specified sequence values for said groups of pixels in said regions.

In the dot data processing device and dot data processing method according to the present invention, when the multilevel halftoning resultant values are received for each of the plurality of regions into which the groups of pixels are split, a determination is made as to whether or not to form dots for each of the pixels in each of the regions of the groups of pixels. The decisions as to whether or not to form a dot, for each of the individual pixels, can be made based on the multilevel halftoning resultant values and on the sequence values, which indicate the sequence in which the dots are formed in each of the pixels within the group of pixels.

When compared with the data that indicates whether or not to form a dot for each of the individual pixels, the multilevel halftoning resultant values can be expressed with an extremely small amount of data, enabling the data transfer to be performed rapidly, and thus enabling the rapid outputting of the image. Furthermore, because the determinations as to whether or not to form dots in each of the regions are made after receiving the multilevel halftoning resultant values for each of the regions into which the groups of pixels are split, appropriate decisions as to whether or not to form dots can be made even when there are major variations in the tone values within the group of pixels. Thus the outputting of high quality images is enabled.

In this type of second image outputting device, at least one multilevel halftoning resultant value may be received for each group of pixels, and the decision as to whether or not to form dots, for each group of pixels, may be made based on the multilevel halftoning resultant value and on the sequence value for those groups of pixels that have received only one multilevel halftoning resultant value.

Doing so enables the image data to be received more rapidly than in the case wherein multilevel halftoning resultant values are received for each region that splits the group of values. This enables the image to be outputted rapidly, and is thus preferred.

In this type of second image outputting device, the number data that represents the number of dots that should be formed in a group of pixels may be received as the multilevel halftoning resultant value. Note that there is no need for the number data to necessarily be the same as the actual number of dots to be formed, insofar as the number data can be converted into the number of dots by some method, and thus this data can be in any form.

Receiving the number data as the multilevel halftoning resultant value is preferred because doing so enables the rapid determination of whether or not to form a dot, for each individual pixel within the group of pixels, based on the sequence value and on the number data received.

Conversely, a correspondence relationship, established for each group of pixels, between the multilevel halftoning resultant values and the number data that indicate the number of dots that should be formed in the group of pixels may be stored in advance in the image outputting device so that when the multilevel halftoning resultant values are received, these values are converted into number data through referencing these correspondence relationships. Note that insofar as the multilevel halftoning resultant values and the groups of pixels are determined and a particular number data is determined corresponding thereto in this type of correspondence relationship, any form of correspondence relationship is possible. For example, the correspondence relationships may be in the form of a correspondence table or a mathematical function.

Combining the multilevel halftoning resultant data and the groups of pixels to determine the number data, in this way, enables the expression of number data that will differ depending on the group combination with the groups of pixels, even given the same multilevel halftoning resultant value, thus enabling a reduction in the number of types of multilevel halftoning resultant values that can be obtained. The fewer the number of types of multilevel halftoning resultant values that can be obtained, the less the amount of data required for expressing the multilevel halftoning resultant values. This enables the multilevel halftoning resultant values to be transferred quickly, thus enabling the rapid outputting of the image.

In this type of dot data processing device, the decisions as to whether or not to form dots may be made in the following manner. The type of splitting groups of pixels into a specific plurality of regions is determined in advance. For a group of pixels that has received a specific plurality of multilevel halftoning resultant values, these multilevel halftoning resultant values may be assigned to the plurality of regions determined in advance to determine, for each of the individual pixels within each group of pixels, whether or not to form a dot.

In this way, the decisions as to whether or not to form a dot, for each individual pixel, can be simplified, even for groups of pixels that have received a plurality of multilevel halftoning resultant values, thus enabling the rapid outputting of the image. Note that although a variety of numbers are possible as the number of splits for the groups of pixels, it is uncommon for there to be a need to split the group of pixels into more than two regions, and so having two splits in the group of pixels is preferable, as doing so can handle most cases.

In this type of image outputting device, the decision as to whether or not to form a dot, for each pixel, may be made as follows. First a plurality of splitting patterns, indicating the state of splitting for groups of pixels, are stored. Next, for each region within the group of pixels, data indicating the splitting pattern for the group of pixels is assigned along with the multilevel halftoning resultant value for each region. When determining whether or not to form a dot, for each pixel in the group of pixels, the splitting pattern that was received along with the multilevel halftoning resultant value may be followed to assign the individual multilevel halftoning resultant values to each of the regions, and the determinations as to whether or not to form a dot may then be done for each pixel in each region.

Doing so enables the appropriate assignment, to each region within the group of pixels, of the plurality of multilevel halftoning resultant values received for the specific group of pixels, thus making it possible to determine, as appropriate for each individual pixel, whether or not to form a dot. This enables the outputting of high quality images.

In this type of second image outputting device, at least 100 different types of sequence values may be stored in advance for the various groups of pixels.

When making the decisions as to whether or not to form the dot for each pixel in a group of pixels based on the multilevel halftoning resultant values received for each of the groups of pixels, identical patterns of dots may be produced across a plurality of groups of pixels. Of course, when determining whether or not to form the dot in the present application, the decision takes into account not only the multilevel halftoning resultant value, but also the sequence value, which is specified for each group of pixels, and thus it can be said that the generation of identical patterns of dots is less likely than in the case wherein the decisions are made based on the multilevel halftoning resultant values alone. However, if there are not enough types of groups of pixels, it will be difficult to adequately prevent the occurrence of identical patterns. In order to avoid the generation of dots in identical patterns, it is preferable to be able to specify sequence values to as many different types of groups of pixels as possible, and experimentally, being able to specify sequence values for at least 100 different types of groups of pixels enables the prevention of the generation of dots in identical patterns to the degree that problems do not occur in practice.

Conversely, in this type of image processing device, the arithmetic product of the number of pixels grouped in a group of pixels and the number of types of groups of pixels for which sequence values can be specified may be set so as to be at least 1,000.

If there are too few pixels grouped together to be a group of pixels, then there will be few different patterns in which to distribute the dots within the group of pixels, increasing the likelihood of identical patterns of dots being generated across a plurality of groups of pixels. Conversely, having may pixels in the group of pixels enables a large number of patterns for the distribution of dots within the group of pixels, thus reducing the likelihood that the dots will be generated in the same pattern. Given this, having many pixels grouped together in the group of pixels enables the prevention of dots being generated in identical patterns across a plurality of groups of pixels, even if there are few different types of groups of pixels for which sequence values are specified. Experimentally, setting the number of types of groups of pixels and the number of pixels in a group of pixels so that the arithmetic product thereof will be at least 1,000 can prevent the generation of identical patterns of dots to the degree that there are no problems in practice.

In this type of second image outputting device, dots may be formed for a plurality of different types of tone values that can be expressed for each individual dot value, where the decision as to whether or not to form the dot may be made for each dot based on the aforementioned sequence value for each pixel within said group of pixels, and on the multilevel halftoning resultant value obtained for the group of pixels, where dots of a plurality of types with differing tone values, which can be expressed by a simple dot value, may be formed, and the decision as to whether or not each individual dot is to be formed may be made based on the multilevel halftoning resultant value, obtained for the group of pixels, and on the sequence values for each pixel within the set of pixels.

Doing so enables the formation of dots based on whether or not to form each type of dot, determined by the multilevel halftoning resultant values, thus enabling a high quality image to be outputted rapidly. Moreover, in this type of image outputting device that is capable of forming a plurality of types of dots, the reception of the multilevel halftoning resultant values is effective in outputting images rapidly, for the following reasons. First, when it is possible to form dots of a plurality of types, the data that expresses, for each type of dot, whether or not to form the dot for each pixel will inevitably have a large amount of data, so the transfer of this data will be time consuming. Moreover, the greater the number of types of dots, as a whole, the greater the time required for determining whether or not to form the dot, making rapid outputting of images difficult. In contrast, obtaining the multilevel halftoning resultant value enables the data to be provided rapidly, even when there is a large number of types of dots, thus enabling rapid outputting of the image.

The present invention can also be embodied using a computer, where a program for performing the image outputting method and the image processing method, as described above, is stored in a computer. Consequently, the present invention also includes program products and embodiments of recording medium whereon said programs are recorded.

This type of program, or program that is recorded on a recording medium, is read into a computer, where the use of the computer to execute the various types of functions described above enables the image data to be received rapidly and enables the rapid outputting of high quality images.

BRIEF DESCRIPTION OF THE DRAWINGS

FIG. 8a through FIG. 8d are explanatory diagrams illustrating the situation when converting image data to data indicating whether or not to form dots, using the dither method.

FIG. 9a through FIG. 9d are explanatory diagrams illustration the situation when generating, from dot number data, data indicating, for each pixel, whether or not to form the dot.

FIG. 12a through FIG. 12f are explanatory diagrams showing conceptually the situation wherein the representative tone values are determined through determining whether or not to split groups of pixels based on the tone values for each of the pixels that are grouped into the group of pixels.

FIG. 14a through FIG. 14d are explanatory diagrams illustrating the method of determining the classification number for a group of pixels.

FIG. 15 is an explanatory diagram illustrating specifically the method for determining the classification number for a specific group of pixels.

FIG. 16 is an explanatory diagram illustrating conceptually a table for multilevel halftoning, referenced in the first embodiment, for obtaining the multilevel halftoning resultant values from the representative tone values and the classification numbers for the groups of pixels.

FIG. 23a through FIG. 23c are explanatory diagrams illustrating conceptually the situation wherein the decisions as to whether or not to form a dot for each of the pixels within the group of pixels is made based on the multilevel halftoning resultant value and the sequence value matrix.

FIG. 24 is an explanatory diagram illustrating conceptually a conversion table that is referenced in order to determine whether or not to form dots, for each of the applicable pixels.

FIG. 26 is an explanatory diagram illustrating an example of ESC codes that indicate the splitting pattern in the alternative form of the first embodiment.

FIG. 31 is an explanatory diagram illustrating conceptually the situation wherein the numbers of large dots, medium dots, and small dots to be formed have been obtained for each group of pixels.

FIG. 32 is an explanatory diagram illustrating the correspondence relationships between the multilevel halftoning resultant values and the combination of the numbers of each type of dot to be formed in the group of pixels in the second embodiment.

FIG. 34 is an explanatory figure illustrating conceptually a table for multilevel halftoning to be referenced in the multilevel halftoning resultant value generating process in the second embodiment.

FIG. 35 is an explanatory diagram illustrating the situation wherein the multilevel halftoning resultant values are assigned to ESC codes in the second embodiment.

FIG. 38 is an explanatory diagram showing conceptually a conversion table for intermediate data that is referenced in the process of determining whether or not to form dots in the second embodiment.

FIG. 42 is an explanatory diagram illustrating the situation when assigning the correspondence between splitting patterns and multilevel halftoning resultant values in data for five bits.

FIG. 43 is an explanatory diagram showing the situation when converting to multilevel halftoning resultant values image data grouped into groups of pixels by the process for generating multilevel halftoning resultant values in the third embodiment.

FIG. 46a through FIG. 46c are explanatory diagrams illustrating a method for determining classification numbers of groups of pixels.

FIG. 47 is an explanatory diagram illustrating specifically a method for determining the location, in a dithering matrix, of a group of pixels from the coordinate values of the group of pixels.

FIG. 48 is an explanatory diagram illustrating conceptually a conversion table that is referenced when converting to intermediate data the multilevel halftoning resultant values in the process of determining whether or not to form a dot in the third embodiment.

DESCRIPTION OF THE PREFERRED EMBODIMENTS

To more fully illustrate the operations and effects of the present invention, embodiment according to the present invention will be explained below, in the following sequence.

A. Summary of the Embodiments

B. Structure of the Device

Figure 1:
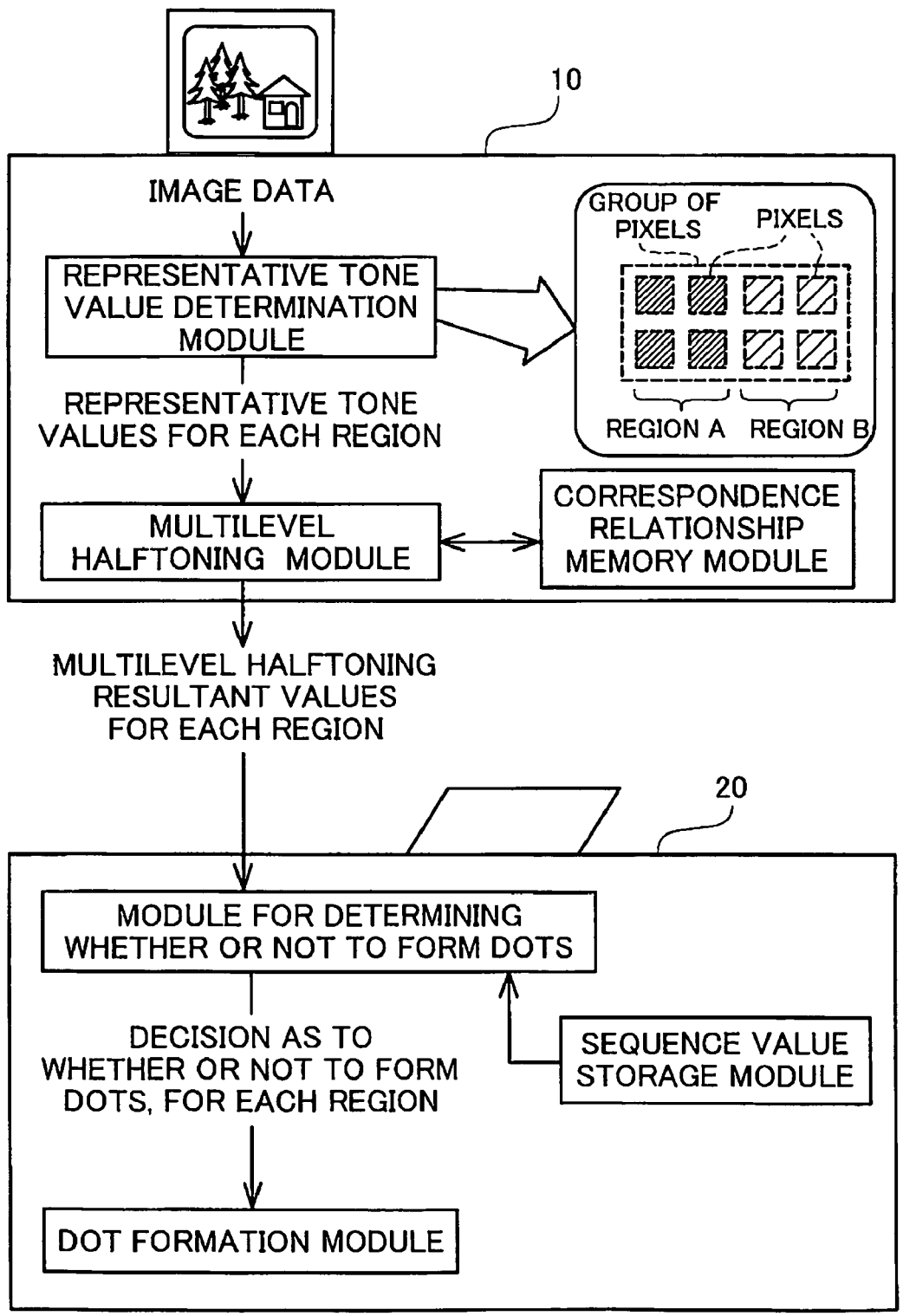
FIG. 1 is an explanatory diagram for explaining an overview of an embodiment as an example of a printing system.

C. Summary of the Process for Printing an Image According to the First Embodiment
    C-1 Principles that Enable the Determination of the Pixel Position From the Number Data
    C-2 Process for Generating Multilevel halftoning Resultant Values According to the First Embodiment
    C-3 Method of Determining Classification numbers
    C-4 Table for Multilevel halftoning
    C-5 Data Format for the Multilevel halftoning Resultant Values
    C-6 Process of Determining Whether or not to Form a Dot in the First Embodiment
    C-7 Alternative Forms According to the First Embodiment D. Second Embodiment
    D-1 Summary of the Image Printing Process According to the Second Embodiment
    D-2 Process for Generating the Multilevel halftoning Resultant Values According to the Second Embodiment
        D-2-1 Process of Determining, Using the Dithering Method, the Numbers of Large, Medium, and Small Dots to be Formed
        D-2-2 Details of the Process for Generating the Multilevel halftoning Resultant Values in the Second Embodiment
    D-3 Process for Determining Whether or Not To Form a Dot According to the Second Embodiment E. Third Embodiment
    E-1 Process for Generating the Multilevel halftoning Resultant Values According to the Third Embodiment.
    E-2 Process for Determining Whether or Not to Form a Dot According to the Third Embodiment
    E-3 Method of Setting Up the Table for Multilevel halftoning According to the Third Embodiment
    E-4 Alternative Form According to the Third Embodiment A. Summary of the Embodiments Before starting the detailed explanations of the embodiments, a summary of the embodiments will be explained referencing FIG. 1. FIG. 1 is an explanatory diagram for explaining an overview of the present embodiments. The present printing system comprises a computer 10, a printer 20, as a dot data processing device, and so forth, where, when a specific program is loaded and executed by the computer 10, the computer 10 and the printer 20, etc., as a whole function as an integrated image processing system. The printer 20 prints an image through forming dots on a print medium. The computer 10 performs specific image processing on image data for the image to be printed to generate, and send to the printer 20, data by which the printer 20 will control the formation of dots for each pixel.

In the general printing system, the image is printed as follows. First the execution of a specific image process by the computer converts image data into data indicating, for each pixel, whether or not to form a dot. Next, the data obtained is provided to the printer, and the printer prints the image through forming dots according to the data that has been provided. If the number of pixels in the image to be printed is large, the time required for image processing increases commensurately, interfering with the rapid printing of the image. Moreover, with larger numbers of pixels, the amount of data required to indicate whether or not to form a dot, for each pixel, increases, increasing the time required for outputting data from the computer to the printer, increasing by that amount the time required for printing.

Taking this point into account, images are printed in the following manner in the printing system illustrated in FIG. 1. First, in the computer 10, the pixels that comprise the image are grouped together in specific pluralities of pixels to generate groups of pixels. Next, for the plurality of regions into which the groups of pixels are split, a representative tone value, which represents the tone value of each individual region, is determined. FIG. 1 illustrates conceptually the situation wherein a group of pixels is split into two regions. In the figure, the small rectangles shown with dotted lines illustrate pixels schematically. In the example in the figure, the group of pixels comprises eight pixels, and is split into two regions, Region A, which is marked by the dense diagonal lines and Region B, which is marked by the sparse diagonal lines. In the module for determining the representative tone values, representative tone values are determined for each of these regions. Note that a group of pixels need not necessarily be split, but rather a decision may be made as to whether or not to split the group of pixels based on the tone values within the group of pixels. In this type of case, only a single representative tone value would be determined for a group of pixels for which the decision is made to not split the group of pixels.

The representative tone values obtained in this way are provided to the multilevel halftoning modules and converted into multilevel halftoning resultant values through multilevel halftoning. The multilevel halftoning of the representative tone values is performed through referencing the correspondence relationships for multilevel halftoning, stored in the correspondence relationships storage module. Because associations are defined, for each group of pixels, between the representative tone value and the multilevel halftoning resultant value in the correspondence relationships for multilevel halftoning, referencing these correspondence relationships enables rapid conversion of the representative tone values into multilevel halftoning resultant values. Furthermore, because the representative tone values are determined for each region within the group of pixels, the multilevel halftoning resultant values are also obtained for each region. Of course, for groups of pixels for which a decision has been made to not split the group of pixels, through performing a decision as to whether or not to split the group of pixels, only a single multilevel halftoning resultant value will be obtained. The computer 10 outputs to the computer 20 the multilevel halftoning resultant values thus obtained.

When, in the printer 20, the multilevel halftoning resultant values are received for each of the regions in the group of pixels, decision are made, for each region, as to whether or not to form the dot for each of the individual pixels. The decision as to whether or not to form the dots is made as follows. First a sequence value indicating the sequence in which the dots will be formed for each of the pixels in the group of pixels is specified for each group of pixels. While any method can be used when specifying the sequence values, storing sequence values in memory in advance for each of the pixels for each of the group of pixels and then specifying the sequence value by reading out the sequence value from memory, for example, may be used. When the multilevel halftoning resultant values are obtained, the decision as to whether or not to form a dot, for each of the individual pixels in the group of pixels, is made based on the multilevel halftoning resultant value and the sequence value. At this point, the multilevel halftoning resultant value is provided for each region within the group of pixels, and so the decision as to whether or not to form dots in each region is made based on the respective multilevel halftoning resultant values and sequence values. Of course, for a group of pixels for which only a single multilevel halftoning resultant value has been provided, the decisions as to whether or not to form dots for each of the individual pixels within the group of pixels, may be made based on that multilevel halftoning resultant value and sequence value. The dot formation module forms dots according to the results of the determination as to whether or not to form dots, obtained in this manner, to print the image.

When compared to the data that indicates whether or not to form dots, for each individual pixel, the multilevel halftoning resultant values for each group of pixels is able to reduce dramatically the amount of data. Consequently, instead of the computer 10 providing to the printer 20 data indicating, for each individual pixel, whether or not to form a dot, the provision of multilevel halftoning resultant values for each set of pixels can increase the speed of data transfer enormously.

Moreover, referencing the correspondence relationships for multilevel halftoning, wherein associations are defined between the representative tone values and the multilevel halftoning resultant values can produce the multilevel halftoning resultant values rapidly. Because of this, coupled with the ability to provide rapidly to the printer 20 the multilevel halftoning resultant values that have been produced, images can be printed quickly, even if the images contain a large number of pixels. Furthermore, generating the multilevel halftoning resultant values through referencing correspondence relationships enables the multilevel halftoning resultant values to be produced using an extremely simple process. As a result, the multilevel halftoning resultant values can be produced even within, for example, the printer 20 or within a digital camera, or the like, without using a device, such as the computer 10, that has sophisticated processing capabilities.

Moreover, determining, for each region, whether or not to form dots for each of the individual pixels therein after multilevel halftoning of the representative tone values in each of the plurality of regions into which the groups of pixels are divided enables the outputting of high quality images through determining appropriately whether or not to form the dots, even when there is a large deviation in the tone values within the group of pixels. Various examples of embodiments of the present invention, through the use of this type of printing system, will be explained in detail below.

B. Structure of the Device

Figure 2:
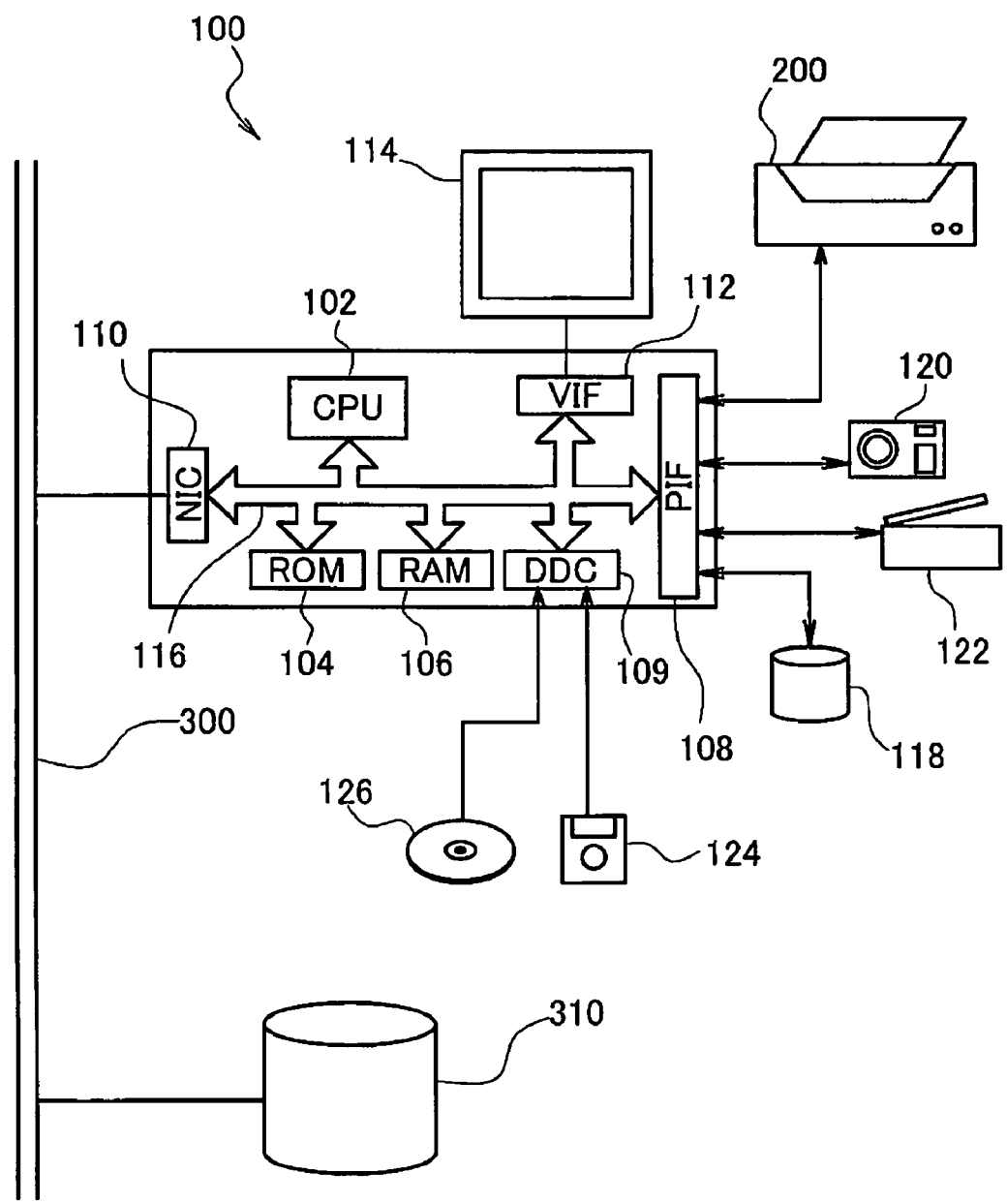
FIG. 2 is an explanatory diagram illustrating the structure of a computer as an image processing device in an embodiment according to the present invention.

FIG. 2 is an explanatory diagram illustrating the structure of a computer 100 as an image processing device according to the present embodiment. The computer 100 is a well-known computer structured through the interconnections of a ROM 104, a RAM 106 and so forth, around a CPU 102.

A disk controller DDC1 for reading data from a flexible disk 124 or a compact disk 126, or the like, a peripheral device interface PIF 108, for exchanging data with peripheral devices, and a video interface VIF 112, for driving a CRT 114 and the like are connected to a computer 100. A color printer 200, described below, and a hard disk 118, and the like, are connected to the PIF 108. Connecting a digital camera 120, a color scanner 122, or the like to the PIF 108 enables the printing of images captured by the digital camera 120 or the color scanner 122, or the like. Installing a network interface card NIC 110 enables the computer 100 to connect to a communication line 300, enabling data stored in a memory device 310, connected to the communications line, to be obtained.

Figure 3:
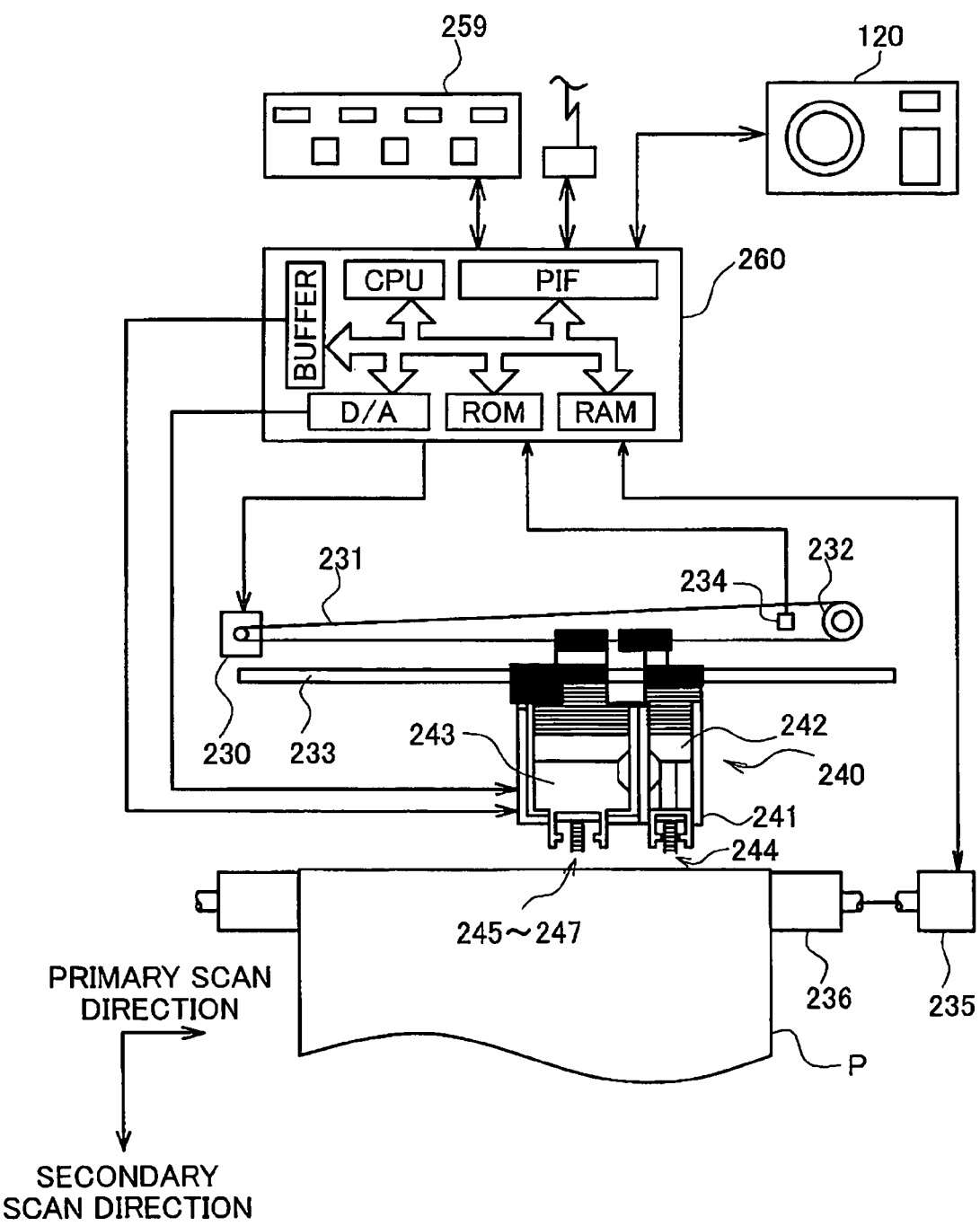
FIG. 3 is an explanatory diagram illustrating the schematic structure of a color printer in an embodiment according to the present invention.

FIG. 3 is an explanatory diagram illustrating the schematic structure of a color printer 200 according to the present embodiment. The color printer 200 is an ink jet printer that can form four colors of ink dots: cyan, magenta, yellow, and black. Of course, an ink jet printer capable of forming ink dots in a total of six colors may be used instead, where in addition to these four colors of ink there is also a cyan ink (light cyan) with a low density of dye or pigment, and a magenta (light magenta) ink with a low density of dye or pigment. Note that in some cases in the below, the cyan ink, magenta ink, yellow ink, black ink, light cyan ink, and light magenta ink may be abbreviated, respectively as C ink, M ink, Y ink, K ink, LC ink, and LM ink.

The color printer 200, as shown in the figure, comprises a mechanism that moves a print head 241, mounted in a carriage 240, and sprays ink to form dots, a mechanism wherein the carriage 240 is moved in a reciprocating motion in the axial direction of a platen 236 by a carriage motor 230, a mechanism wherein printer paper P is fed by a fed motor 135, a control circuit 260 that controls the formation of dots, the movement of the carriage 240, and the feeding of the printer paper, and the like.

An ink cartridge 242, containing the K ink, and an ink cartridge 243, containing the C ink, the M ink, and the Y ink, are installed in the carriage 240. When the ink cartridges 242 and 243 are installed in the carriage 240, the various inks within the cartridge are conveyed by injector tubes, not shown, and supplied to the ink jet heads 244 through 247 for the respective colors, equipped on the bottom surface of the print head 241.

Figure 4:
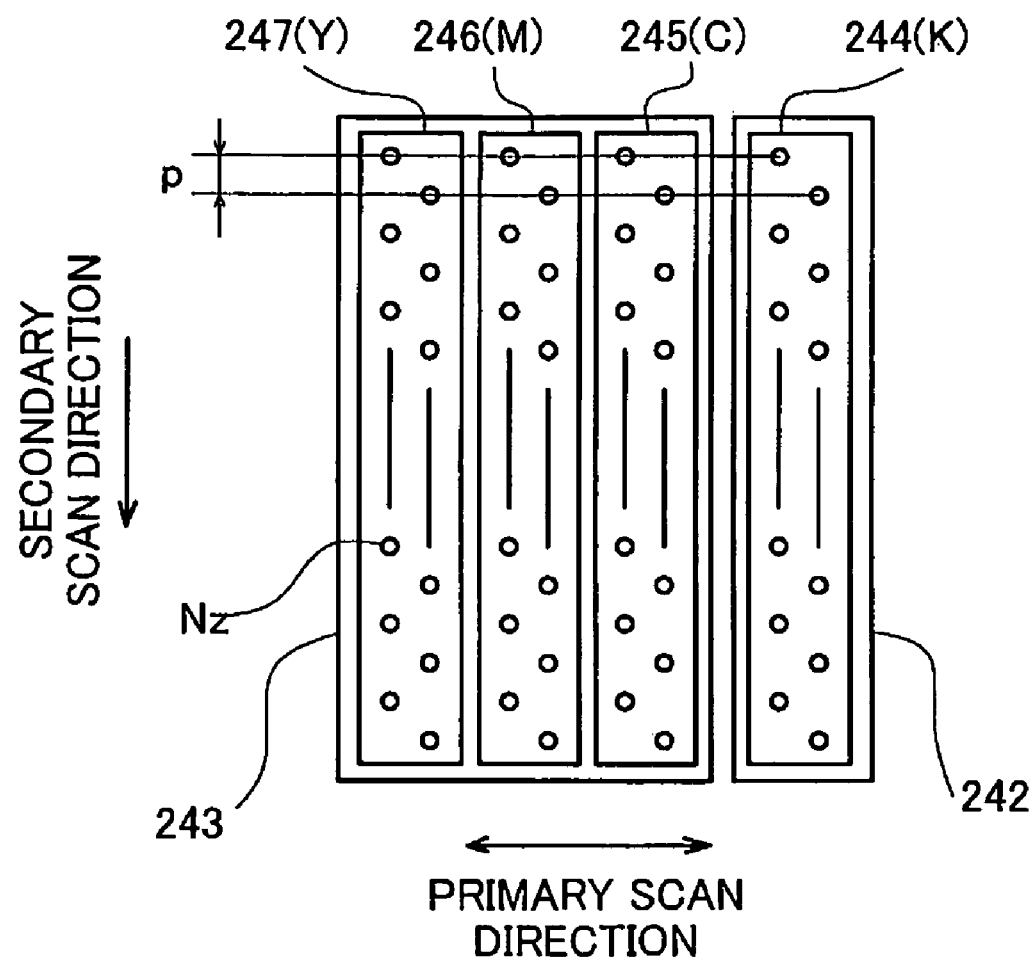
FIG. 4 is an explanatory diagram illustrating the array of ink jet nozzles in an ink jet head.

FIG. 4 is an explanatory diagram illustrating an array of ink jet nozzles Nz in the ink jet heads 244 through 247. As is shown in the figure, an array of four sets of nozzles for spraying the C, M, Y and K colored ink are formed on the bottom surface of the ink jet heads, where 48 nozzles Nz are arrayed with a constant nozzle pitch k in each set of nozzles.

In the control circuit 260, a CPU, a ROM, a RAM, a PIF (peripheral device interface), and the like, are interconnected by a bus. The control circuit 260 not only controls the main scanning motion and secondary scanning motion of the carriage 240 through controlling the motion of the carriage motor 230 and the paper feed motor 235 but also controls the spraying of ink droplets, with the appropriate timing, from each nozzle, based on the print data that is supplied from the computer 100.

Note that a variety of different methods can be used for spraying ink droplets from each of the color ink jet heads. In other words, a method wherein ink droplets are sprayed through the use a piezo element, or a method wherein ink droplets are sprayed through the creation of bubbles in an ink pathway using a heater equipped on the ink pathway, or the like, may be used. Moreover, a printer may be used that, instead of spraying ink droplets, uses a method wherein ink dots are formed on the printer paper through the use of a phenomenon such as thermal transfer, or a printer of the type wherein toner particles of each color are adhered to the printing paper through the use of static electricity.

In a color printer 200 having a hardware configuration such as described above the carriage 230 is driven to cause each of the color ink jet heads 244 through 247 to move in the primary scan direction relative to the printer paper P, or, by driving the paper feed motor 235, to move the printer paper P in the secondary scan direction. The control circuit 260 synchronizes the motion of the carriage 240 in the primary scan and secondary scan directions while driving the nozzles with the appropriate timing to spray the ink droplets, so that the color printer 200 will print a color image on the printer paper thereby.

Note that the color printer 200 is also equipped with a CPU, a RAM, a ROM, and the like in the control circuit 260, enabling processes performed within the computer 100 to be performed within the color printer 200. In this case, supplying the image data for the images captured by the digital camera 120, or the like, directly to the color printer 200 and performing the required image processes within the control circuit 200 enables the printing of images directly from the color printer 200.

C. Summary of the Process for Printing an Image According to the First Embodiment The image processes (the image printing processes) performed within the computer 100 and the color printer 200, described above, for printing an image will be described below. To facilitate understanding, at this point an simple overall image of the image printing process will be explained first, after which the principles that enable the image printing process will be explained. Lastly, the details of the individual processes will be explained as well.

Note that, in the below, the image printing process is explained as the first half of the process being performed by the computer 100 and the second half of the process being performed by the color printer 200; however, these processes may be performed within the color printer 200, or may be performed within the device that generates the image data, such as the digital camera 120. Conversely, the first half of the image printing processes may instead be performed within the digital camera 120, or the like, and a second half of the processes may be performed within the color printer 200, of course. In other words, as will be explained in detail below, the image printing processes according to the present embodiment can enormously simplify the first-half processes and the second-half processes. Consequently, even when a device such as a color printer 200 or a digital camera 120, or the like, that does not have the sophisticated processing capabilities of the computer 100 is used, image printing processes can still be performed rapidly, enabling the structuring of a fully practical printing system that does not use the computer 100.

Figure 5:
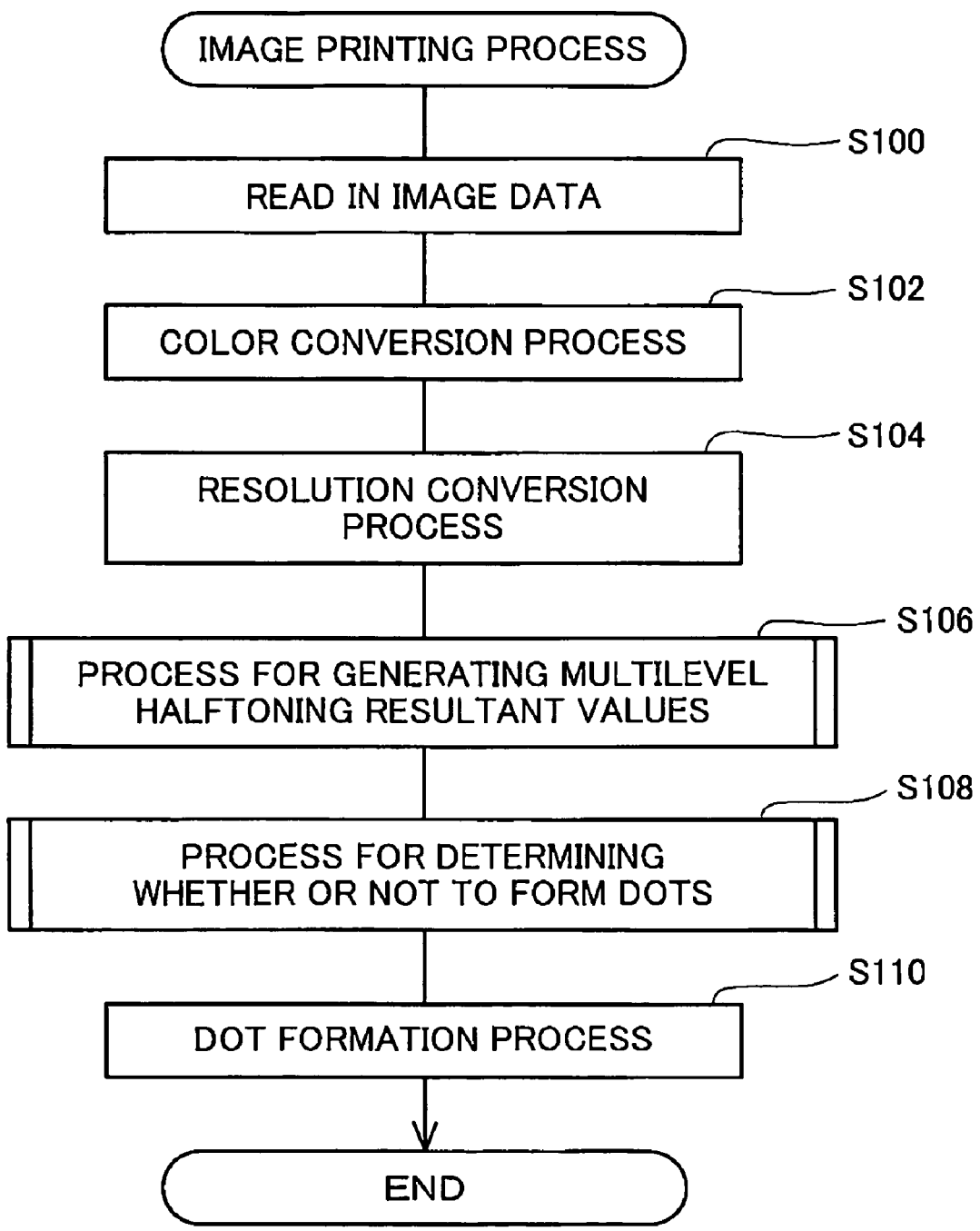
FIG. 5 is a flow chart illustrating the overall flow of an image printing process according to a first embodiment according to the present invention.

FIG. 5 is a flow chart illustrating the overall flow of the image printing process in the first example embodiment. The overall image of the image printing process will be explained briefly below, referencing FIG. 5. When starting the image printing process according to the first embodiment, the computer 100 starts by first reading in the image data (Step S100). Although the image data is described here as RGB color image data, the image data is not limited to color image data, but the present invention applies equally to monochrome image data as well. The present embodiment can also be applied similarly to monochrome printers, rather than being limited to color printers.

The color conversion process is performed after the color image data has been read in (Step S102). The color conversion process is the process of converting the RGB color image data which is expressed by a combination of R, G, and B tone values, into image data that is expressed by combinations of tone values for each of the ink colors that are used for printing. As described above, the color printer 200 prints images using four colors of ink: C, M, Y, and K. Given this, the image data expressed by the RGB colors is converted into data expressed in terms of tone values for the C, M, Y, and K colors in the color conversion process in the first example embodiment. The color conversion process is performed by referencing a 3-dimensional table known as a color conversion table (LUT). The LUT stores, in advance, the individual C, M, Y, and K tone values obtained through color conversion of the RGB color image data. In the process in Step S102, this LUT is referenced to enable the rapid conversion of the RGB color image data into C, M, Y and K color image data.

The resolution conversion process (Step S104) is performed when the color conversion process has been completed. The resolution conversion process is a process that converts the color data resolution into the resolution in which the printer 200 will print the image (the printer resolution). If the resolution of the image data is lower than the print resolution, then new image data is generated between the pixels, but, conversely, if the resolution of the image data is higher than the print resolution, then a process is performed to reduce the data by a specific proportion to cause the resolution of the image data to match the printer resolution.

Given today's demands for higher image qualities and for larger image sizes, often, in the resolution conversion process, the conversion is to a printer resolution that has high resolution than the image data. In this case, interpolation calculations may be performed to generate new image data between the pixels; however, the new image data may instead by produced through simply splitting a single pixel into a plurality of pixels. Of course, when increasing the resolution through simply splitting the individual pixels, the result will not appear as a smooth transition of tone from one pixel to the adjacent pixel, so this approach does not actually increase the resolution, but rather merely increases the apparent resolution. However, when printing image by forming dots, the number of tones that can be expressed by a single pixel is no more than a few tones at best, and is very low when compared to the number of tones that can be expressed in the image data, and thus even this type of resolution conversion is effective in improving the image quality, and so resolution conversion processes that simply increase the apparent resolution through splitting pixels are common.

After the resolution has been converted to the printer resolution, as described above, the computer 100 begins the multilevel halftoning resultant value generation process (Step S106). The details of the process for generating the multilevel halftoning resultant values, will be described below; only a summary will be described at this point. In this process, pixels that have specific positional relationships with each other are grouped together, in groups of a specific size, to form groups of pixels, dividing one image into a plurality of groups of pixels. The number of pixels grouped into a group of pixels need not necessarily be the same for all of the groups of pixels, but rather the number of pixels may change according to a rule, or the number of pixels that are grouped into a group of pixels may vary depending upon the position in the image; however, for ease in understanding, the explanation here will be of the case wherein all groups of pixels have the same number of pixels, the most simple case.

Next, in a first example embodiment described below, a decision is made whether or not to split the group of pixels based on the image data in each of the individual pixels that are grouped into the group of pixels. For those groups of pixels that are not split, a tone value (the representative tone value) that represents the image data within the group of pixels is determined. On the other hand, for those groups of pixels for which the decision is made to split the group of pixels, tone values that represent the image data within each of the regions that are produced by splitting the group of pixels will be derived and determined as the representative tone pixels for the respective regions. In other words, the groups of pixels will include groups of pixels that will be split and a plurality of representative tone values will be determined, and there will be those groups of pixels that are not split, so only a single representative tone value will be determined. It is also possible to do away altogether with the decision as to whether or not to split the groups of pixels, and handle all of the groups of pixels as being subject to splitting. In such a case, a plurality of representative tone values will be determined for everyone of the groups of pixels. Considering as the standard the case wherein a plurality of representative tone values will always be obtained, in the process in the first embodiment, described below, the case wherein only a single representative tone value is obtained can be considered to be an additional case. Consequently, from this perspective the process wherein the groups of pixels are always split can be viewed as the pure process. However, in order to understand the technical significance of always splitting the groups of pixels, it is more convenient to first understand the case wherein the pixels are not split. Given this, an example embodiment will be explained, as the first embodiment, wherein decisions are made as to whether or not to split the groups of pixels, and then, as another example of the first embodiment, an explanation will be made of an embodiment wherein the groups of pixels are always split.

Once the representative tone value has been determined for the group of pixels or for each region into which the group of pixels is split, then the representative tone value is converted into a multilevel halftoning resultant value through performing multilevel halftoning. Although the details indicated by the multilevel halftoning resultant value may be any type of details, here the multilevel halftoning resultant value is data indicating the number of dots that should be formed within the group of pixels. In other words, because the representative tone value is a tone value that represents the image data for each of the pixels within the group of pixels, the higher the representative tone value, the greater the number of dots to be formed within the group of pixels. Consequently, the process of determining the number of dots to be formed within a group of pixels from the representative tone vale for that groups of pixels can be viewed as a form of multilevel halftoning, and in this case the number of dots is the multilevel halftoning resultant value. Note that the multilevel halftoning resultant value may instead be a value that can be converted into the number of dots. In other words, the multilevel halftoning resultant value need not necessarily be the number of dots itself, but may instead be a value that indicates the number of dots indirectly.

As will be explained in detail below, the process for performing multilevel halftoning on the representative tone value can be performed quickly through referencing a table for multilevel halftoning wherein a correspondence is defined, for each group of pixels, between the representative tone values and the multilevel halftoning resultant values.

Once the multilevel halftoning resultant value has been obtained, the value is outputted to the printer 200. At this point, if the group of pixels has been split into a plurality of regions, then a plurality of representative tone values will be obtained, and a plurality of multilevel halftoning resultant values will be obtained as well. Consequently, for this type of group of pixels, a plurality of multilevel halftoning resultant values will be outputted to the color printer 200. In the process of generating the multilevel halftoning resultant values, one or more multilevel halftoning resultant values are generated for each group of pixels based on the image data for each pixel, after which the value or values are supplied to the color printer 200.

When the CPU that is housed in the control circuit 260 of the color printer 200 has received the multilevel halftoning resultant values from the computer 100, then the process of determining whether or not to form a dot is commenced (Step 108). In other words, because the color printer 200 prints the image by forming dots for each pixel that forms the image, prior to printing the image it is necessary to determine, for each pixel, whether or not to form a dot. Given this, when the multilevel halftoning resultant value (or values) is received for each pixel from the computer 100, a process is performed for determining whether or not to form a dot for each of the pixels within the group of pixels.

At this point, the so-called density pattern method is a well-known method for determining, for each pixel within the group of pixels, whether or not to form a dot, based on the multilevel halftoning resultant value; however, in the process for determining whether or not to form a dot according to the present embodiment, there is a major point of difference in that the determination of whether or not to form a dot is done using the sequence value that has been determined for each group of pixels. Determining, for each pixel, whether or not to form a dot in this way enables the huge benefits described below. In the typical density pattern method, the actual resolution drops to the resolution of the groups of pixels on which the multilevel halftoning was performed, tending to lead to a reduction in image quality. In contrast, in the process of determining whether or not to form dots according to the present embodiment, the decision as to whether or not to form dots is made while referencing the sequence values that have been stored for each group of pixels, so there is no reduction in image quality depending on the size of the group of pixels. Moreover, this approach enables the printing of high quality images wherein the dots are dispersed well, achieved such as through the use of the so-called "blue noise mask" and "green noise mask" dithering matrices. The details of the process for determining whether or not to form dots, according to the present embodiment, and the reason why these types of characteristics are obtained through determining whether or not to form dots through performing this process will be explained below.

After whether or not to form dots has been determined for each pixel within the group of pixels as described above, then a process is performed to form the dots, on the output medium, according to the decisions as to whether or not to form dots (Step S110). In other words, as was explained using FIG. 3, the ink jet head is driven to spray ink droplets as the carriage 240 reciprocates in the primary scan direction and the secondary scan direction to form ink dots on the printer paper. The formation of dots in this way prints an image according to the image data.

Although, in this type of image printing process according to the first embodiment, the computer 100 provides multilevel halftoning resultant values to the color printer 200, the computer 100 does not provide to the color printer 200 data that indicates whether or not dots are formed for each individual pixel. When compared to expressing whether or not to form dots, for each individual pixel, the multilevel halftoning resultant values can be expressed in far less data, and thus the use of this type of method enables the data to be provided from the computer 100 to the color printer 200 extremely rapidly.

For example, let us assume that there is one type of dot that can be formed in each pixel. In this case, the data length for each pixel is one bit, because, for each pixel, all that is communicated is the status of whether or not to form the dot for the pixel. If one group of pixels is defined as grouping together eight individual pixels, then an 8-bit data length is required for expressing whether or not to form dots for each of the pixels within the group of pixels. However, the number of dots to be formed within a group of pixels can be only one of 9 possibilities, from 0 to 8. If there are 9 possibilities, then the number of dots can be expressed in only 4 bits. Consequently, performing multilevel halftoning on the representative tone values of the groups of pixels to form data for the number of dots can achieve a 4-bit data length for the multilevel halftoning resultant values. When compared with the data that expresses, for each individual pixel, whether or not to form a dot, the multilevel halftoning resultant values can be expressed in a substantially smaller amount of data, enabling the provision of data from the computer 200 to the color printer 200 to be performed extremely rapidly. Of course, when a group of pixels is split, a plurality of multilevel halftoning resultant values must be provided for each group of pixels; however, as will be described below, because there is a tendency in image data for adjacent pixels to have similar tone values, the proportion of groups of pixels that require splitting is trivial. Because of this, the increase in the amount of data that is provided to the color printer 200 for the entire image is no more than trivial, enabling the multilevel halftoning resultant values to be provided rapidly.

In addition, as will be described in detail below, if the decision as to whether or not to form dots are made appropriately for each pixel, there will be no reduction of image quality, even when the multilevel halftoning resultant values are provided. In particular, the exact same results can be obtained, under specific conditions, as in the case wherein data is supplied indicating whether or not to form dots for each specific pixel. Additionally, because the groups of pixels can be split, based on the image data in each of the individual pixels within the group of pixels, and multilevel halftoning resultant values can be generated and supplied to the color printer 200 for each of the regions, the images can be printed without a reduction in quality even when there are large variances in the image data within a group of pixels.

Moreover, the use of the algorithm described below enables the process for generating the multilevel halftoning resultant values and the process for determining whether or not to form dots for each of the pixels, from the multilevel halftoning resultant values, to be achieved using an extremely simple process, and also enables the execution to be performed extremely quickly. The result is the ability to execute these processes within the digital camera 120 or within the color printer 200, or the like, without using an image processing device that has sophisticated processing capabilities, such as the computer 100. In such a case, the image data captured by the digital camera 120 can be provided directly to the color printer 200 to print a high quality color image.

C-1. Principles that Enable the Determination of the Pixel Position from the Number Data The principle that enables the printing of images, without a loss of image quality even when determinations have been made as to whether or not to form dots, for each individual pixel within the group of pixels, based on multilevel halftoning resultant values that are supplied from computer 100 to a color printer 200, and which indicate the number of dots to form in the group of pixels when using the method described above will be explained below.

For convenience in the explanation, the dithering method will be explained first. The dithering method is a typical method that is used to convert image data into data that indicates, for each individual pixel, whether or not to form a dot. In this method, thresholds are set up in a matrix known as the "dithering matrix," the tone values for the image data are compared, for each individual pixel, to the threshold values in the dithering matrix, and, for each pixel in the image data for which the tone value is grater than the threshold value, a decision is made to form a dot, but a decision is made to not form a dot for the other pixels. Making this type of decision for each of the individual pixels within the image converts the image data into data that indicates whether or not to form dots for the individual pixels.

Figure 6:
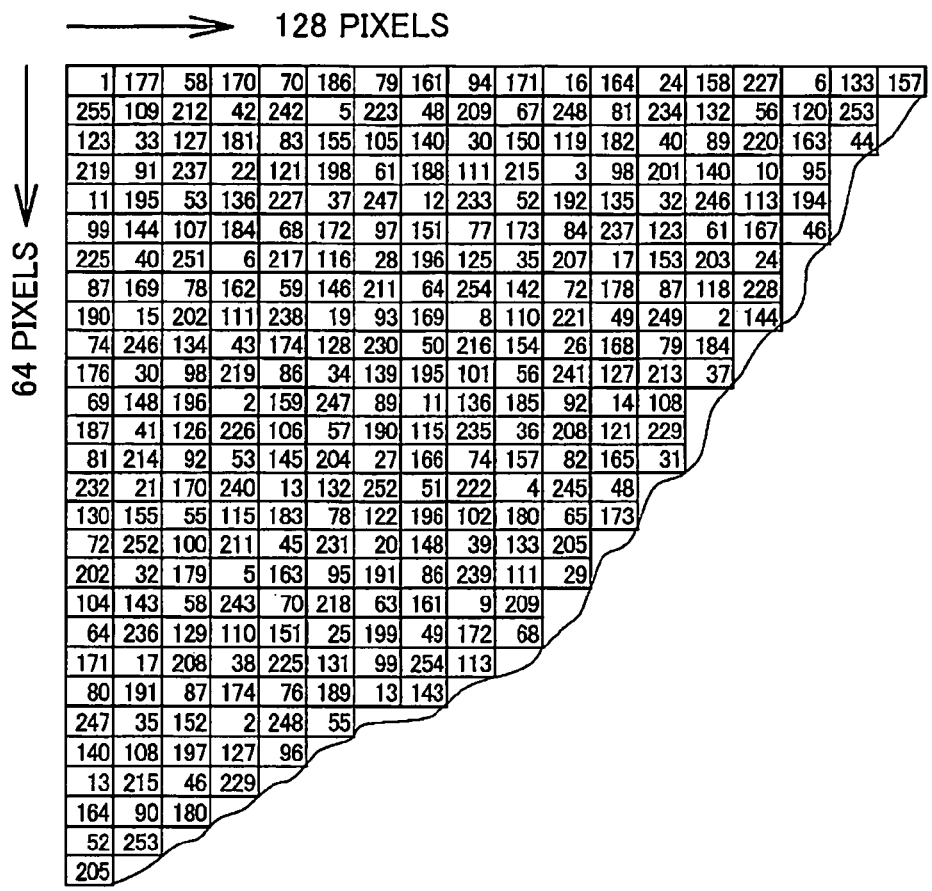
FIG. 6 is an explanatory diagram illustrating conceptually a portion of a dithering matrix.

FIG. 6 is an explanatory diagram, illustrating conceptually a portion of the dithering matrix. In the matrix that is shown, threshold values, selected at random from a range of tone values between 1 and 255 are stored at random in 8,192 pixels, with the matrix 128 pixels in the horizontal direction (the primary scan direction) and 65 pixels in the lengthwise direction (the secondary scan direction). Here the selection of the tone values for the threshold values from the range of 1 to 255, in the present embodiment, is applied to the 1 byte of data wherein the image data can have a range of tone values from 0 to 255, where if the tone value of the image data is equal to the threshold value, then the decision is to form a dot in that pixel.

In other words, when the pixels wherein dots are to be formed are limited to those wherein the tone value of the image data is greater than the threshold value (in other words, no dot will be formed for those pixels wherein the tone value is equal to the threshold value), then dots will never be formed for those pixels that have the threshold values that are the same as the maximum possible tone value in the image data. In order to avoid such a situation, the range of possible thresholds is arranged that excludes the maximum tone value from the range of possible image data. Conversely, when a dot will be formed in a pixel when the tone value of the image data equals the threshold value, then those pixels that have threshold values that are the same as the minimum possible value for the image data will always have a dot formed. In order to avoid such a situation, the range of possible threshold values is a range that excludes the minimum tone value from the range that is possible for image data. In the present embodiment, the tone values that can be obtained by image data range from 0 to 255, and because a dot is formed for those pixels wherein the image data is equal to the threshold value, the range for the possible threshold values is between 1 and 255. Note that the size of the dithering matrix is not limited to the size suggested in FIG. 6, but rather a variety of sizes, including matrices wherein the number of pixels in the horizontal axis equals the number of pixels in the vertical axis, may be used.

Figure 7:
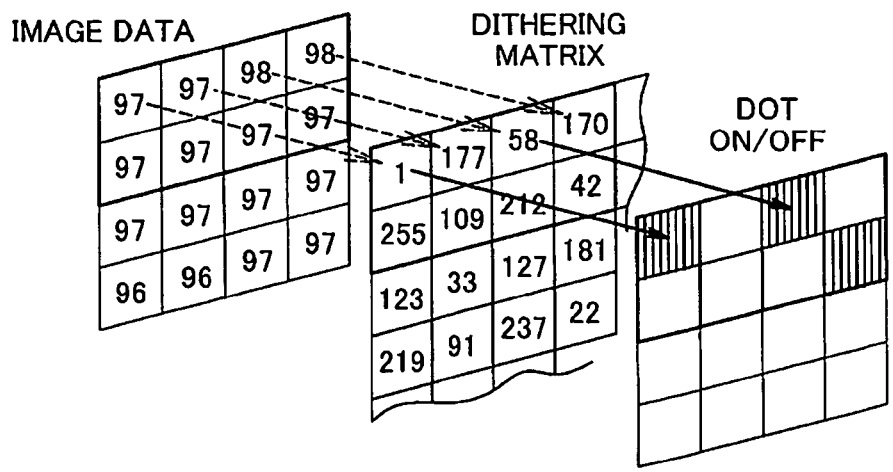
FIG. 7 is an explanatory diagram illustrating conceptually the situation wherein determinations are made, for each pixel, as to whether or not to form the dot, while referencing the dithering matrix.

FIG. 7 is an explanatory diagram illustrating conceptually the situation when determining whether or not to form dots for individual pixels by referencing the dithering matrix. When determining whether or not to form dots, first the pixel for which the decision is to be made is selected, and then the tone value for the image data for that pixel is compared to the threshold value stored in the corresponding position in the dithering matrix. In FIG. 7, the arrow with the thin dotted line represents conceptually the comparison of the tone values for the image data with the threshold values stored in the dithering matrix for each individual pixel. For example, for the pixel at the top left corner of the image data, the tone value for the image data is 97 and the dithering matrix threshold value is 1, and so a decision is made to form a dot for the pixel. In FIG. 7, the arrow shown with the solid line illustrates conceptually the situation wherein the decision is made to form a dot for the pixel, and the decision results are written to memory. On the other hand, for the pixel to the right of this pixel, the tone value of the image data is 97 and the threshold value in the dithering matrix is 177, so it is the threshold value that is larger, and the decision is made so as to not form a dot for this pixel. In the dithering method, decisions are made as to whether or not to form dots for the individual pixels while referencing this type of dithering matrix, to thereby convert the image data to data indicating whether or not to form dots for each individual pixel.

FIG. 8 is an explanatory diagram showing the situation wherein the dithering method is used to convert image data into data that indicates whether or not to form dots. FIG. 8*a* is an expanded view of a part of the image data, where the small squares in the figure are pixels and the number display in each square indicates the tone value for the image data for that pixel. As is shown in the figure, the image data tends to have approximately the same (or exactly the same) tone value assigned to adjacent pixels. Recently there has been a tendency towards higher resolution image data, due to demands for higher resolution, and this tendency to have approximately the same or exactly the same tone values assigned to adjacent pixels becomes more apparent the higher the level of resolution of the image data. Moreover, as has already been stated, when converting the resolution of the image data to the printer resolution, if a pixel is split into a plurality of pixels to increase the resolution, the pixels that are generated by splitting off of the same pixel will all have the same tone value.

FIG. 8*b* shows the situation wherein threshold values are established in positions corresponding to the dithering matrix. The tone values of the image data shown in FIG. 8*a* are compared, for each individual pixel, to the threshold values in the dithering matrix shown in FIG. 8*b* to determine whether or not to form dots. FIG. 8*c* shows the results of the determination as to whether or not to form dots, performed for each individual pixel, where the pixels marked by the diagonal lines are the pixels for which it has been determined that dots will be formed.

Here nearby pixels are gathered, a given number of pixels at a time, into groups of pixels, and one can consider counting the number of pixels within the group of pixels for which the decision has been made to form dots. As one example, each group of eight pixels, four pixels in the primary scan direction (the horizontal direction in FIG. 8) and two pixels in the secondary scan direction (the vertical direction in FIG. 8) are grouped together to form the group of pixels. FIG. 8*d* shows the number of dots obtained through counting the number of pixels for which the decision has been made to form dots, for each of the groups of pixels gathered in this way. In the image printing process according to the first embodiment, the multilevel halftoning resultant values provided to the color printer 200 from the computer 100 are data on the number of dots obtained in this way for each group of pixels. The multilevel halftoning resultant values that show the numbers of dots do not include information regarding the pixel positions wherein the dots will be formed. However, doing the following will enable the creation of data that indicates whether or not dots are formed, for the individual pixels, through restoring, from the number of dots, information on the positions of the pixels for which the dots are to be formed.

FIG. 9 is an explanatory diagram showing the situation wherein data is generated that indicates, for the individual pixels, whether or not dots are to be formed, generated from the data indicating the number of dots. FIG. 9a shows the value obtained through counting the number of dots to be formed for each group of pixels in FIG. 8. Moreover, FIG. 9b indicates the dithering matrix that was referenced in order to determine whether or not to form dots for the individual pixels in FIG. 8. In the dithering method described above, the tone values from the image data are compared to the threshold values established at the corresponding pixel positions in the dithering matrix, where the larger the tone value in the image data, the more likely a decision to form a dot at that pixel, and the smaller the threshold value in the dithering matrix, the more likely a dot is to be formed. Given this, the dithering matrix can be thought of as indicating a sequence value for the pixels for which dots are to be formed.

Focusing on these characteristics in the dithering matrix, the decisions as to whether or not to form dots for the individual pixels can be made from the number of dots to be formed within the group of pixels. For example, for the group of pixels at the corner furthest to the upper left in FIG. 9a, three dots are to be formed in this group of pixels. Referencing the dithering matrix shown in FIG. 9b, the pixel position at the upper-left corner within this group of dots, or in other words, the pixel position wherein the threshold value is 1, is the pixel wherein the formation of dots is the most likely. Consequently, of the three dots to be formed within this set of pixels, 1 can be thought of as being formed in the pixel at the upper left. Similarly, for the remaining two dots, the second dot within the group of pixels can be through of as being formed in the next most likely position for the formation of a dot (or in other words, the pixel wherein the dithering matrix threshold value is set as 42 in FIG. 9b) and the third dot can be thought of as being formed in the pixel wherein dot formation is next most likely (the pixel wherein the threshold value has been set to 58.

Of course, whether or not to form dots is influenced not only by the thresholds that have been set for the dithering matrix, but also by the tone values for the image data, and thus if the tone values of the image data are extremely large, then dots may be formed prior to the pixels for which the smallest threshold values are set. However, because there is a tendency to assign tone values that are approximately equal to (or exactly equal to) those of the adjacent pixels in image data, as described above, in most cases dots can be through of as being made beginning with the pixel for which dots can be made most easily (in other words, beginning with the pixel for which the threshold value is low in the dithering matrix.

Even in the other groups of pixels shown in FIG. 9a, similarly, the decision as to whether to form dots, for individual pixels, is made based on the number of dots and on the thresholds in the dithering matrix. For example, when it comes to the group of pixels below the group of pixels described above in FIG. 9a (the second group of pixels on the left edge), there are three dots and by referencing the dithering matrix in FIG. 9b, these three dots can be through of as being formed in the pixel for which the threshold value 22 is established, the pixel for which the threshold value 33 is established, and the pixel for which the threshold value 91 is established.

For the four groups of pixels shown in FIG. 9a, determining the positions of the pixels wherein to form dots from the data on the number of dots in this way enables the results shown in FIG. 9c to be produced. In FIG. 9c, the pixels marked with the diagonal lines are the pixels for which decisions have been made to form dots. As is clear from a comparison of FIG. 9c and FIG. 8c, the distribution of dots determined based on the number of dots is the same distribution of dots determined by comparing the image data and the threshold values for each individual pixel. This shows the ability to determine appropriately whether or not to form dots for each of the individual pixels based on the number of dots and on the dithering matrix, even without knowing the positions of the pixels, merely by referencing the dithering matrix to determine whether or not to form dots for each of the individual pixels and by knowing the number of dots that are to be formed within the group of pixels. Given this, even when the multilevel halftoning resultant values that indicate the number of dots to be formed within the group of pixels are supplied from the computer 100 to the color printer 200 the decisions regarding whether or not to form dots can be made as appropriate on the color printer 200 side, thus enabling high quality printing without a detone in the image quality.

Moreover, in order to determine appropriately, from the number data, the positions of the pixels wherein to form dots, there should be no large variations in the tone values in the image data within the group of pixels. As described above, image data has a characteristic wherein adjacent pixels have similar tone values, where this condition occurs in nearly all cases, and thus even when the multilevel halftoning resultant values indicating the number of dots are provided to the color printer 200 and decisions are made, based on the multilevel halftoning resultant values, as to whether or not to form dots, there will be the ability to print images without a loss of image quality.

In particular, the fulfillment of the following two conditions enables the results of decisions, for each individual pixel, as to whether or not to form a dot, through comparing the tone values of the image data to the dithering matrix threshold value, to obtain absolutely identical dot layouts. The first condition is that all of the pixels within the group of pixels have the exact same tone values, and the second condition is that the dithering matrix referenced when determining whether or not to form dots, for each individual pixel, on the computer 100 side is identical to the dithering matrix referenced for determining the pixel positions, from the number data, on the color printer 200 side. Moreover, as will be described in detail below, in the process of generating the multilevel halftoning resultant values in the present embodiment, the groups of pixels may be split into a plurality of regions to generate the multilevel halftoning resultant values, in which case the tone values for the individual pixels within the split up regions should be identical. For example, even the case wherein each of the pixels within a group of pixels do not have the exact same tone values, splitting the group of pixels into a plurality of regions often can produce cases wherein each of the pixels within a region will have the exact same tone value. Because of this, the image quality can be improved through being able to generate the multilevel halftoning resultant values by splitting the groups of pixels.

Note that in the dithering method explained using FIG. 7 the decision as to whether or not to form dots is performed by comparing the threshold values in the dithering matrix to the tone values of the image data and seeing which values are the largest. In contrast, as was explained in FIG. 9, in the case wherein the determination as to whether or not to form dots for the individual pixels is based on the number of dots, the decision to form dots is made for those pixels wherein the sequence value for forming dots within the group of pixels is lower than the number of dots or equal to the number of dots, and the decision is not to form dots for all other pixels. In other words, there is no need for the threshold values themselves in determining the positions of the pixels, but rather there is only the need to simply know the order in which the dots will be formed within the group of pixels (or in other words, the sequence of dot formation). Given this, instead of the dithering matrix shown in FIG. 9b, the matrix that establishes values indicating the sequence in which the dots are formed (the sequence values) for each of the pixels within the group of pixels, as shown in FIG. 9d (where, in this specification, this type of matrix is termed the "sequence value matrix") is stored in advance, enabling the determination as to whether or not to form dots for the individual pixels to be made while referencing the sequence value matrix for each group of pixels.

In addition, when determining whether or not to form dots based on a dithering matrix in this way, a distribution of dots that is essentially the same as when determining whether or not to form dots through the application of the dithering method can be obtained. Given this, designing the characteristics of the dithering matrix appropriately can control the distribution of the dots. That is, the use of a matrix possessing the so-called blue noise mask characteristics or a matrix possessing the so-called green noise mask characteristics can produce an image wherein the dot distribution is dependent on the characteristics of the dithering matrix, regardless of the processing of the image data by the pixel group unit. This point will be explained somewhat more thoroughly below.

Figure 10:
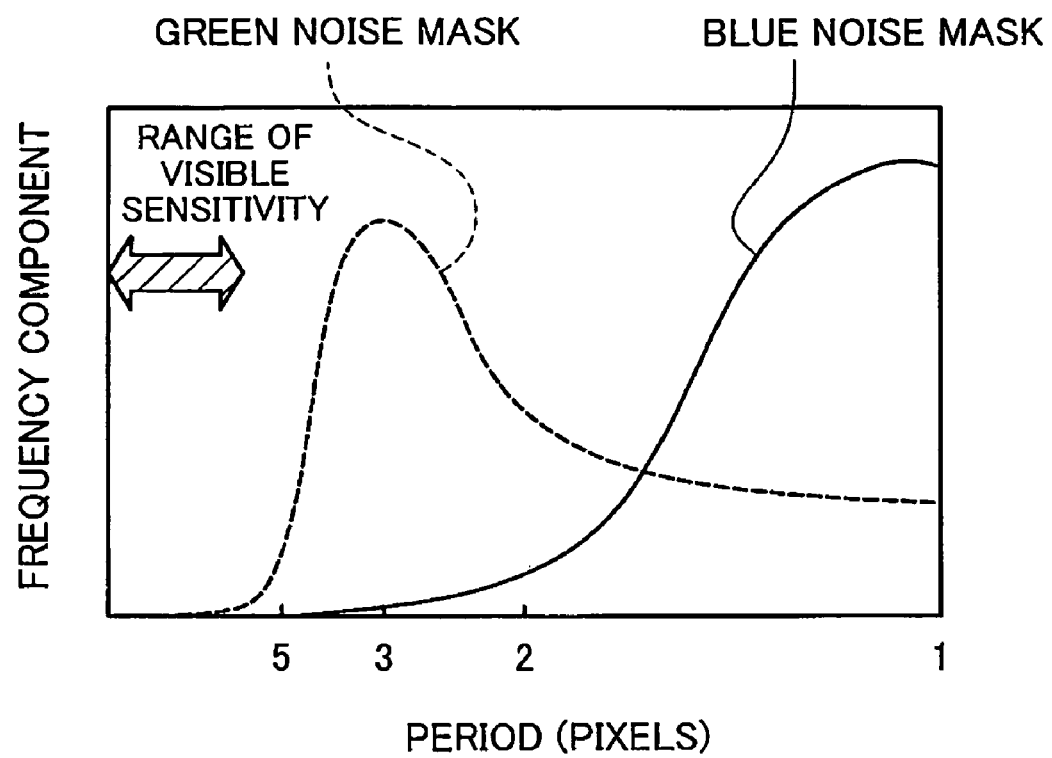
FIG. 10 is an explanatory diagram illustrating conceptually the spatial frequency characteristics of the threshold values set in a matrix for a dithering matrix having blue noise mask characteristics and a dithering matrix having green noise mask characteristics.

FIG. 10 is an explanatory diagram illustrating conceptually the spatial frequency characteristics of the thresholds established in the matrix for a dithering matrix that has blue noise mask characteristics and a dithering matrix that has green noise mask characteristics. In FIG. 10, for the convenience of illustration, the horizontal axis shows the period instead of the spatial frequency. Of course, the shorter the period, the higher the spatial frequency. The vertical axis in FIG. 10 shows the spatial frequency components for each period. Note that the frequency components shown in the figure are shown in a state wherein they have been smoothed so that, to some degree, the changes are smooth.

The solid line in the figure shows, conceptually, the spatial frequency components of the blue noise mask. As is shown in the figure, the blue noise mask has a frequency component that is the largest in a high frequency domain wherein the length of one period is less than two pixels. The blue noise mask threshold is set so as to have this type of spatial frequency characteristic, and thus when there is a determination as to whether or not to form dots, based on the blue noise mask, there will be a tendency to form dots that are separated from each other. Conversely, the dotted line in the figure shows, conceptually, the spatial frequency component of the green noise mask. As can be seen in the figure, the green noise mask has a frequency component that is the largest in the medium frequency domain wherein one period length is between two pixels and ten pixels. Because the green noise mask thresholds are set so as to have this type of spatial frequency characteristic, when determining whether or not to form dots based on the green noise mask, there is a tendency to form dots in a state wherein, over all, dots will be formed adjacent to each other in several-dot units, where these aggregations of dots will be scattered.

Consequently, determining the number data for the groups of pixels, or determining the pixel locations, based on dithering matrices having these types of blue noise mask characteristics or green noise mask characteristics enables the creation of dots so as to have a distribution that reflects the blue noise mask characteristics or green noise mask characteristics, regardless of the processing on the pixel group unit.

In the explanation above, it was explained that the decisions whether or not to form dots, for each of the individual pixels, was performed using a sequence value matrix corresponding to the group of pixels, after having received number data for the group of pixels, with a plurality of types of sequence value matrices, generated based on dithering matrices, stored in advance, as shown in FIG. 9. However, the determination as to whether or not to form dots can be performed more simply as follows. A plurality of sequence value matrices are stored in advance, and when the number data is obtained, one of the sequence value matrices, selected at random, is used for the group of pixels in order to make the determination as to whether or not to form dots for the individual pixels. Even more simply, only one sequence value matrix may be stored in advance to make the determination as to whether or not to form dots for the individual pixels using this matrix.

Figure 11:
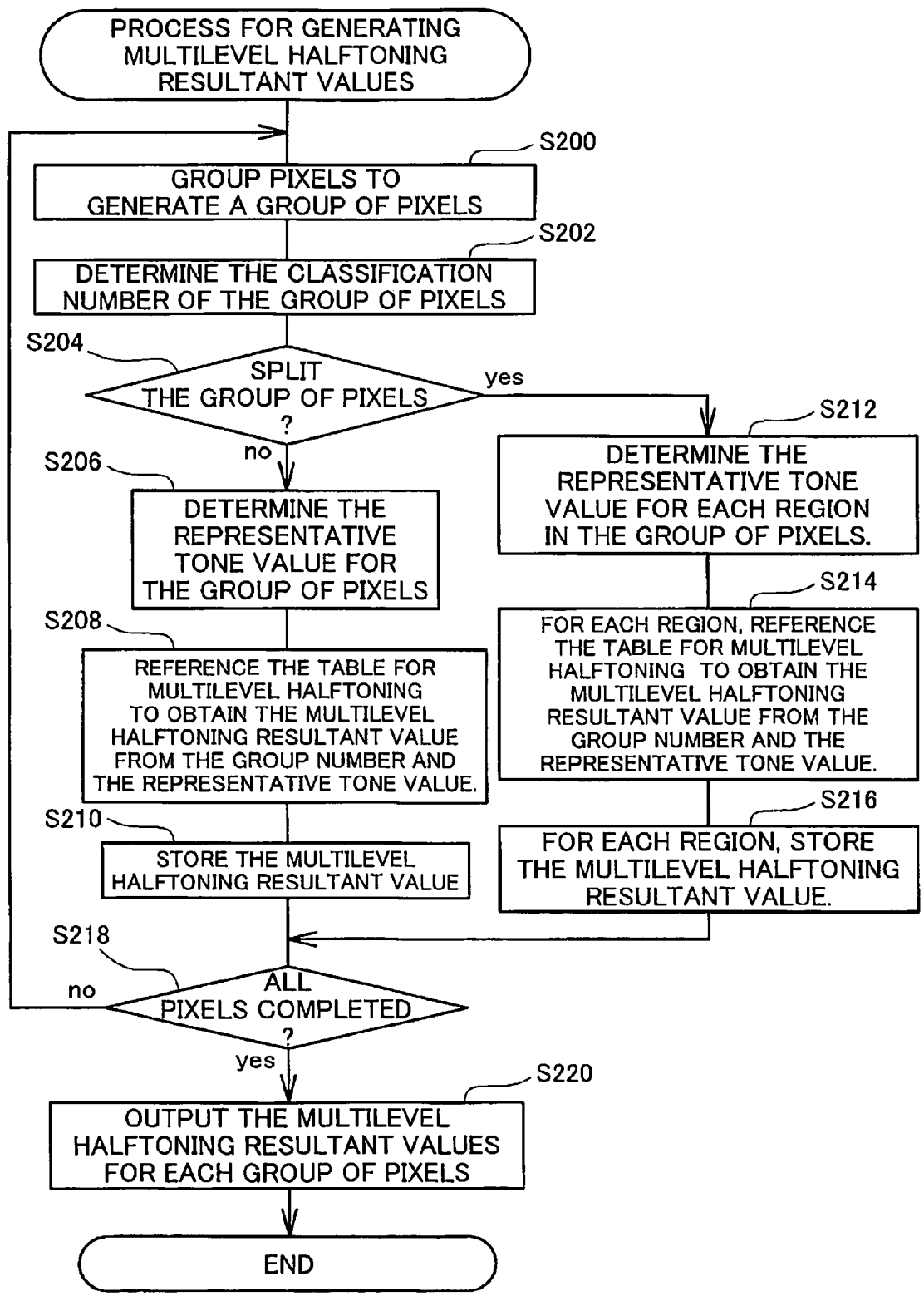
FIG. 11 is a flow chart illustrating the flow of the multilevel halftoning resultant value generation process in a first embodiment.

C-2. Process for Generating Multilevel Halftoning Resultant Values According to the First Embodiment The process for generating the multilevel halftoning resultant values from the image data (Step S106) in the image printing process according to the first embodiment, shown in FIG. 5, will be described below. FIG. 11 is a flow chart illustrating the flow of the process for generating the multilevel halftoning resultant values in the first embodiment. Here the explanation will be of the process for generating the multilevel halftoning resultant values being performed in a computer 100, but, as will be explained below, the process for generating the multilevel halftoning resultant values can use a simple process, and thus can be performed within a color printer 200, a digital camera 120, or the like. The explanation below will follow the flow chart.

When the process for generating the multilevel halftoning resultant values in the first embodiment is started, first a certain number of neighboring pixels are grouped to produce a group of pixels (Step S200). Here a total of eight pixels, four pixels in the primary scan direction and two pixels in the secondary scan direction, are grouped into the group of pixels. Note that the pixels that are grouped as a group of pixels need not necessarily be pixels wherein the positions in the vertical and horizontal directions are lined up to form a rectangle, but instead any pixels can be grouped together to form a group of pixels insofar as the pixels are neighboring each other and have a specific positional relationship.

Next the classification number of the group of pixels is determined (Step S202). Although the significance of the classification number will be explained below, at this point the classification number can be considered to be a number that is used for identifying the group of pixels. The classification number of the group of pixels can be determined extremely easily using a method described below.

Next a decision is made, based on the tone values of the individual pixels that are grouped into the group of pixels, as to whether or not to split the group of pixels (Step S204), and if the decision is to not split the group of pixels (Step S204: NO), a representative tone value is determined for the group of pixels (Step S206). On the other hand, if the decision is to split the group of pixels (Step S204: YES), then representative tone values are determined for each of the regions generated by splitting the group of pixels (S212). Although there may be a variety of different states in which the groups of pixels may be split, or in other words, a variety of settings in terms of the number of regions, and sizes thereof, generated through splitting the groups of pixels, at this point, for convenience in understanding, the explanation will be for the simplest state, that state wherein the group of pixels is split into two equal regions, a left region and a right region.

FIG. 12 is an explanatory diagram illustrating, conceptually, the situation wherein a decision is made as to whether or not to split the group of pixels, based on the tone values of the individual pixels that are grouped together into the group of pixels, and the representative tone value is determined. The large rectangles shown in the figure represent groups of pixels, and the small squares within the groups of pixels represent individual pixels. Moreover, the numbers that are displayed within the squares that represent the pixels represent the tone values for the image data which is assigned to the individual pixel. As is shown on the left side of FIG. 12a, if each of the pixels within the group of pixels has the same tone value, then the decision is to not split the group of pixels, and the tone value of each of the pixels is used as the representative tone value of the group of pixels. The right side of FIG. 12a shows, conceptually, the situation when the tone value of each of the pixels is determined as the representative tone value of the group of pixels.

As was described above, there is a tendency for adjacent pixels in image data to assume similar tone values, and so the tone values of the individual pixels within a group of pixels will often assume a distribution as shown in FIG. 12a. Moreover, if, in the process for converting the resolution of the image data to the printer resolution, a single pixels is split into a plurality of pixels in order to increase the resolution, most of the groups of pixels will assume this type of distribution of tone values. Moreover, if, when converting the resolution, a single pixel is split into four pixels in the primary scan direction (the horizontal direction in the figure) and split into two pixels in the secondary scan direction (the vertical direction in the figure) to increase the resolution, then all of the groups of pixels, of necessity, will assume the tone value distribution shown in FIG. 12a.

In contrast, if, as shown in FIG. 12, the tone values are split in two at the center of the group of pixels so that the region on the right is different than the region on the left, then the group of pixels may be split into two regions, on the left and the right. As is shown in FIG. 12b, the tone value in the region on the left of the group of pixels is 97, while the tone value in the region on the right is 135, and thus the representative tone values for the respective regions are the tone values 97 and 135. Moreover, even in this type of case, if there is not a large difference between the respective tone values of the left and right regions (for example, if the difference in tone values in no more than a specific value) then a decision may be made so as to not split the group of pixels. The tone value of either the left or the right region may be used as the representative tone value in such a case. Conversely, the average of the tone values may be used as the representative tone value, or the tone value that occurs in the highest number of pixels within the group of pixels may be used as the representative tone value.

Moreover, when converting the resolution of the image data to the printer resolution, frequently the resolution must be converted to at least twice as high in the primary scan direction. When this type of resolution conversion is performed, two pixels are generated in the primary scan direction from one pixel, and thus even in the case wherein there are different tone values for the individual pixels in the group of pixels, the distribution of tone values, as shown in FIG. 12b, will often be distributed so as to be divided into left and right sides at the center of the group of pixels. In particular, when a conversion is performed so as to double the resolution in not just the primary scan direction but in the secondary scan direction as well, a single pixel is converted into four pixels, two each in the vertical and horizontal directions, and thus even if different tone values are included within the group of pixels, of necessity the tone value distribution will be as shown in FIG. 12b.

Of course, when there is a distribution of tone values within the group of pixels, the distribution will not necessarily be as shown in FIG. 12b. For example, even when a resolution conversion has been performed so as to produce two pixels, lined up in the primary scan direction, from one pixels, if the tone values of the original pixels are different in the secondary scan direction, then there will be the tone value distribution such as shown in FIG. 12c. At this point, for convenience in understanding, the form wherein the group of pixels are split (the split pattern) in the present embodiment can assume only the pattern of two equal regions on the left and the right, and thus, in this type of tone value distribution, the decision is to split in the pattern shown in FIG. 12b, and for the representative tone value for the region on the left, any of the tone values included in the region may be selected. Note that when the tone value 135 is selected at this time, the representative tone values for both the left and right hand side regions will be the tone value 135, and so combining these regions enables the handling to be performed in the same manner as for the case wherein the decision was to not split the group of pixels.

Conversely, because the region on the left contains two tone values, tone values 97 and 135, the average of these tone values may be used as the representative tone value. When calculating the average value, either the average of the tone values may be calculated simply, or else a weighting that is appropriate to the number of pixels at each of the tone values may be applied to calculate the average. The right side of FIG. 12 illustrates, conceptually, the situation wherein the representative tone value of the region on the left is determined in this way.

Of course, the conversion to the printer resolution is not limited to a conversion that increases the resolution through splitting pixels, but rather there is the case wherein interpolation calculations are performed to generate new tone values between pixels, and also the case wherein resolution is reduced by selecting pixels with a specific ratio. In these cases, the tone value distribution within the groups of pixels can be considered to assume a variety of forms. FIGS. 12d through 12f show the situations wherein the representative tone values are determined after determining whether or not to split the groups of pixels when the tone value distributions assume these different forms.

For example, as shown in FIG. 12d, while the tone values are not necessarily always split into left and right regions exactly in the center, when divided in roughly the center, the group of pixels can be divided into two equal regions on the left and the right. Conversely, as is shown in FIG. 12e, in the case wherein some of the pixels within the group of pixels assume a different tone value while the rest of the group of pixels has the same tone value, the decision may be to not split the group of pixels. Moreover, as is shown in FIG. 12f, in the case wherein the tone value distribution has a tone, the group of pixels may be split into two regions, the left and the right. At this time, the average value of the tone values within each individual region can be used as the representative tone value for the respective region. Conversely, the tone values of pixels selected from each of the regions may be used as the representative tone values. Even in the case wherein the tone value distribution within a group of pixels has a tone, if the tone is small (for example, if the difference in the tone values within the group of pixels is less than a specific value) a decision can be made to not split the group of pixels.

Moreover, more generally a decision may be made as to whether or not there is an edge within the group of pixels, and to split the group of pixels if there is an edge. When determining whether or not there is an edge, an edge can be determined if the difference between tone values within a group of pixels exceeds a specific value. Conversely, a so-called differential-type image filter may be used to judge the edge in a group of pixels that includes pixels wherein the absolute value of the differential value is greater than a specific amount.

In Steps S204, S206, and S212, shown in FIG. 11, the decision as to whether or not to split the group of pixels is performed based on the tone values of the individual pixels within the group of pixels, and if the decision is not to split the group of pixels (S204: NO), a representative tone value is determined for the group of pixels (S206), where, if the decision is to split the group of pixels (S204: YES) then the group of pixels is split and a process is performed to determine representative tone values for each of the regions generated (S212).

In this way, a classification number is determined for the group of pixels, and after either one representative tone value or a plurality of representative tone values (two tone values in the present embodiment) have been determined for the group of pixels, then a table for multilevel halftoning, described below, is referenced to convert the representative tone value or values into a multilevel halftoning resultant value or values (Step S208 or Step S214).

As will be described in detail below, the table for multilevel halftoning stores, in advance, appropriate multilevel halftoning resultant values by establishing associations with combinations of classification numbers for groups of pixels and representative tone values. Consequently, finding the classification number and the representative tone value can make it possible to find immediately the multilevel halftoning resultant value by referencing the table for multilevel halftoning. Moreover, when the group of pixels is split, this corresponds to obtaining a plurality (two in present embodiment) of representative tone values, and a plurality of multilevel halftoning resultant values are obtained for the group of pixels.

Once the multilevel halftoning resultant values have been found as described above, the multilevel halftoning resultant values obtained for the groups of pixels are stored (Step S210). The data format for storing the multilevel halftoning resultant values will be described below. Next a decision is made to whether or not processing has been completed for all of the pixels in the image data (Step S218), and if there are pixels remaining to be processed (Step S218: NO), the processing returns to Step S200, a new group of pixels is generated, and the series of processes iterates thereafter. When these operations are iterated and a decision is made that processing has been completed for all of the pixels (Step 218: YES) then the multilevel halftoning resultant values that have been obtained are outputted to the color printer 200 (Step S220) and the multilevel halftoning resultant value generation process in the first embodiment, shown in FIG. 11, is completed.

C-3. Method of Determining Classification Numbers

Here the method for determining the classification number of the group of pixels, in the process for generating the multilevel halftoning resultant values according to the first embodiment, described above, will be explained. In the below, first the approach to assigning classification numbers to the groups of pixels will be explained, followed by an explanation of the specific method for assigning the classification numbers.

Figure 13A:
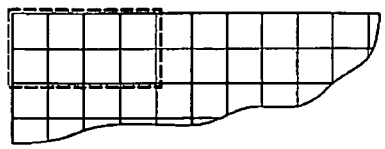
FIG. 13a through FIG. 13c are explanatory diagrams illustrating the approach to determining the classification numbers for each group of pixels.

FIG. 13 is an explanatory diagram illustrating the way of thinking for determining the classification numbers for each of the groups of pixels. FIG. 13a illustrates, conceptually, the situation wherein one group of pixels is generated by grouping together eight pixels, four pixels in the horizontal direction×two pixels in the vertical direction, in the top leftmost corner of the image.

Figure 13B:
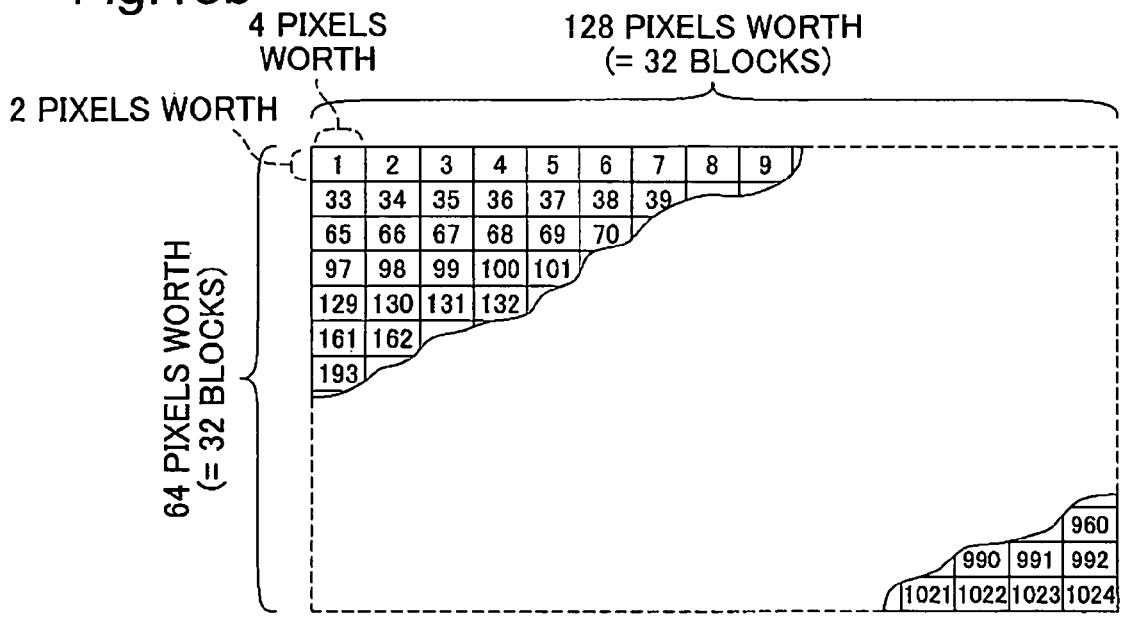

As was described above, a decision is made as to whether or not to form dots for each individual pixel by comparing, using the dithering process, the tone value for the image data assigned to a pixel to the threshold value established in the corresponding position in the dithering matrix. On the other hand, in the present embodiment, a specific number of adjacent pixels are gathered into a group of pixels, so blocks are produced by gathering together a specific number of threshold values, established in the dithering matrix as well, in the same number as in the group of pixels. FIG. 13b illustrates the situation wherein a plurality of blocks is generated by grouping together the threshold values, established in the dithering matrix shown in FIG. 6, in groups that are four in the horizontal direction and two in the vertical direction. The dithering matrix shown in FIG. 6 is 128 pixels in the horizontal direction (the primary scan direction) and 64 pixels in the vertical direction (the secondary scan direction) and so is provided with 8192 pixels worth of threshold values, and thus, if these threshold values are grouped into blocks that are four each in the horizontal direction and two each in the vertical direction, the dithering matrix will be divided into a total of 1024 blocks, 32 blocks both the vertical direction and the horizontal direction.

Figure 13C:
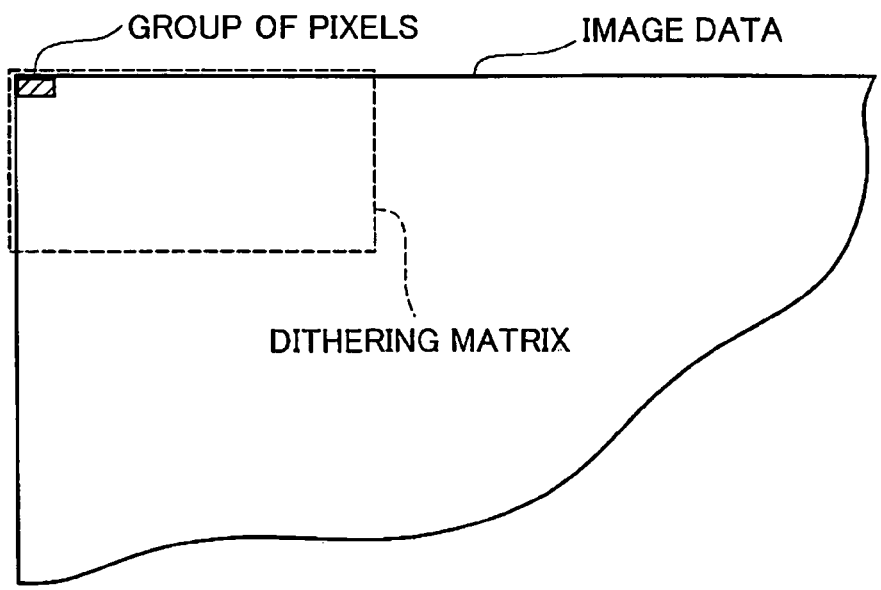

Now, as shown in FIG. 13b, these blocks are assigned serial numbers ranging from 1 through 1024. When the dithering matrix is applied to the image data, the serial numbers of the blocks that are applied to the positions of each of the groups of pixels are used to categorize the groups of pixels. For example, as is shown in FIG. 13c, the block with serial number 1 in FIG. 13b is applied to the group of pixels at the upper leftmost corner of the image, and so the group of pixels is categorized into a group of pixels with classification number 1.

the above is the fundamental approach when categorizing the groups of pixels. In Step S202 in FIG. 11, when the dithering matrix is applied to the image data in this way, each group of pixels is categorized by the serial number of the block that is applied to the group of pixels to perform the process of determining the corresponding classification numbers and assigning them to the groups of pixels.

The specific methods for determining the classification numbers of group of pixels will be explained next. FIG. 14 is an explanatory diagram showing the method for determining a classification number for a group of pixels. FIG. 14a illustrates a single group of pixels generated in the image. The method of determining the classification number will be explained here focusing on this group of pixels. Note that in the below, the group of pixels that is the focus for determining the classification number will be termed the "target group of pixels."

At this point, taking the upper leftmost corner of the image as the origin, the pixel positions are expressed in terms of the number of pixels from the origin the in primary scan direction and the secondary scan direction. Moreover, the position of the group of pixels is expressed by the pixel position of the pixel in the upper left corner of the group of pixels. FIG. 14a shows a black circle on the pixel that indicates the position of the target group of pixels. The pixel position of this pixel is defined as X,Y because the size of each of the groups of pixels is four pixels in the primary scan direction and two pixels in the secondary scan direction, there is an n and an m (where n and m are positive integers, no less than 0) such that X=4n+1 and Y=2 m+1. In other words, n groups of pixels are lined up on the left side of the target group of pixels, and m groups of pixels are lined up above the target group of pixels.

When the dithering matrix is applied to the image data, as described above, the group of pixels is categorized based on the serial number of the block that is applied to the target group of pixels (see FIG. 13), and so a method that applies the dithering matrix to the image data while moving the dithering matrix will categorize even the same group of pixels into categories with different classification numbers. In practice, any method wherein the dithering matrix is applied to the image data while moving may be used, but here, for convenience in explanation, the most simple method, or in other words, the movement of the dithering matrix in the sideways direction, will be explained. FIG. 14 illustrates, conceptually, the situation wherein the dithering matrix is moved a bit at a time in the sideways direction while being applied iteratively to the image data.

14c illustrates, conceptually, the case wherein the dithering matrix is applied to the target group of pixels, shown in FIG. 14a, while using the dithering matrix iteratively as shown in FIG. 14b. When the dithering matrix is moved in this way, one of the blocks in the dithering matrix is applied to the target group of pixels. Here the row M, N block within the dithering matrix is applied to the target group of pixels. At this time, there are n groups of pixels on the left side of the target group of pixels, and n groups of pixels above the target group of pixels, as shown in FIG. 14a, and thus there is the relationships of $$N = n - int(n/32) \times 32 + 1 \text{ and}$$

$$M = m - int(m/32) \times 32 + 1$$

between N and n and between M and m, respectively. Here the int is an operator indicating integerizing through truncating any fractional part after the decimal. In other words, int (n/32) represents the integer portion obtained through truncating the numbers after the decimal point from the results of the n/32 calculation. In this way, if the position of the target group of pixels is known, then the block number of the block that is the M row and N column of the dithering matrix, where the values for M and N are calculated from the relationship described above and shown in FIG. 14, are used as the classification number for the target group of pixels. Most practically, the values for M and N can be calculated extremely conveniently, even without performing the calculations as shown in FIG. 14d.

FIG. 15 is an explanatory diagram showing, in specifics, the method of determining the classification number for the target group of pixels. With the position of the target group of pixels defined as (X, Y), X and Y are expressed with 10 bits. (a) in FIG. 15 illustrates, conceptually, ten bits of binary data expressing the value X. In the figure, ten serial numbers, 1 through 10 are assigned, from the first bit through the last bit in order to identify each bit.

As described above using FIG. 14, the quantity n of the groups of pixels to the left of the target group of pixels can be obtained by subtracting 1 from the quantity X and then dividing by four. Here the division by 4 can be performed by shifting two bits worth to the right, and thus 1 should be subtracted from the quantity X and the binary data thus obtained should be shifted by two bits worth to the right. Moreover, the quantity X does not take an arbitrary value, but rather is, of necessity, a value that can be expressed by the formula 4n+1, and so the quantity of groups of pixels n can be obtained through merely bit shifting the binary data two bits worth to the right, without subtracting the 1. (b) in FIG. 15 illustrates, conceptually, the binary data for the quantity n obtained through bit shifting the quantity X in this way.

Next, int (n/32) will be calculated. In to other words, an operation is performed wherein the quantity n is divided by 32 and any digits after the decimal point are truncated. Dividing by 32 can be performed by bit shifting the binary data by five bits worth to the right, and if the data is handled in an integer format, the numbers after the decimal point will be truncated automatically. Essentially, the binary data for int (n/32) can be obtained through simply bit shifting the binary data for the quantity n by five bits to the right. (c) in FIG. 15 illustrates, conceptually, the binary data for int (n/32) obtained through bit shifting the quantity n.

The int (n/32), obtained in this way, is multiplied by 32. Multiplying by 32 can be performed by bit shifting the binary data by five bits to the left. (d) in FIG. 15 illustrates, schematically, the binary data for int (n/32)×32, obtained by bit shifting the quantity n.

Following this, the quantity N, described above, can be obtained by subtracting the quantity n from int (n/32)×32. As is clear by comparing the binary data for the quantity n (see (b) in FIG. 15) with the binary data for int (n/32)×32 (see (d) in FIG. 15), these two binary data are the same in the top five bits, but the value on the side where the subtraction has been performed is 0 for all of the last five bits. Consequently, extracting the bottom five bits from the quantity on the subtraction side (the number n) can produce the desired quantity M. In other words, by merely calculating the logical product of the binary data shown in (b) of FIG. 15 and the mask data shown in (f) of FIG. 15, the quantity N can be obtained extremely easily. Conversely, the quantity N can be obtained through also extracting directly the fourth through eighth bit data through the logical product of the binary data for the quantity x, which indicates the position of the target group of pixels in (a) in FIG. 15, by the mask data such as in (g) in FIG. 15.

While in FIG. 15 there was an explanation of the case wherein the quantity N, which indicates the block position within the dithering matrix, is calculated from the quantity X of the coordinate values (X, Y) that indicate the position of the group of pixels of interest, and the quantity M, which indicates the block position, can be calculated in the exact manner from the quantity Y. Fundamentally, if the position of the target group of pixels is known, then it is possible to know the corresponding block in terms of row and column of the target pixel in the dithering matrix by merely extracting from the binary data the data for the specific bit position, and possible to determine rapidly the classification number of the target group of pixels from the serial number of this block.

C-4. Table for Multilevel Halftoning

As was explained above using FIG. 11, in Step S206 or Step S214 of the process for generating the multilevel halftoning resultant values in the first embodiment performs multilevel halftoning of the representative tone value through referencing a table for multilevel halftoning from the classification number of the group of pixels, obtained in this way, and the representative tone value.

FIG. 16 is an explanatory diagram that illustrates, conceptually, the table for multilevel halftoning in the first embodiment, referenced in order to obtain the multilevel halftoning resultant values from the classification number and representative tone value for the group of pixels. As is shown in the figure, relationships are established in the table for multilevel halftoning, in the first embodiment, with combinations of classification numbers of groups of pixels and representative tone values, where the appropriate multilevel halftoning resultant values are stored. As was described using FIG. 13, there the group of pixels is categorized into any of classification numbers 1 through 1024. Moreover, if the image data is 1-byte data, then the representative tone value will be a tone value between 0 and 255, and thus there will be 1024×256=262,144 combinations of classification numbers and representative tone values. Multilevel halftoning resultant values for all of these combinations are stored in the table for multilevel halftoning. Note that in the present embodiment the multilevel halftoning resultant values are stored in a table that uses the classification number and the representative tone values as the respective parameters, but it is not necessarily a requirement to store the multilevel halftoning resultant values in the form of a table insofar as it is possible to determine the one corresponding multilevel halftoning resultant value given that the classification number and the representative tone value have been determined.

Figure 17:
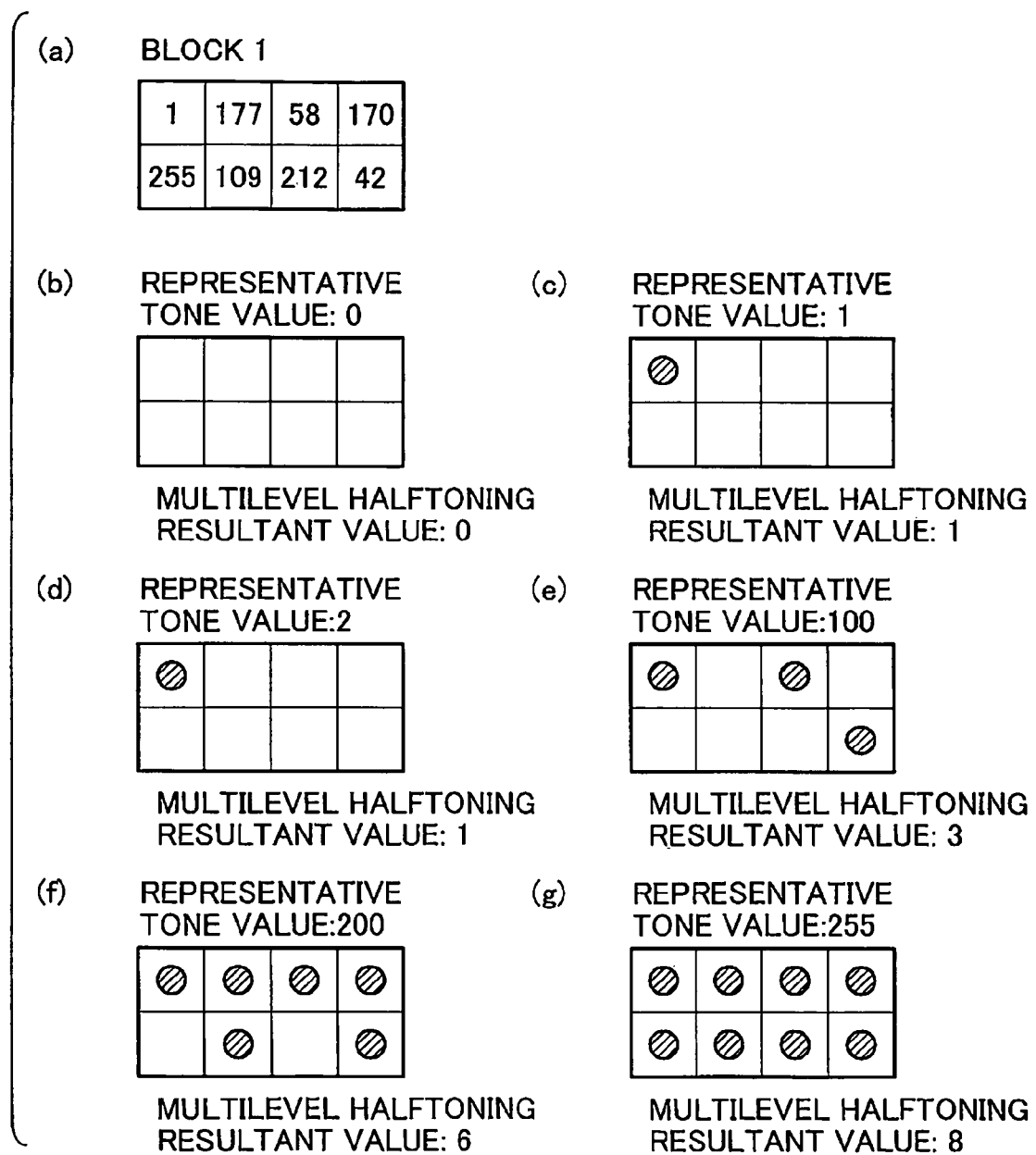
FIG. 17 is an explanatory diagram illustrating conceptually the situation wherein an appropriate multilevel halftoning resultant value is determined according to a combination of the representative tone value and the classification number for a group of pixels.

FIG. 17 is an explanatory diagram illustrating, conceptually the situation wherein the appropriate multilevel halftoning resultant value is determined according to a combination of the classification number of the group of pixels and the representative tone value. As one example, the classification number of the group of pixels shall be assumed to be 1. The block with the serial number of 1 in the dithering matrix is applied to the groups of pixels that have the classification number 1. (a) in FIG. 17 shows the threshold values that are established for the block with the serial number of 1.

Here let us assume that the representative tone value in 0. In this case, all of the pixels in the group of pixels have image data with a tone value of 0. Comparing the tone values of the individual pixels (which are each 0) with the threshold values shown in FIG. 17 (a), the determination is made to form dots for any pixels wherein the tone value is the larger (or the same). After the determination has been performed for each of the individual pixels in the group of pixels, the number of dots is counted, and the number that is obtained is defined as the multilevel halftoning resultant value. All of the threshold values shown in (a) in FIG. 17 are greater than the tone value 0, and thus there are no pixels for which the decision is to form a dot. Given this, the multilevel halftoning resultant value of 0 is set for the combination of the representative tone value of 0 and the classification number. (b) in FIG. 17 shows, conceptually, the situation wherein 0 has been determined as the multilevel halftoning resultant value for the representative tone value 0 in this way.

(c) in FIG. 17 illustrates, conceptually, the situation wherein the multilevel halftoning resultant value is determined for a representative tone value 1 and classification number 1. In this case, all of the pixels in the group of pixels have image data with tone values of 1, and the tone values for the individual pixels are compared to the thresholds shown in (a) in FIG. 17. The result, in the pixel at the upper left corner within the group of pixels is that the tone value for the image data is equal to the threshold value, and so it is determined that a dot will be formed, where, for the other pixels, it is determined that no dots will be formed. The circle marked with the diagonal lines, shown in (c) of FIG. 17 indicates that the decision is that a dot will be formed in that pixel. The result is that, for the combination of the classification number of 1 and the representative tone value of 1, the multilevel halftoning resultant value is set to 1.

The multilevel halftoning resultant values are determined by performing these operations for all representative tone values from 0 to 255. For example, if the representative tone value is 2, then, as shown in (d) in FIG. 17, the multilevel halftoning resultant value would be 1, and if the representative tone value were 100, then, as shown in (e) in FIG. 17, the multilevel halftoning resultant value would be 3. (f) in FIG. 17 and (g) in FIG. 17 illustrate, conceptually, a situation wherein the multilevel halftoning resultant values are determined for the cases wherein the representative tone value are 200 and 255, respectively. The multilevel halftoning resultant values that are set up corresponding to the respective representative tone values in the part of the table for multilevel halftoning, shown in FIG. 16, that is the row (the field that extends in the horizontal direction in the figure) that applies to classification number 1 are values determined in this way. Repeating these operations for all of the classification numbers from 1 through 1024 can ultimately determine the multilevel halftoning resultant values for all possible combinations of classification numbers and representative tone values. The multilevel halftoning resultant values that correspond to the combinations of classification numbers and representative tone values are stored in advance in the table for multilevel halftoning shown in FIG. 16.

C-5. Data Format for the Multilevel Halftoning Resultant Values

As described above using FIG. 11, in Step S210 or Step S216 in the process of generating the multilevel halftoning resultant values in embodiment 1, the multilevel halftoning resultant values obtained are stored, and then, in Step S220, the multilevel halftoning resultant values that have been stored are outputted to the color printer 200. If a group of pixels has not been split, then a single multilevel halftoning resultant value is outputted for the group of pixels, but if a group of pixels has been split, then a plurality of multilevel halftoning resultant values (two multilevel halftoning resultant values in the present embodiment) will be outputted for the group of pixels. Here, as shown in FIG. 16, the table for multilevel halftoning, which is referenced in order to obtain the multilevel halftoning resultant values, is still referenced regardless of whether or not the group of pixels has been split, and as a result, the same types of multilevel halftoning resultant values are obtained regardless of whether or not a group of pixels has been split. Given this, the multilevel halftoning resultant values obtained in Step S210 or Step S216 in FIG. 11 are stored with the following data format in order to discriminate between the multilevel halftoning resultant values obtained for whole groups of pixels and multilevel halftoning resultant values obtained for individual regions within groups of pixels.

Figure 18:
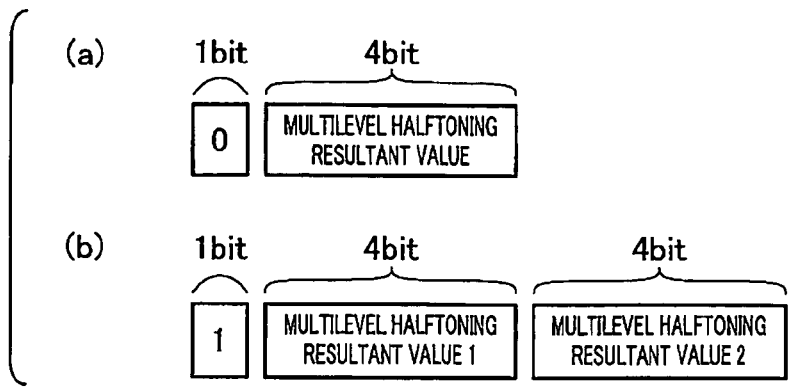
FIG. 18 is an explanatory diagram illustrating one example of a data format for storing the multilevel halftoning resultant values.

FIG. 18 is an explanatory diagram illustrating an example of a data format for storing the multilevel halftoning resultant values. In the example in the figure, the multilevel halftoning resultant value is stored in a state wherein a bit that indicates whether or not the group of pixels has been split is added to the beginning of the multilevel halftoning resultant value. If, for example, the group of pixels has not been split, the one bit of value (0) data is added to the beginning of the multilevel halftoning resultant value, as shown in (a) in FIG. 18. Here the groups of pixels are structured from eight individual pixels, and the multilevel halftoning resultant values represent the number of dots that will be formed within the group of pixels, and thus, as described above, 4 bits are sufficient for a single multilevel halftoning resultant value. Consequently, for those groups of bits that are not split, the multilevel halftoning resultant value will be stored with a total of five bits of data, including the additional one bit at the beginning.

Moreover, when the group of pixels has been split, the multilevel halftoning resultant values are stored sequentially for the respective regions following one bit of value (1) data, as shown in (b) in FIG. 18. In the present embodiment, the only splitting pattern is one wherein the group of pixels is split into two regions, one on the left and one on the right, and so if the first bit is 1, then two multilevel halftoning resultant values, each comprising four bits, will follow, corresponding to the left and right regions.

Consequently, for a group of pixels that has been split, the multilevel halftoning resultant values will be stored with a total of nine bits of data. Note that the patterns for splitting groups of pixels are not necessarily limited to patterns wherein the group of pixels is split into regions, but rather splitting into a larger number of regions is also possible. For example, if the group of pixels is split into four regions, then following the one bit of data indicating that the group of pixels is split there would be four sets of 4-bit data indicating the multilevel halftoning resultant values for the respective regions, so that the multilevel halftoning resultant values would be stored in data totaling 17 bits long.

Figure 19:
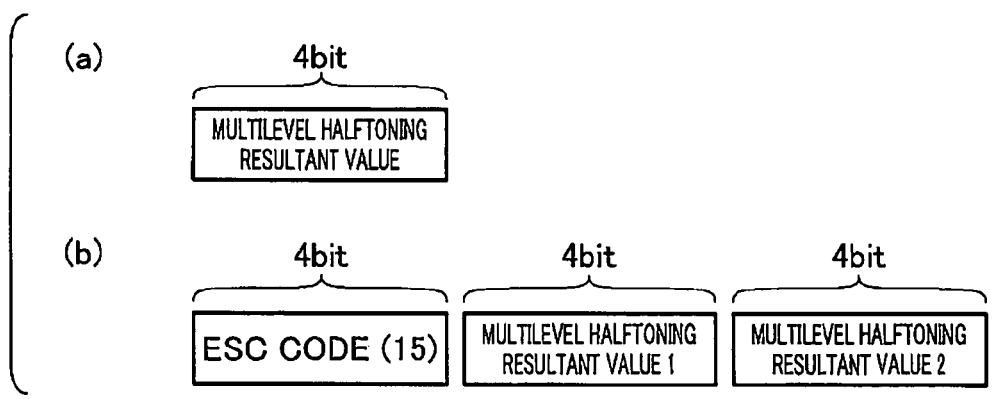
FIG. 19 is an explanatory diagram illustrating another example of a data format for storing the multilevel halftoning resultant values.

FIG. 19 is an explanatory diagram illustrating another example of a data format for storing the multilevel halftoning resultant values. As is shown in the figure, the multilevel halftoning resultant values may be stored along with data indicating that there has been a split only when the group of pixels has been split. In other words, for those groups of pixels that have not been split, only the multilevel halftoning resultant values are stored as is, as shown in (a) in FIG. 19. On the other hand, for those pixels that have been split, the multilevel halftoning resultant values for the individual regions may be stored following special data that indicates that the group of pixels has been split, such as shown in (b) in FIG. 10. It does not matter what data is used as the special data that indicates that the group of pixels has been split (where this type of data is termed an "ESC code," below) insofar as the data can be discriminated from the multilevel halftoning resultant values. For example, in the present embodiment, the multilevel halftoning resultant values are expressed in 4-bit data, and so there are 16 different states that can be expressed; however, the multilevel halftoning resultant values can actually only assume one of nine different states, and thus it is calculated that there are five unused states leftover. Given this, one of the unused states can be selected for use as the ESC code that indicates that a group of pixels has been split. In the example shown in FIG. 19, data wherein all four bits are 1's (which, in decimal notation, is a 15) is used as the ESC code.

Figure 20:
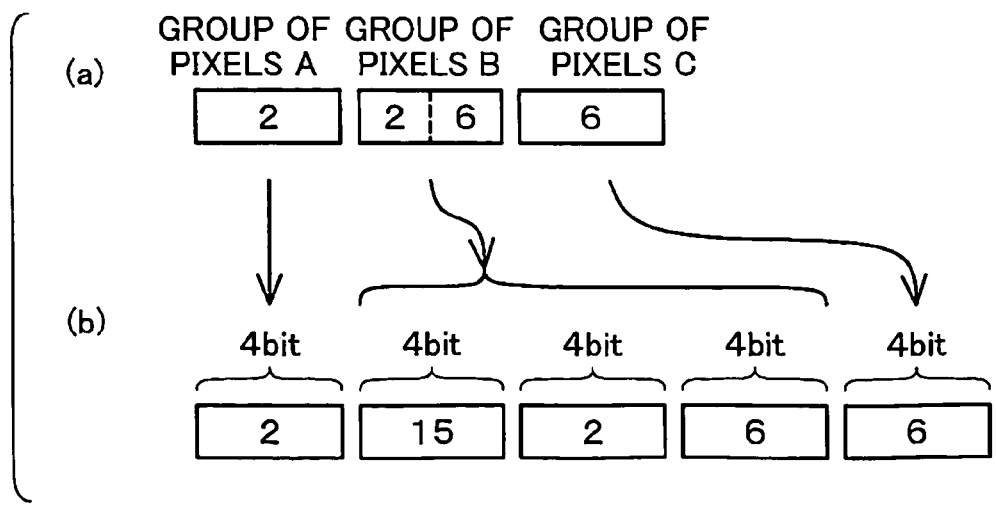
FIG. 20 is an explanatory diagram showing the situation wherein the multilevel halftoning resultant values are stored along with ESC codes.

FIG. 20 is an explanatory diagram showing the state wherein the multilevel halftoning resultant value is stored along with an ESC code.

The example shown in (a) in FIG. 20 assumes that there are three groups of pixels, and that the center group of pixels has been split. The multilevel halftoning resultant value obtained for the group of pixels on the left is 2, the multilevel halftoning resultant value obtained for the group of pixels on the right is 6, and the respective multilevel halftoning resultant values obtained for the group of pixels in the middle are 2 and 6. When storing these multilevel halftoning resultant values, the group of pixels on the left have not been split, so the multilevel halftoning resultant value of 2 is first stored as is. The next group of pixels has been split, and so first the ESC code 15, which indicates that the group of pixels has been split is stored, followed by the multilevel halftoning resultant value 2, which was obtained for the region on the left, and then by the multilevel halftoning resultant value 6, which was obtained for the region on the right. In other words, for a group of pixels that has been split, the data length is the same as that of three groups of pixels that have not been split. Following this, the multilevel halftoning resultant value is stored for the group of pixels on the right. Because this group of pixels has not been split, the multilevel halftoning resultant value 6 that has been obtained may be stored as is.

When storing the multilevel halftoning resultant values, either the data format shown in FIG. 18 or the data format shown in FIG. 19 may be used, and there will be the following characteristics depending on the format of the data that is used. That is, given the data format in FIG. 18, one bit of data may be added, in addition to the multilevel halftoning resultant values for each region, to indicate that a group of pixels has been split, while, in contrast, in the data format according to FIG. 19, it is necessary to add a 4-bit ESC code to the multilevel halftoning resultant values for each region. Because of this, the use of the data format in FIG. 18 makes it possible to conserve three bits worth of data per group of pixels for those groups of pixels that are split. On the other hand, for those groups of pixels that are not split, in the data format in FIG. 18 it is necessary to add, to the multilevel halftoning resultant value for the group of data, one bit of data indicating that the group of data is not split, where, in contrast, in the data format in FIG. 19 the multilevel halftoning resultant value for the group of data can be stored as is. Consequently, for those groups of pixels that are not split, the use of the data format in FIG. 19 is able to conserve one bit of data volume for each group of pixels. Given this, when there are many groups of pixels that are split, the method of storing the multilevel halftoning resultant values using the data format in FIG. 18 is able to conserve data volume, while, conversely, if few groups of pixels are split, then the use of the data format in FIG. 19 can be seen to conserve data volume. Because, as described above, in image data similar tone values are often obtained for neighboring pixels, the proportion of groups of pixels that will be split is not particularly high, and thus usually the use of the data format shown in FIG. 19 will enable the storage of the multilevel halftoning resultant values with smaller data volumes.

Figure 21:
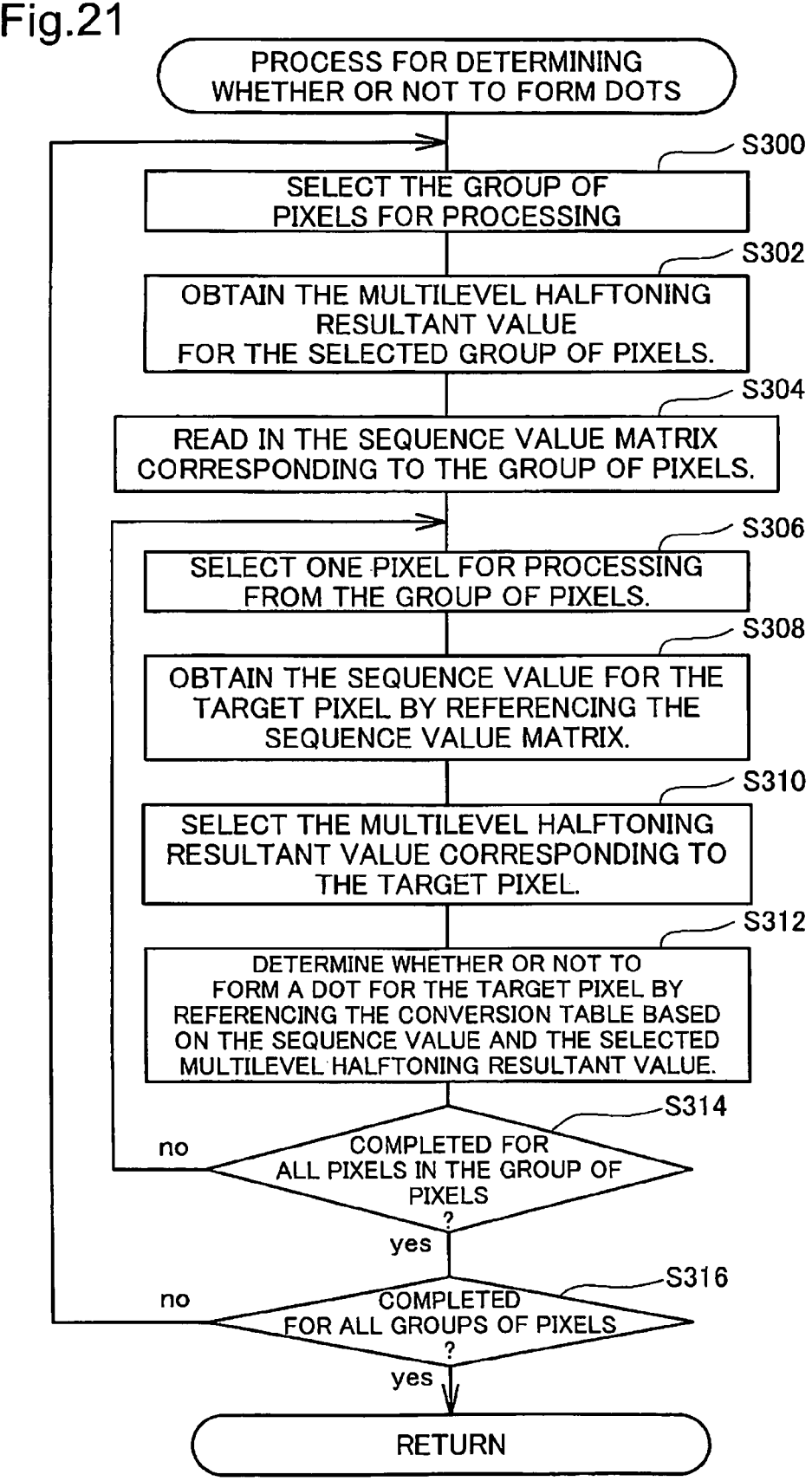
FIG. 21 is a flow chart illustrating the flow of the process for determining whether or not to form dots in the first embodiment.

C-6. Process of Determining Whether or not to Form a Dot in the First Embodiment Next the process of determining, based on the multilevel halftoning resultant value, whether or not to form dots for the individual pixels in the group of pixels (Step S108 in FIG. 5) in the process of printing an image in the first embodiment, described above, will be explained below. FIG. 21 is a flow chart illustrating the flow of processing for determining whether or not to form dots in the first embodiment. This process is performed by the CPU housed in the control circuits 260 of the color printer 200. The process of determining, based on the multilevel halftoning resultant value, whether or not to form dots for the individual pixels within the group of pixels will be explained below, following the flow chart.

When the process for determining whether or not to form dots is started, first one group of pixels to be processed is selected (Step S300), and the multilevel halftoning resultant value is obtained for that group of pixels (Step S302).

If the group of pixels is split, as described above, a plurality of multilevel halftoning resultant values will be produced, and thus when this type of group of pixels is selected, this plurality of multilevel halftoning resultant values will be obtained.

Next, a process for reading in the sequence value matrix corresponding to the selected group of pixels is performed (Step S304). The sequence value matrix is a matrix that defines the order in which the dots are formed for the individual pixels in the group of pixels. As described above using FIG. 9, the threshold values that are set for the individual pixels in the dithering matrix can be considered to express the order in which the dots are formed in the individual pixels within the group of pixels, and thus the sequence value matrix corresponding to the group of pixels can be formed on the dithering matrix.

Figure 22A:
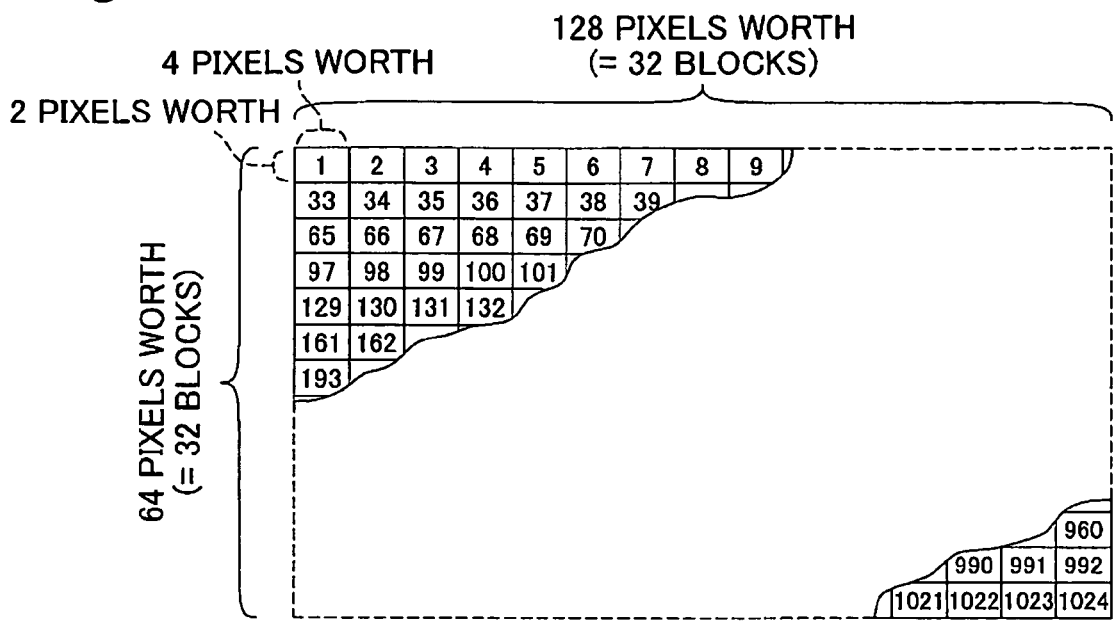
FIG. 22a through FIG. 22c are explanatory diagrams illustrating the situation wherein a sequence value matrix is generated based on a dithering matrix.

FIG. 22 is an explanatory diagram illustrating the situation wherein the sequence value matrix is generated based on the dithering matrix. When generating the sequence value matrix, first the dithering matrix is partitioned into the same size as the groups of pixels. FIG. 22a illustrates, conceptually, the situation wherein the dithering matrix shown in FIG. 6 has been partitioned. The dithering matrix shown in FIG. 6 provides 128 pixels worth of threshold values in the primary scan direction, and 64 pixels worth of threshold values in the secondary scan directions, and because the groups of pixels extend four pixels in the primary scan direction and two pixels in the secondary scan direction, the dithering matrix is split into 1024 blocks. As was the case for adding the classification numbers to the groups of pixels, serial numbers from 1 through 1024 are assigned to these blocks.

Figure 22B:
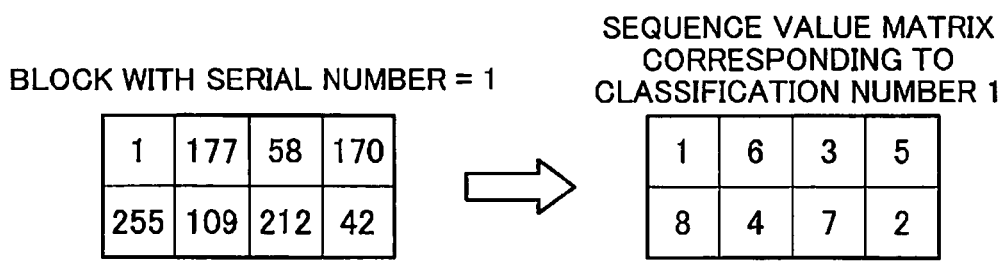
Figure 22C:
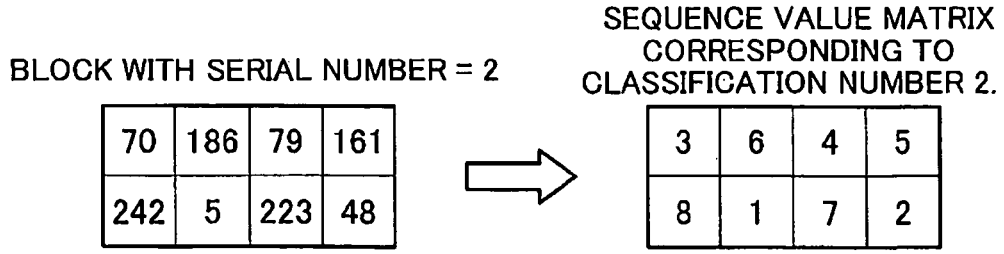

The left half of FIG. 22b shows the threshold values set for the block with the serial number of 1. As will be explained below, the smaller the threshold value, set in the dithering matrix, for the pixel, the more likely a dot will be formed, and thus in the blocks shown in FIG. 22b, the pixel for which the threshold value of 1 is set is the pixel for which a dot is most likely to be formed, and the pixel for which the threshold value 42 is set is the pixel for which the formation of a dot is second most likely. The pixel for which the threshold value 58 is set is third most likely to have a dot formed. The order in which dots will be formed can be determined in this way based on the threshold values that are set for the individual pixels within the block, enabling the creation of a sequence value matrix. As sequence value matrix can be generated in the same way for the block with the serial number of 2 as well. FIG. 22c shows the sequence value matrix generated from the block with the serial number of 2. Sequence value matrices are generated and stored in this way for all of the blocks with serial numbers from 1 through 1024. These types of sequence value matrices are stored in the memory of the color printer 200. Following this, in Step S304 in FIG. 21, the sequence value matrix that was generated from the block with the serial number 1 is read in when the group of pixels selected for processing is a group of pixels with a classification number of 1, and if the group of pixels selected for processing has the classification number 2, then a process is performed to read in the sequence value matrix generated from the block with the serial number of 2.

Once the multilevel halftoning resultant values and the sequence value matrix have been read in for the selected group of pixels in this way, then one pixel at a time is selected from the pixels that are included in the group of pixels, and a decision is made as to whether or not to form at dot based on the multilevel halftoning resultant value and the sequence value matrix (Steps S306, S308 and S310). The situation when determining whether or not to form dots for the individual pixels will be described below, referencing FIG. 23.

FIG. 23 is an explanatory diagram illustrating, conceptually, the situation when determining whether or not to form dots for the individual pixels within the group of pixels based on the multilevel halftoning resultant value and on the sequence value matrix. FIG. 23a shows the multilevel halftoning resultant value that has been read in for the selected group of pixels. Here the group of pixels is split into two regions where the multilevel halftoning resultant value of 3 is read in for the region on the left, and the multilevel halftoning resultant value of 6 is read in for the region on the right. FIG. 23b shows the sequence value matrix that is read in corresponding to the selected group of pixels.

When determining whether or not to form dots, first one pixel is selected from the group of pixels (Step S306 in FIG. 21). Here we will assume that the pixel at the upper left corner of the group of pixels is selected. Next the sequence value for the selected pixel, or in other words, the order in which the dots are to be formed within the group of pixels, is obtained by referencing the sequence value matrix (Step S310). It can be seen by referencing the sequence matrix in FIG. 23b that the sequence value for the pixel at the upper left corner of the group of pixels is 1. Next the multilevel halftoning resultant value corresponding to this pixel is selected (Step S310 in FIG. 21). As is shown in FIG. 23a, two multilevel halftoning resultant values are read in for this group of pixels, but because the selected pixel is the pixel at the upper left corner, the multilevel halftoning resultant value of 3, which corresponds to the region on the left, is selected. Of course, in a case wherein the group of pixels is not split, so that only a single multilevel halftoning resultant value has been read in, this resultant value should be selected.

Once the sequence value and the multilevel halftoning resultant value for the selected pixel have been obtained, then a decision is made, through referencing the conversion table, as to whether or not to form at dot (Step S312 in FIG. 21). FIG. 24 is an explanatory diagram illustrating, conceptually, the conversion table that is referenced in order to determine whether or not to form a dot for the target pixel. Here the group of pixels comprises eight pixels, so the sequence values assume the numbers 1 through 8 and the number data assumes the values from 0 to 8, and thus values indicating whether or not to form a dot are set corresponding to the 72 combinations. In the example shown in FIG. 24, a 1 will be set for a combination wherein a dot will be formed, and a 0 will be set for a combination wherein no dots will be formed.

Because the pixel at the upper left corner of the group of pixels has a sequence value of 1 and a multilevel halftoning resultant value of 3, the value 1, indicating that a dot will be formed, is set in the applicable location of the conversion table to determine that a dot will be formed for the pixel. Once the decision whether or not to form a dot has been made for the one pixel in this way, a decision is made as to whether or not decisions have been made for all of the pixels within the group of pixels (Step S314), and if there are still pixels remaining for which the decision has not been made (Step S314: NO), then processing returns to Step S306, a new pixel is selected, and the same operations are performed for the selected pixel in order to determine whether or not to form a dot (Step S308, S310, S312).

In the group of pixels shown in FIG. 23a, the multilevel halftoning resultant value read in for the region on the left is 3 and read in for the region on the right is 6. Moreover, four sequence values, 1, 4, 6, and 8 are set for the region on the left of the group of pixels, as shown by the sequence value matrix in FIG. 23b. Consequently, for each of the pixels on the left of the group of pixels, the values set in the location marked by the dotted circle are read from the conversion table shown in FIG. 24, or in other words, the values set for each of the combinations of the multilevel halftoning resultant value 3 with the sequence value 1, the combination of the multilevel halftoning resultant value 3 and the sequence value 4, the combination of the multilevel halftoning resultant value 3 and the sequence value 6, and the combination of the multilevel halftoning resultant value 3 and the sequence value 8 are read out to determine whether or not to form a dot. Similarly, for the region on the right of the group of pixels, the multilevel halftoning resultant value is 6, and there are four values set for the sequence values: 2, 3, 5, and 7.

Consequently, for each of the pixels on the right side of the group of pixels, the decision as to whether or not to form dots can be made by reading out the values that are set in the locations marked by the dotted squares from the conversion table shown in FIG. 24.

Once decisions have been made as to whether or not to form dots for each of the individual pixels included in the selected group of pixels in this way (Step 314: YES in FIG. 21), then a decision is made as to whether or not the operations, described above, have been performed for all of the groups of pixels (Step S316). If there remain groups of pixels that have not yet been processed (Step S316: NO), the processing returns to Step S300, a new group of pixels is selected, and the series of operations described above is repeated. After these operations are completed, if it is decided that decisions have been made as to whether or not to form dots for all of the groups of pixels (Step S316: YES), then the process of determining whether or not to form dots, in the first embodiment shown in FIG. 21, is complete, and processing returns to the image printing process in FIG. 5.

The process for generating multilevel halftoning resultant values (Step S105 in FIG. 5) and the process for determining whether or not to form dots (Step S108 in FIG. 5) in the image printing process in the first embodiment have been described in detail above. In the multilevel halftoning resultant value generation process, described above, groups of pixels that group together a specific number of pixels are generated, and multilevel halftoning resultant values are generated after determining representative tone values and determining classification numbers for those groups of pixels. As described above, the classification numbers and representative tone values for the groups of pixels can be determined easily, and the multilevel halftoning resultant values can be obtained extremely easily through referencing a table for multilevel halftoning. The multilevel halftoning resultant values obtained in this way are compared to data indicating whether or not to form dots for the individual pixels, substantially reducing the amount of data, thus enabling the outputting of data extremely quickly from the computer 100 to the color printer 200.

Moreover, decisions are made as to whether or not to split groups of pixels, based on the tone values for the individual pixels that are grouped together into the group of pixels and a plurality of multilevel halftoning resultant values are generated for those groups of pixels for which splitting has been selected. When a group of pixels is split in this way, the amount of data that must be provided to the color printer 200 is increased by the amount in which the multilevel halftoning resultant values that must be outputted for the group of pixels increase, but, as described above, because there is a tendency in image data for there to be similar tone values in neighboring pixels, in practice the ratio of groups of pixels that must be split is small, and thus the increase in the amount of data is trivial. Fundamentally, the process of generating multilevel halftoning resultant values, as described above, enables the rapid generation and outputting multilevel halftoning resultant values.

Moreover, in the process for determining whether or not to form dots, described above, when the multilevel halftoning resultant values are received rapidly from the computer 100, the sequence value matrix is referenced to produce sequence values for each of the individual pixels in the groups of pixels. Following this, the referencing of the conversion table based on the multilevel halftoning resultant values and the sequence values determines whether or not to form dots for the individual pixels. In this way, making the determination by referencing the sequence value matrix and the conversion table enables the rapid determination of whether or not to form dots for the individual pixels within the groups of pixels. Additionally, for those groups of pixels that have been split, the multilevel halftoning resultant values of each of the regions that have been split are received, enabling the determination as to whether or not to form dots for the individual pixels in each of the regions. Because of this, even when there is a change in the tone values within a group of pixels, it is still possible to determine whether or not to form dots as appropriate according to the distribution of the tone values, enabling the production of a high quality image.

Moreover, the ability to generate the multilevel halftoning resultant values by referencing the table for multilevel halftoning enables the generation of the multilevel halftoning resultant values through a relatively simple process. Similarly, the ability to determine whether or not to form dots for the individual pixels through referencing the sequence value matrix and the conversion table enables the determination to be made relatively simply here as well. Because of this, the processing can be performed at a fully practical speed in both of these processes, even when using a device that is not equipped with sophisticated data processing capabilities such as in the computer 100.

Moreover, in the image printing process described above, the table for multilevel halftoning that is referenced when generating the multilevel halftoning resultant values, and the sequence value matrix that is referenced when determining whether or not to form dots, can both be referenced in the same way regardless of whether or not a group of pixels has been split. Moreover, even in the case that the group of pixels has been split, the table for multilevel halftoning and the sequence value matrix can reference the same values, regardless of whether splitting is performed and regardless of the type of region, as in the alternative form of embodiment described below, even when a group of pixels has been split. Because of this, it is not necessary to store a table for multilevel halftoning or a sequence value matrix that depends on whether or not the group of pixels is split, or for each form of splitting, obviating the need for a large capacity memory. Consequently, the image printing process described above can be performed in devices that do not have large capacity memories.

C-7. Alternative Forms According to the First Embodiment

There are a variety of alternative forms of the image printing process according to the first embodiment, described above. These alternative forms are described briefly below.

(1) First Alternative Form

In the first embodiment, described above, the description was of a case wherein there was only a single pattern for splitting groups of pixels. However, a plurality of splitting patterns may be prepared, and the appropriate pattern may be selected depending on the distribution of tone values within the group of pixels. This type of first alternative form will be explained below.

Figure 25:
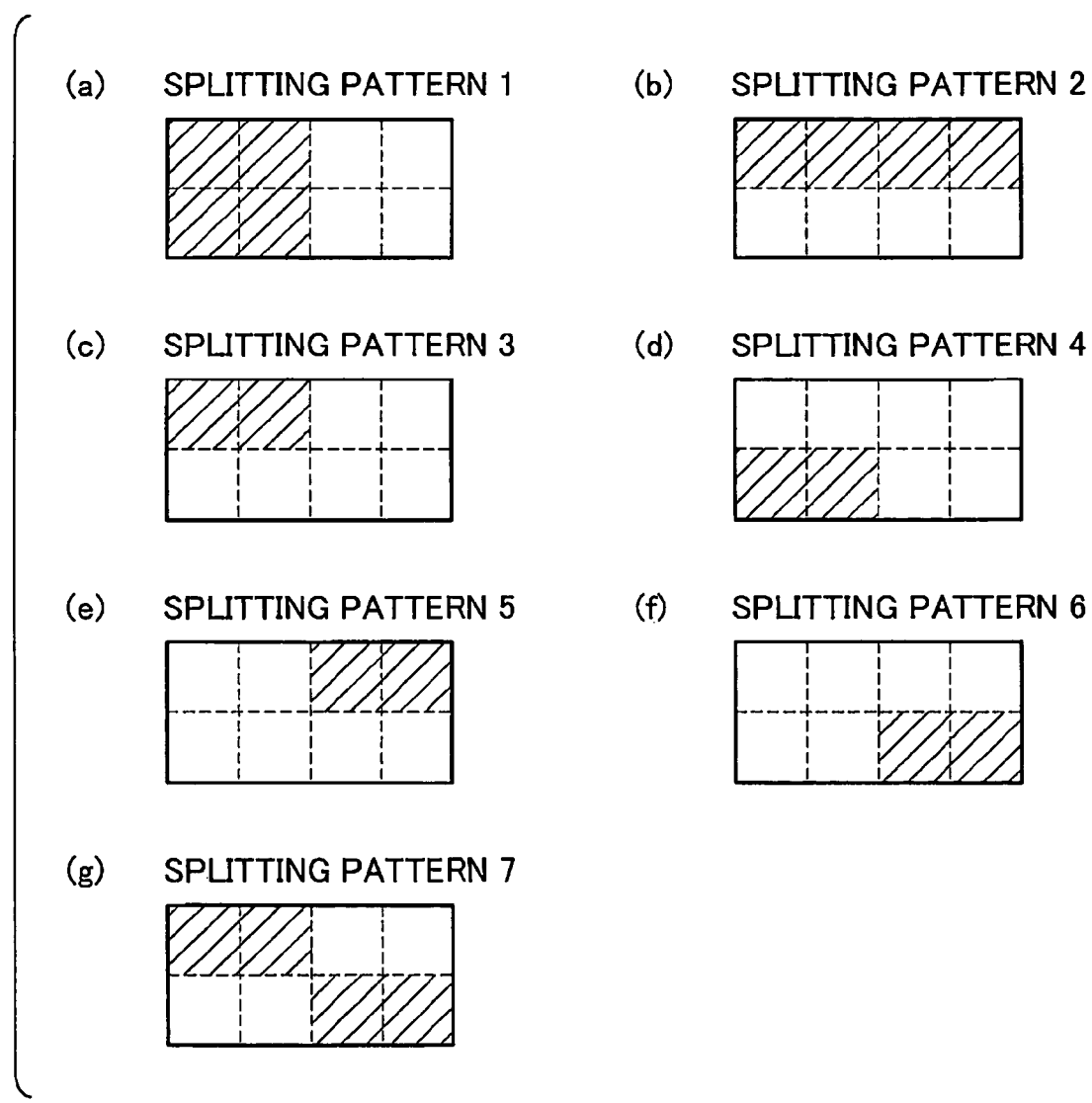
FIG. 25 is an explanatory diagram illustrating the splitting patterns used in an alternative form of the first embodiment.

FIG. 25 is an explanatory diagram illustrating the splitting patterns used in a first alternative form of the first embodiment. As is shown in the Figure, seven types of splitting patterns are provided. Splitting pattern 1, shown by (a) in FIG. 25 is a pattern wherein the group of pixels is split into two equal regions, on the left and on the right, as in the embodiment described above. The splitting pattern shown in (b) of FIG. 25 splits the group of pixels into two equal regions, the top and the bottom. Additionally, the next four splitting patterns generate four regions by splitting the group of pixels in half twice, vertically and horizontally, and then splitting one region selected from these four regions and splitting it in two with another region to form the pattern. Specifically, the splitting pattern shown in (c) in FIG. 25 is a pattern wherein the group of pixels is split into two parts, the upper left corner region and the remaining region. Moreover, the splitting pattern shown in (d) of FIG. 25 splits the group of pixels into the upper right corner region and the remaining regions, the splitting pattern shown in (e) of FIG. 25 splits the group of pixels into the lower left region and the remaining region, and the splitting pattern shown in (f) of FIG. 25 splits the group of pixels into the lower right region and the remaining region.

Fundamentally, these four splitting patterns split the group of pixels into regions of unequal sizes. Finally, the splitting pattern in (g) of FIG. 25 is a splitting pattern wherein the group of pixels is split into a region comprising two regions selected in the diagonal direction from the four regions within the group of pixels, and a region comprising the other regions along the diagonal line intersecting therewith.

In the first alternative form shown in FIG. 25, seven types of splitting patterns are provided in this way, and the multilevel halftoning resultant values for the groups of pixels are generated as described below. A simple explanation will be given below, following the flow chart in FIG. 11, which was used in explaining the process for generating multilevel halftoning resultant values in the first embodiment.

When generating the multilevel halftoning resultant values in the first alternative form of the first embodiment, first the groups of pixels are generated and classification numbers are determined (corresponding to Steps S200 and S202 in FIG. 11). Next, if in the decision as to whether or not to split the group of pixels, based on the distribution of tone values within the group of pixels, the group of pixels is to be split, then a decision is made as to which of these seven splitting patterns is to be used for the splitting (corresponding to Step S204). If the decision is to not split the group of pixels, then the multilevel halftoning resultant values are obtained in the same way as in the first embodiment. In other words, representative tone values are calculated for the groups of pixels, the representative tone values are subjected to multilevel halftoning through referencing a table for multilevel halftoning, and the multilevel halftoning resultant values obtained are stored (corresponding to Steps S206, S208, and S210).

On the other hand, if the decision is to split the group of pixels (correspond to Step 204: YES) then, at the same time, a decision is also made as to which of the patterns shown in FIG. 25 to use when splitting. Following this, after the representative tone values have been determined for each of the regions into which the group of pixels has been split, the table for multilevel halftoning is referenced to convert the respective representative tone values into multilevel halftoning resultant values (corresponding to Steps S212 and S214). After this, when storing the multilevel halftoning resultant values thus obtained, first an ESC code that indicates the splitting pattern is stored, and then after the ESC code the multilevel halftoning resultant values that have been obtained for the respective regions are stored.

FIG. 26 is an explanatory diagram illustrating the ESC codes that indicate the splitting patterns in the first alternative form of the first embodiment. The multilevel halftoning resultant values are expressed by 4-bit data, as described above, and thus can express values between 0 and 15 in decimal notation. Of these, the values from 9 to 15 are assigned to ESC codes, where the remaining values from 0 to 8 are assigned to multilevel halftoning resultant values. Here the multiple value results are values from 0 to 8 because the pixel groups are made of 8 pixels, corresponding to the fact that pixels are the result of only two states where a dot either is or is not formed. Moreover, having the ESC codes be the values from 9 to 15 is because four bits are necessary for expressing the multilevel halftoning resultant values of 0 to 8, and so the seven values, from 9 to 15, of the values from 0 to 15 that can be expressed, that are not used for the multilevel halftoning resultant values are assigned to the ESC codes. Moreover, the ESC code 15 is assigned to the splitting pattern 1 shown in (a) in FIG. 25, the ESC code 14 is assigned to the splitting pattern 2, the ESC code 13 is assigned to the splitting pattern 3, the ESC code 12 is assigned to the splitting pattern 4, the ESC code 11 is assigned to the splitting pattern 5, the ESC code 10 is assigned to the splitting pattern 5, and the ESC code 9 is assigned to the splitting pattern 7.

In the first alternative form, when storing the multilevel halftoning resultant values for a group of pixels that has been split, first the ESC code that indicates the splitting pattern is stored, following which the multilevel halftoning resultant values obtained for each of the regions are stored (corresponding to Step S216 in FIG. 11). For example, when the group of pixels is split using the splitting pattern shown in (b) of FIG. 25, the multilevel halftoning resultant values for the respective regions are stored following the ESC code 14 that corresponds to this splitting pattern.

Moreover, in the process for determining whether or not to form dots, according to the first alternative form, the determination as to whether or not to form dots is performed for the individual pixels within the group of pixels as follows, after receiving these multilevel halftoning resultant values. As simple explanation will be given below, following the flow chart in FIG. 21, which showed the process of determining whether or not to form dots in the first embodiment. First, a group of pixels is selected to be processed, and the multilevel halftoning resultant values are obtained for the selected group of pixels (corresponding to Steps S300 and S302 in FIG. 21). If the selected group of pixels is split, then the ESC code indicating the splitting pattern and the multilevel halftoning resultant values for each of the regions into which the group of pixels is split are obtained. In other words, if the value read in as a multilevel halftoning resultant value is between 9 and 15, inclusive, then the value is not a multilevel halftoning resultant value, but rather is an ESC code that indicates the splitting pattern for the group of pixels, and it is determined that the multilevel halftoning resultant values for the various regions are stored following the ESC code, and these multilevel halftoning resultant values are read in.

Next, after the sequence value matrix corresponding to the group of pixels has been read in (corresponding to Step S304), one of the pixels from the group of pixels is selected for processing (corresponding to Step S306), and the sequence value that is defined in the sequence value matrix, and the multilevel halftoning resultant value for the selected pixel are read in (corresponding to Step S308 and S310), and the decision is made as to whether or not to form a dot in the selected pixel through referencing the conversion table (corresponding to Step S312). This operation is repeated for each of the individual pixels within the group of pixels within the group of pixels (corresponding to Step S314). Once the process has been completed for one group of pixels, a decision is made as to whether or not the process has been completed for all of the groups of pixels (corresponding to Step S316), and when it has been determined that the process has been performed for all of the groups of pixels, then the process of determining whether or not to form dots, according to the first alternative form, has been completed.

The first alternative form of the first embodiment, explained above, enables the appropriate splitting of groups of pixels according to the distribution of tone values of the individual pixels that are grouped together to form the group of pixels, thus enabling even higher quality images. Furthermore, even when the number of splitting patterns for the groups of pixels is increased, there is no increase in the amount of data required for outputting the multilevel halftoning resultant values for the groups of pixels that have been split, nor is there an increase in the time required for determining whether or not to form dots, for each of the pixels, from the multilevel halftoning resultant values. Consequently, notwithstanding the increase in the image quality relative to the image printing process in the first embodiment, described above, the image can be outputted rapidly in the same manner as in the process in the first embodiment.

(2) Second Alternative Form

In the forms of embodiment described above, a decision was made as to whether or not to split the groups of pixels based on the tone values of the individual pixels within the groups of pixels, and multilevel halftoning resultant values were generated for each region to determine whether or not to form dots if the groups of pixels were split. However, large groups of pixels may instead be generated wherein it is assumed that the groups of pixels will always be split, and wherein the groups of pixels are actually never processed without splitting.

As one example, the following case may be considered wherein resolution conversion has been performed in the resolution conversion process described above (Step S104 in FIG. 5). By converting the image data resolution into twice the resolution in both the primary scan direction and the secondary scan direction so that each pixel is split in two in both the horizontal and vertical directions, a total of four pixels will be produced for each pixel. In such as case, grouping these four pixels into a group of pixels will cause all of the pixels within the group of pixels to have the same tone value. Consequently, by determining whether or not to form dots for each of the individual pixels through producing multilevel halftoning resultant values for the groups of pixels enables the printing of the image with absolutely no loss of quality.

Here, in the second alternative form of the first embodiment, rather than grouping these four pixels (in other words, the two pixels each in both the primary scan direction and the secondary scan direction) into a group of pixels, a total of eight pixels, four pixels at a time in the primary scan directions and two pixels at a time in the secondary scan direction, are grouped into a group of pixels.

Given this, with these groups of pixels always split into two regions each, the left and the right, the process for generating the multilevel halftoning resultant values, described above, and the process for determining whether or not to form dots, are performed for each of the regions.

As is clear from the method described above for setting up the table for multilevel halftoning and the sequence value matrix, if the numbers of pixels included in the groups of pixels are different, then it is necessary to provide different tables for multilevel halftoning and different sequence value matrices as well. However, when pixel groups formed of eight pixels are always treated as being divided into two regions on the left and right the multilevel halftoning tables and sequence order matrices which are used for pixel groups of eight pixels are substantially applicable without modification to pixel groups of four pixels. In other words, there is no need to setup new tables for multilevel halftoning or new sequence value matrices when the groups of pixels contain four pixels each.

Moreover, this is not necessarily limited to the case wherein four pixels each are grouped into the group of pixels in this way. For example, when two pixels at a time are grouped into the group of pixels, or when a different number of pixels are grouped into the group of pixels, the same situation is produced, where, in each case, there is no need to establish special tables for multilevel halftoning or special sequence value matrices.

In addition, the second alternative form of the first embodiment, in this way, enables a reduction in the amount of data in the tables for multilevel halftoning. For example, the tables for multilevel halftoning in the first embodiment, described above, provided multilevel halftoning resultant values for each combination of the 1024 groups of pixels and the 256 possible representative tone values. Because the multilevel halftoning resultant values could assume nine different values, from 0 to 8, the individual multilevel halftoning resultant values comprise four bits of data. Consequently, a single table for multilevel halftoning comprise 1 Mb of data.

On the other hand, when the groups of pixels are structured from four pixels each, the number of groups of pixels is doubled to 2048 groups. Moreover, the multilevel halftoning resultant values can assume any of five different values, from 0 to 4, and thus the individual multilevel halftoning resultant values can be expressed in three bits, slightly reducing the data length; however, ultimately, the amount of data for one table for multilevel halftoning is 1.5 Mb, multiplied by a factor of 1.5. In other words, when tables for multilevel halftoning are structured with the groups of pixels comprising 4 pixels, it is necessary to have a data volume of 1.15 Mb for storing a single table, while, in contrast, when the groups of pixels are formed from eight pixels and then performing process wherein the group of pixels is always split, the amount of data that is required for storing the table for multilevel halftoning can be reduced to 1 Mb.

D. Second Embodiment

In the first embodiment, described above, the dots that can be formed by the color printer 200 were explained as being of only a single type. However, for the purposes of increasing the image quality, nowadays so-called half-tone dot printers that are capable of printing a large variety of dots, such as dots with different sizes or dots with different ink densities, are used broadly. The invention according to the present application can be very effective when applied to these half-tone dot printers. As a second embodiment, the application of the present invention to a half-tone dot printer will be explained below.

D-1. Summary of the Image Printing Process According to the Second Embodiment

The image printing process according to the second embodiment is the same as the image printing process according to the first embodiment, shown in FIG. 5, insofar as the flow chart is concerned. A summary of the image printing process according to the second embodiment will be explained briefly below, using again the flow chart in FIG. 5.

When the image printing process according to the second embodiment is started, first the image data is read into the computer 100 and a color conversion process is performed (corresponding to Step S100 and Step S102). Next the resolution conversion process is performed, and after the resolution of the image data has been converted to the printer resolution (corresponding to Step S104), the process of generating the multilevel halftoning resultant values is performed to convert into multilevel halftoning resultant values the representative tone values for the groups of pixels (corresponding to Step S106).

As described above, in the first embodiment the dots that could be formed in the color printer 200 were of only one type, and the multilevel halftoning resultant value represented the number of dots to be formed within the group of pixels. In contrast, in the second embodiment, the color printer 200 can form three types of dots with different sizes:

large dots, medium dots and small dots. To adapt to this capability, the multilevel halftoning resultant values in the second embodiment express combinations of the types and numbers of the dots to be formed in the groups of pixels. Moreover, in the process of generating the multilevel halftoning resultant values in the second embodiment, a process is performed by which the representative tone values of the groups of pixels are converted into multilevel halftoning resultant values that express combinations of the numbers of each type of dot. Furthermore, when it has been determined that a group of pixels is to be split, the multilevel halftoning resultant values are determined for each of the regions that is produced by splitting. The details of the process for producing the multilevel halftoning resultant values in the second embodiment will be described below.

The process of determining whether or not to form dots (corresponding to Step S108 in FIG. 5) starts when the CPU, which is housed within the control circuit 260 of the color printer 200 receives the multilevel halftoning resultant values provided by the computer 100. Although the details will b described below, in the process of determining whether or not to form dots in the second embodiment, the multilevel halftoning resultant values are first converted into intermediate data indicating the number of large dots, medium dots, and small dots, and then a process is performed to determine whether or not to form each type of dot, for each individual pixel within the group of pixels.

Once the decision has been made as to whether or not to form dots for each of the types of dots (large, medium, and small) then the dots are formed on the print medium according to the decision that was made as to whether or not to form the dots (corresponding to Step S110 in FIG. 5). The result is that an image is printed according to the image data.

D-2. Process for Generating the Multilevel Halftoning Resultant Values According to the Second Embodiment The process for generating the multilevel halftoning resultant values through multilevel halftoning of representative tone values for each group of pixels or for each region within each group of pixels, in the image printing process according to the second embodiment, described above, will be explained next. As is described above, even in the process of generating the multilevel halftoning resultant values according to the second embodiment, these multilevel halftoning resultant values can be generated extremely easily through referencing the table for multilevel halftoning using the classification numbers and representative tone values for the groups of pixels. In order to explain why this is so, first a simple explanation will be presented regarding the process by which to determine, using the dithering method, the numbers of large, medium and small dots to be formed within the groups of pixels. Following that explanation, an explanation will be given regarding the details of the process by which to generate the multilevel halftoning resultant values according to the second embodiment, based on these processes.

Figure 27:
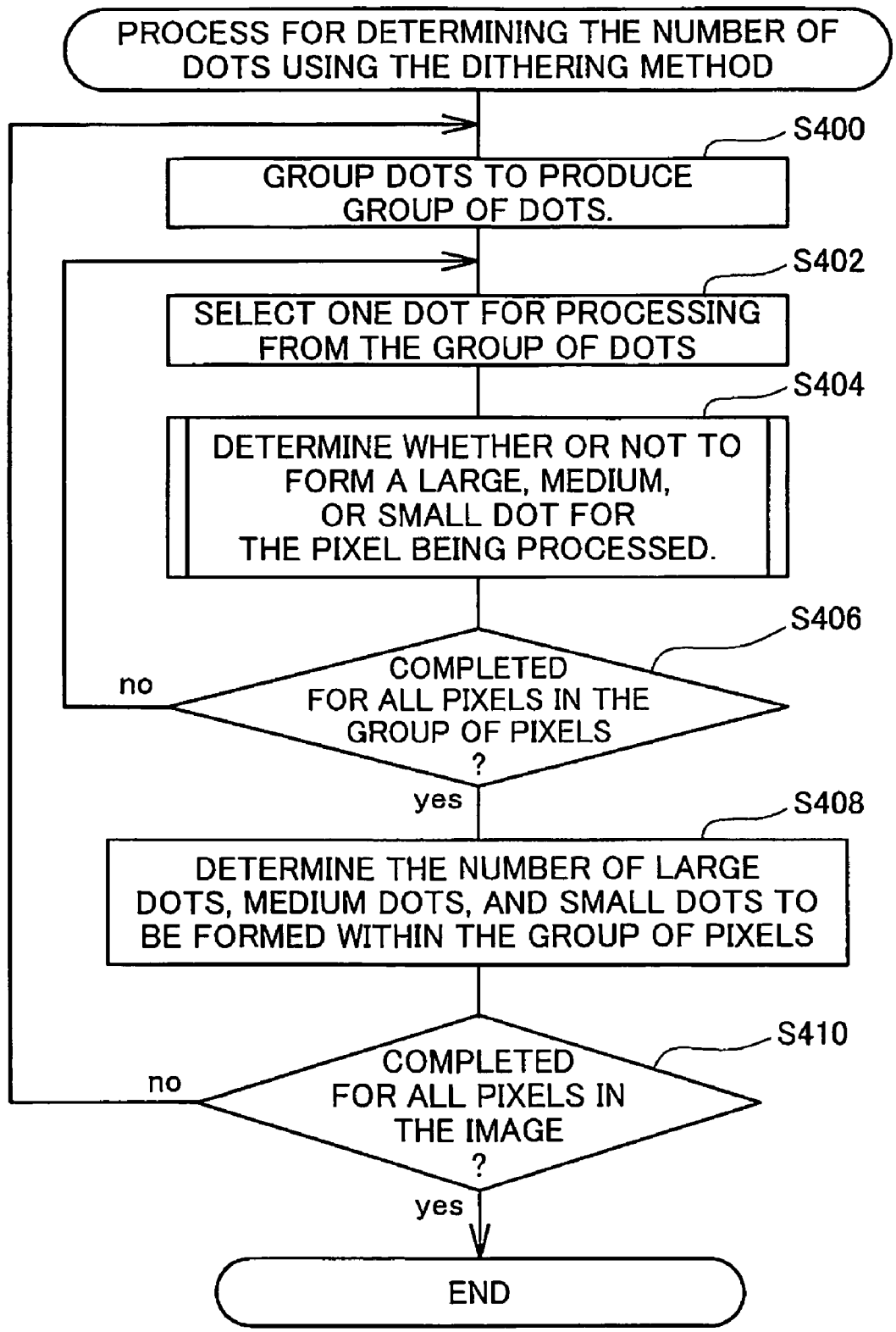
FIG. 27 is a flow chart illustrating the flow of the processes for determining, through the application of the dithering method, the number of large dots, medium dots, and small dots to be formed in a group of pixels.

D-2-1. Process of Determining, Using the Dithering Method, the Numbers of Large, Medium, and Small Dots to be Formed FIG. 27 is a flow chart illustrating the flow of the process by which to determine, using the dithering method, the numbers of large dots, medium dots, and small dots to be formed in the groups of pixels. Note that the details of processes by which to apply the dithering method to determine whether or not to form large, medium, and small dots are disclosed in Japanese Patent 3292104. In other words, the process illustrated in FIG. 27 can be viewed as performing, on the pixel group unit, the method disclosed in Japanese Patent 3292104. Even when determining the numbers of large, medium, and small dots, when the process begins first groups of pixels are formed by grouping together a specific number of neighboring pixels (Step S400). Here a total of eight pixels, four pixels in the primary scanning direction and two pixels in the secondary scanning direction are grouped together as the groups of pixels, in the same manner as in the embodiment described above.

Figure 28:
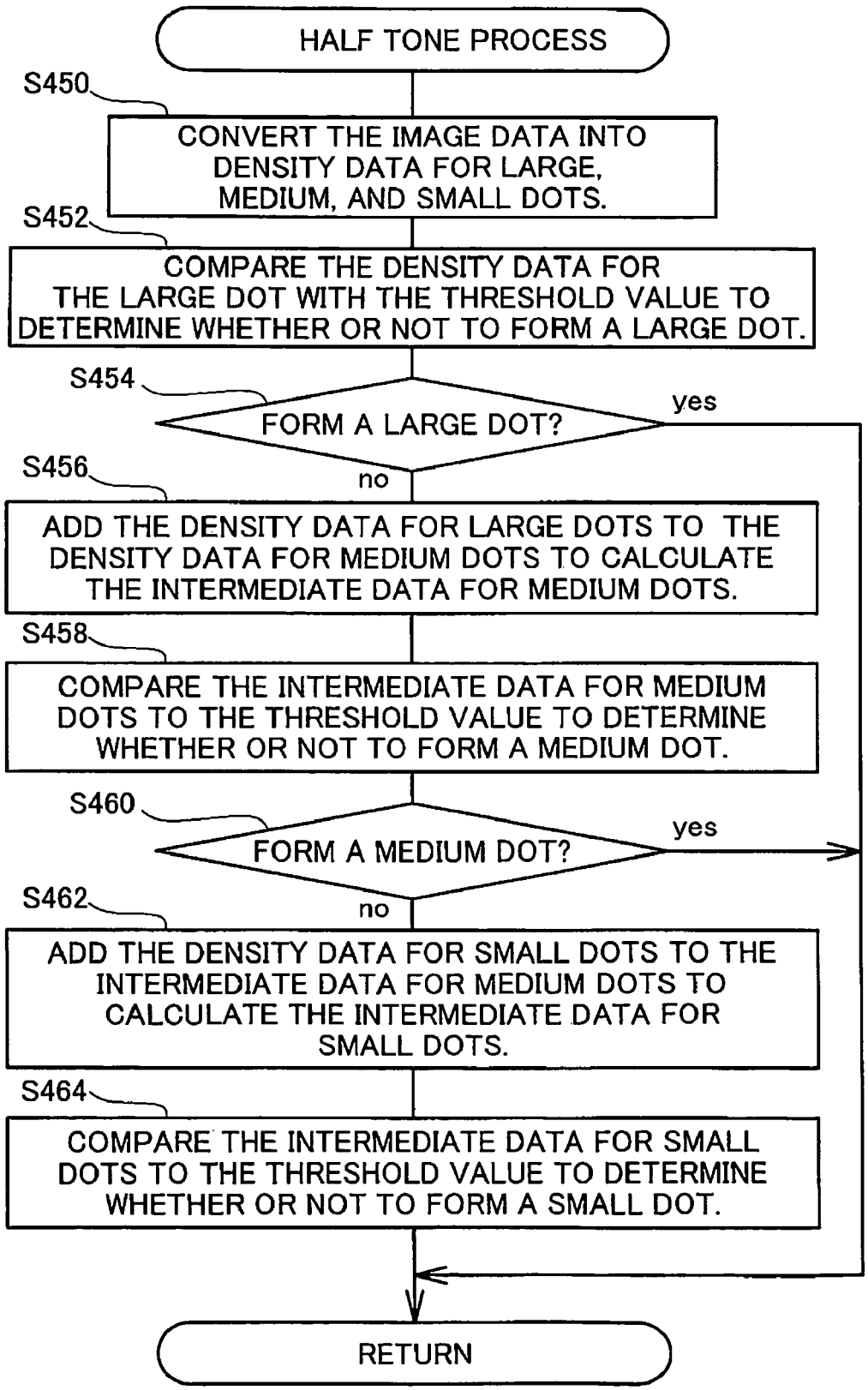
FIG. 28 is a flow chart illustrating the flow of half tone processes that determine whether or not to form large dots, medium dots, or small dots.

Next, a single pixel is selected, from the group of pixels, to be subjected to processing in order to determine whether or not to form at dot (Step S402), and a decision is made as to whether or not to form a large dot, medium dot, or small dot, for the selected pixel being processed (Step S404). The decision as to whether or not to form a large dot, medium, or small dot is made as follows:

FIG. 28 is a flow chart illustrating the process flow for determining whether or not to form a large dot, medium dot, or small dot, through performing a half tone process for the one selected pixel. When beginning the half tone process for the large, medium, and small dot, the image data for the pixel that is being processed is first converted into density data for each of the large dots, medium dots, and small dots (Step S450). Here the density data is data that indicates the degree of density to which the dot should be formed. For example, the tone value 255 for the density data indicates that the dot formation density is 100%, or in other words, that dots are to be formed in all of the pixels, and the tone value 0 for the density data indicates a dot formation density of 0%, or in other words, indicates that dots will be formed in none of the pixels. The conversion to density data in this way can be performed through referencing a table of numbers known as the dot density conversion table.

Figure 29:
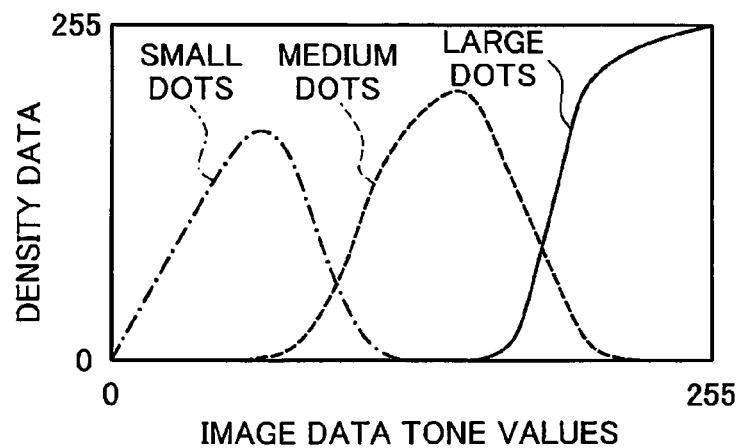
FIG. 29 is an explanatory diagram illustrating conceptually a dot density conversion table that is referenced when converting into density data the tone values of the image data for large, medium, and small dots.

FIG. 29 is an explanatory diagram illustrating, conceptually, a dot density conversion table that is referenced when converting to density data, for the large, medium, and small dots, the tone values of the image data. As is shown in the figure, density data, for the small dots, medium dots, and large dots, is specified in the dot density conversion table, relative to the tone values of the image data obtained through color conversion. In regions wherein the image data is in the vicinity of a tone value of 0, the density data of the medium dots and large dots are both set to a tone value of 0. The density data for the small dots increases along with the tone values for the image data, but when the image data reaches a specific tone value, next, conversely, the density data for the small dots begins to decrease, and instead the density data for the medium dots begins to increase. As the tone values for the image data increase further to arrive at a specific tone value, the density data for the small dots reaches a tone value of 0, and the density data for the medium dots begins to decrease while, instead, the density data for the large dots begins to increase gradually. In Step S450 of FIG. 28, a process is performed wherein the tone values for the image data are converted into density data for the large dots, density data for the medium dots, and density data for the small dots while referencing this dot density conversion table.

In this way, the density data for the large, medium, and small dots, for the pixel to be processed, has been obtained, then a decision as to whether or not to form a large dot is made first (Step S452 in FIG. 28). This decision is made through comparing, to a threshold value from a dithering matrix that is defined in a position corresponding the density data for the large dots to the pixel being processed. If the density data is larger than the threshold, then the decision is to form a large dot at the pixel being processed. Consequently, if a large dot is to be formed, then the decision is YES in Step S454, and the half tone process is exited and processing returns to the process for determining the numbers of dots, shown in FIG. 27.

Conversely, if the threshold value is larger than the large dot density data, then, in Step S452, the decision is made to not form a large dot in the pixel being processed. If the result of the decision is to not form a large dot (Step S454: NO), then next the process for determining whether or not to form a medium dot is commenced. In deciding whether or not to form a medium dot, the large dot density data is added to the medium dot density data to calculate the intermediate data for medium dots (Step S456). After this, the decision is made as to whether or not to form the medium dot by comparing the intermediate data for the medium dot thus obtained, to the threshold value from the dithering matrix (Step S458). If the intermediate data for the medium dot is larger than the threshold value, then the decision is to form a medium dot in the pixel being processed. If the result is to form a medium dot, then the decision is Yes in Step S460, and the half tone process is exited and processing returns to the process for determining the numbers of dots in FIG. 27.

Conversely, if the threshold value was larger than the intermediate data for the medium dot, then, in Step S458 the decision is made to not form the medium dot in the pixel being processed. If the result of the decision is to not form a medium dot either (Step S460: NO), then next the process for determining whether or not to form a small dot commences. In the decision as to whether or not to form a small dot, the density data for the small dot is added to the intermediate data for the medium dot to calculate the intermediate data for the small dot (Step S462). After this, the intermediate data for the small dot, thus obtained, is compared to the threshold value from the dithering matrix to determine whether or not to form the small dot (Step S464). If the result is that the intermediate data for the small dot is larger than the threshold value, then the decision is to form a small dot in the pixel being processed; conversely, if the threshold value is larger than the intermediate data for the small dot, then the decision is to form none of the dots. Performing processes such as described above enables a decision, for the pixel being processed, as to whether to form a large dot, a medium dot, a small dot, or no dot at all, and thus the half tone process shown in FIG. 28 is exited and the processing returns to the process for determining the numbers of dots in FIG. 27.

Figure 30:
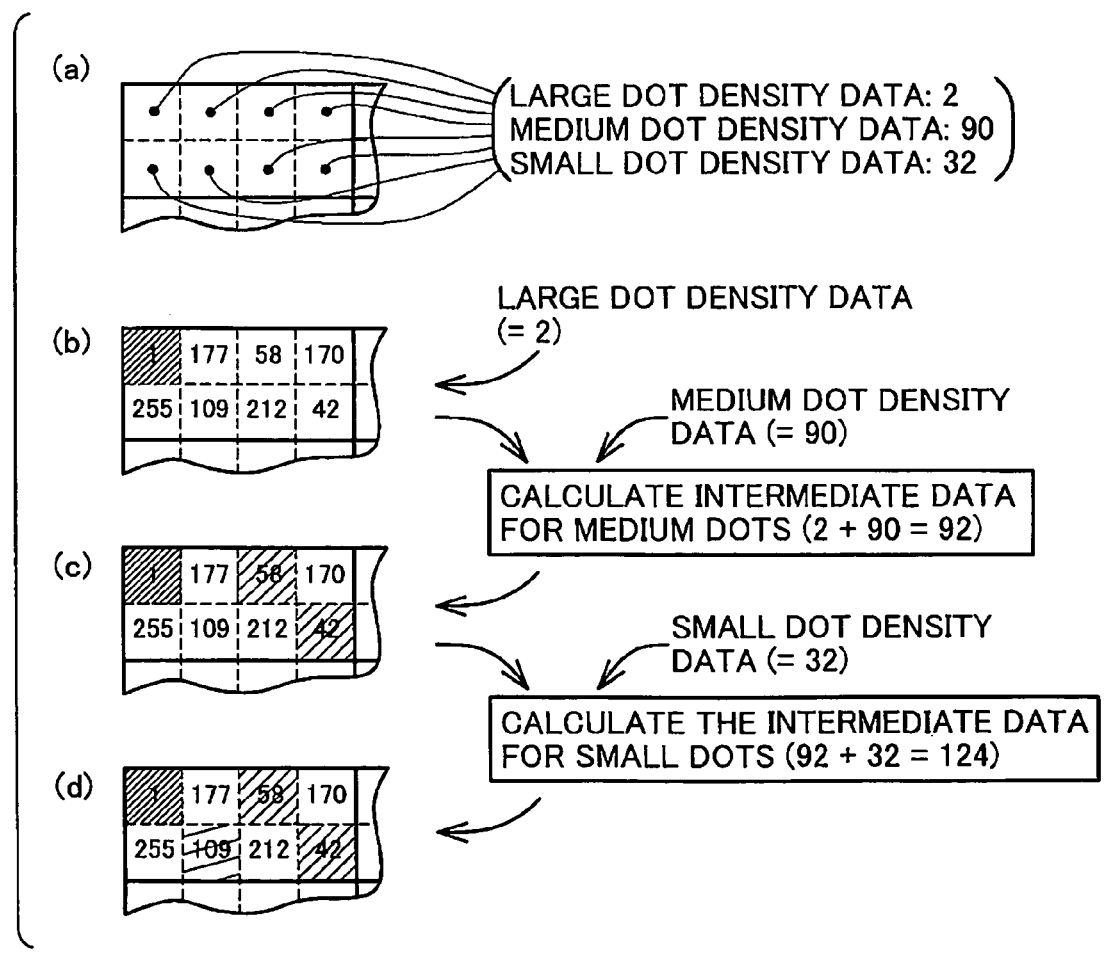
FIG. 30 is an explanatory diagram illustrating conceptually the situation where decisions are made as to whether or not to form large, medium, or small dots, through the application of the dithering method, for each of the pixels in the group of pixels.

A supplemental explanation will be provided, referencing FIG. 30, regarding the situation when determining whether or not to form large, medium, and small dots while performing the process described above. FIG. 30 is a explanatory diagram illustrating, conceptually, the situation when determining whether or not to form large, medium, and small dots, while using the dithering method, for each of pixels in a group of pixels. To prevent the explanation from becoming too complicated, at this point it will be assumed that all of the pixels in the group of pixels have identical tone values, and as a result, each of the density data for the large, medium, and small dots have identical tone values. (a) in FIG. 30 shows the density data for large, medium, and small dots obtained for each of the pixels in the group of pixels, where the density data for the large dots in every one of the pixels is 2, the density data for the medium dots every one of the pixels is 90, and the density data for the small dots in every one of the pixels is 32.

(b) in FIG. 30 shows the threshold values that are stored in the positions, in the dithering matrix, that correspond to the group of pixels. When determining whether or not to form the large dots, the density data for the large dot is compared to these threshold values. Here the density data for the large dots in every one of the pixels is 2, so the only pixel having a decision to form a large dot is the pixel wherein the threshold value is 1. In (b) in FIG. 30, the pixel for which the decision was made to form a large dot is indicated by the narrow diagonal lines. For the other pixels, the formation of either medium dots or small dots, or the formation of no dots at all, can be considered. At this point, decisions are made as to whether or not to form medium dots.

When determining whether or not to form medium dots, the density data 2 for the large dots is added to the density data 90 for the medium dots to calculate the intermediate data for the medium dots, where the intermediate data 92, thus obtained, is compared to the threshold values from the dithering matrix. The result is a decision to form medium dots in just two of the pixels, the pixel having a threshold value of 42, and the pixel having a threshold value of 58. (c) in FIG. 30 shows, by the addition of somewhat narrow diagonal lines, the pixels for which the decision was to form medium dots. For those pixels for which neither large dots nor medium dots are to be formed, either the formation of small dots, or the formation of no dots at all, can be considered. Given this, the intermediate data 92 for the medium dots is added to the density data 32 for the mall dots to calculated the intermediate data for the small dots, where the intermediate data 124, thus obtained, is compared to the threshold values in the dithering matrix. The result is a decision to form a small dot in only the pixel for which the threshold value is 109. (d) in FIG. 30 shows, by the addition of the sparse diagonal lines, the pixel for which the decision was to form a small dot.

In Steps S402 through S406 in the process by which to determine the number of dots, shown in FIG. 27, decisions are made whether or not to form the large, medium, and small dots while calculating intermediate data for each of the pixels within the group of pixels, as described above. Once the decisions have been completed for every one of the pixels in the group of pixels (Step S406: YES), then the numbers of large dots, medium dots, and small dots to be formed within the group of pixels are determined (Step S408). In the group of pixels shown as an example in FIG. 30, there will be one large dot, two medium dots, and one small dot.

Once the numbers of dots for the large, medium, and small dots have been obtained in this way, then a decision is made as to whether or not the processes described above have been performed for all of the pixels in the image (Step S410). If there are pixels that remain unprocessed, then processing returns to Step S400 and the series of processes is repeated, and when it is decided that the processes have been completed for all of the pixels in the image, then the process of determining the numbers of dots, using the dithering method, shown in FIG. 27, has been completed. The result is that the image data is split into a plurality of groups of pixels, and the numbers of large dots, medium dots, and small dots to be formed in each of the groups of pixels are obtained. FIG. 31 is an explanatory diagram illustrating, conceptually, the situation wherein the numbers of large dots, medium dots, and small dots to be formed in each of the groups of pixels have been obtained.

D-2-2. Details of the Process for Generating the Multilevel halftoning Resultant Values in the Second Embodiment The process of generating the multilevel halftoning resultant values in the second embodiment is based on the process of determining whether or not to form the large dots, medium dots, and small dots using the dithering method, explained above, where each of the pixels in the group of pixels have the representative tone value, and so the process of multilevel halftoning is performed on the representative tone value to produce a value that indicates the numbers of large, medium, and small dots. In other words, in the second embodiment, the multilevel halftoning resultant values express a combination of the numbers of the various types of dots to be formed in the groups of pixels. Given this, the correspondence relationships between the multilevel halftoning resultant values in the second embodiment and the combinations of the numbers of the various types of dots to be formed in the groups of pixels will be explained first.

FIG. 32 is an explanatory diagram showing the correspondence relationships between the multilevel halftoning resultant values in the second embodiment and the combinations of numbers of the various types of dots to be formed in the groups of pixels. In the second embodiment, there are a total of 165 possible combinations of the numbers of large dots, medium dots, and small dots to be formed in the groups of pixels, and a multilevel halftoning resultant value is assigned to each of these combinations. At this point, there are three types of dots that can be formed in a single pixel, a large dot, a medium dot, or a small dot, and because there are eight individual pixels included in a group of pixels, the combinations of the individual dots that can be formed in one group of pixels might be considered simply to be three raised to the $8^{th}$ power (=6,561). However, in practice there are only 165 possible combinations, as shown in FIG. 32. The reason for this is as follows:

Although a large dot, medium dot, or small dot may be formed in each pixel in the group of pixels, no more than a single dot may be formed in any given pixel, so the total number of dots cannot exceed the number of pixels in the group of pixels (which is eight in the example described above). Consequently, because the number of combinations of large, medium, and small dots is equal to the number of combinations when making eight selections, with replacement allowed, from the four possible states of "form a large date," "form a medium dot," "form a small dot," or "form no dot," this number can be calculated as:

$$_4H_8 = {_{4+8-1}C_8}$$

and thus there are 165 possible combinations. Here $_nH_r$ is a mathematical operator for calculating the number of combinations that can be obtained when making r selections with replacement allowed, from n objects (the number of combinations with replacement). $_nC_r$ is the mathematical operator for calculating the number of possible calculations when making r selections, without replacement allowed, from n objects.

If there are 165 possibilities, then these possibilities can be expressed using eight bits, and so the multilevel halftoning resultant values in the second embodiment will be eight bit data. If three types of dots, large, medium, and small, can be formed, then for each pixel there are four possible states, to form a large, medium, or small dot, or to form no dot at all, and thus two bits per pixel are necessary to express these states. Because there are eight pixels in the group of pixels, 16 bits are required to express the states that are assumed by each individual pixel in the group of pixels. This calculation shows that outputting the multilevel halftoning resultant values instead of outputting whether or not to form dots in each of the pixels can reduce the amount of data by half.

Figure 33:
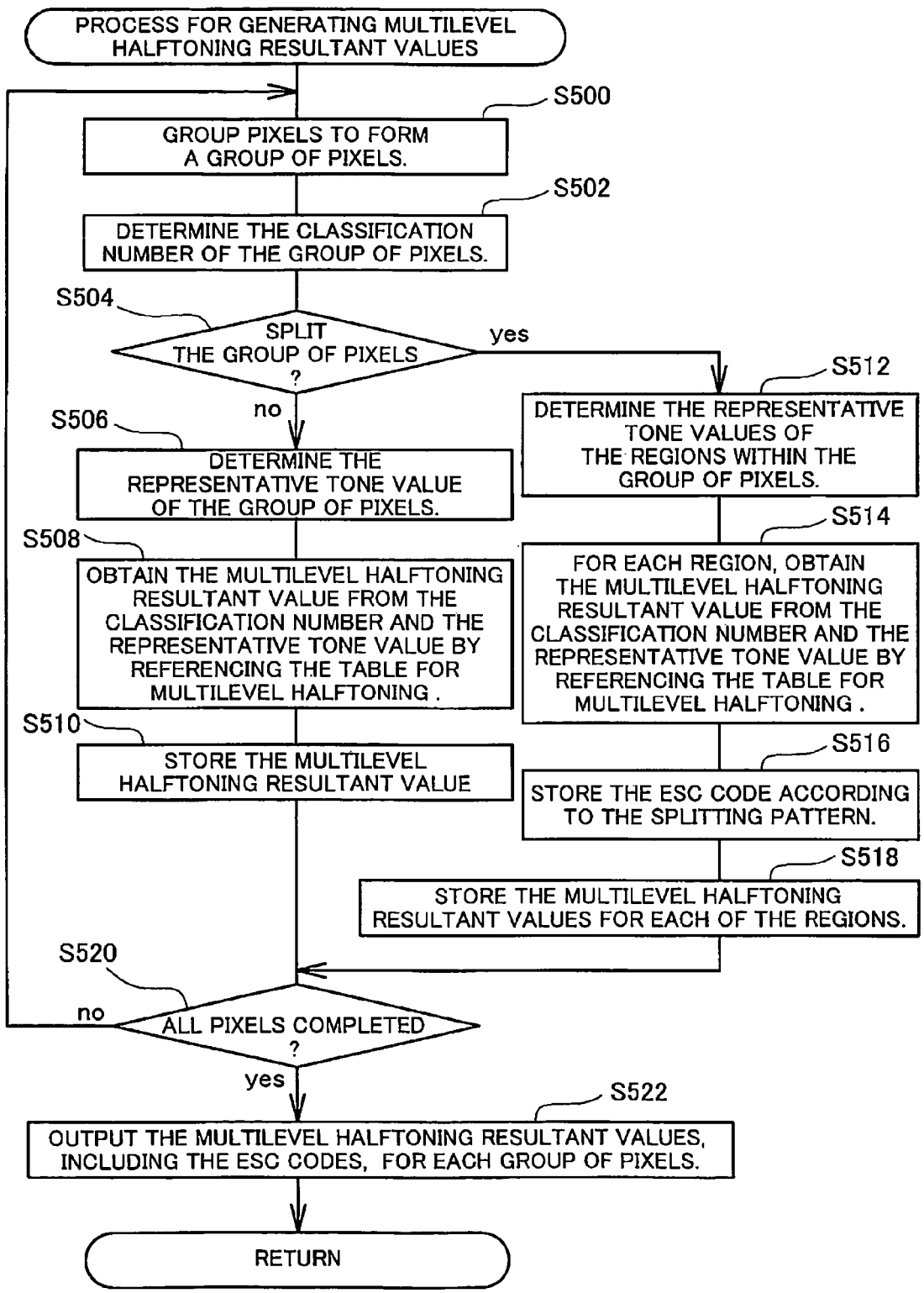
FIG. 33 is a flow chart illustrating the flow of the multilevel halftoning resultant value generating process in the second embodiment

FIG. 33 is a flow chart illustrating the flow of the process for generating the multilevel halftoning resultant values in the second embodiment. As described above, the multilevel halftoning resultant values in the second embodiment are different from the multilevel halftoning resultant values in the first embodiment in that, in the second embodiment, they are values the express the numbers of the different types of dots; however, aside from the table that is referenced for multilevel halftoning being different, the process of generating the multilevel halftoning resultant values is essentially the same as the process in the first embodiment, shown in FIG. 11. This process will be explained below, following the flow chart in FIG. 33.

When the process of generating the multilevel halftoning resultant values in the second embodiment is started, after first generating the groups of pixels that group together a specific number of neighboring pixels (Step S500), classification numbers are determined based on the positions of the groups of pixels within the image (Step S502). Next, decisions as to whether or not the split the groups of pixels are made based on the tone values of the individual pixels that are grouped into the groups of pixels (Step S504). At this point, for convenience in the explanation, the explanation will assume that only a single splitting pattern, wherein the group of pixels is divided into two equal parts, on the left and on the right, is provided, as shown in FIG. 12, as was the case in the first embodiment; however, as is illustrated in FIG. 25, a plurality of different splitting patterns may be provided instead. Moreover, when the decision is to not split a group of pixels (Step S504: NO), then, after the representative tone value for a group of pixels has been determined (Step S506) the multilevel halftoning resultant value corresponding to the classification number and the representative tone value of the group of pixels is obtained through referencing the table for multilevel halftoning. The multilevel halftoning resultant value for the group of pixels is determined in the same manner as in the first embodiment, described above.

FIG. 34 is an explanatory diagram illustrating, conceptually, the table for multilevel halftoning that is referenced in the process of generating the multilevel halftoning resultant values in the second embodiment. As is shown in the figure, the multilevel halftoning resultant values are defined in the table for multilevel halftoning in the second embodiment, in association with the classification numbers and representative tone values for the groups of pixels.

The multilevel halftoning resultant values are values wherein the numbers of the various types of dots are calculated using the methods explained in FIGS. 27 through 30, based on the assumption that all of the individual pixels within the group of pixels have the same tone value as the representative tone value, and the combination of numbers of dots obtained has been converted according to the correspondence relationship shown in FIG. 32. The multilevel halftoning resultant values obtained in this way are established in advance in the table for multilevel halftoning shown in FIG. 34, and so in the process of generating the multilevel halftoning resultant values in the second embodiment, the multilevel halftoning resultant values can be obtained immediately from the classification numbers and representative tone values of the groups of pixels by merely referencing the table. When there has been a decision to not split the group of pixels, the multilevel halftoning resultant values obtained through this process are stored (Step S510 in FIG. 33).

On the other hand, when the decision is to split the groups of pixels (Step S504: YES), then after the representative tone values have been determined for each of the regions that was generated through splitting the group of pixels (Step S512) then the multilevel halftoning resultant values for each of the regions is obtained through referencing the table for multilevel halftoning using the respective combinations of classification numbers for the groups of pixels, and the representative tone values (Step S514). At this point, for convenience in explanation, the explanation assumes that only one type of splitting pattern has been prepared for the groups of pixels, but instead the splitting pattern may be selected from a plurality of patterns. An ESC code, indicating the splitting pattern, is then stored (Step S516).

FIG. 35 is an explanatory diagram illustrating the situation wherein multilevel halftoning resultant values and ESC codes have been assigned in the second embodiment. As described above, the multilevel halftoning resultant values can assume 165 possible values, and when the values 0 through 164 are assigned to multilevel halftoning resultant values, the values 165 to 255 are left unassigned. Given this, a value selected arbitrarily from among the unassigned values (in this case, 255) is assigned to the ESC code. When a plurality of splitting patterns has been prepared for the groups of pixels, a plurality of values, corresponding to the types of splitting patterns, may be assigned to the ESC codes. In Step S516 of FIG. 33, ESC codes that are assigned corresponding to splitting patterns for the groups of pixels are stored.

Once the ESC code has been stored in this way, then the multilevel halftoning resultant values obtained for each of the regions are stored (Step S518). The multilevel halftoning resultant values are obtained for each of the regions generated by splitting the group of pixels. Consequently, when splitting the group of pixels into N regions, the number of multilevel halftoning resultant values stored following the ESC code will also be N. Moreover, if patterns wherein the groups of pixels are split into different numbers of regions, then the number of multilevel halftoning resultant values stored following the ESC code may vary depending on the splitting pattern.

Once the multilevel halftoning resultant values have been stored for the groups of pixels, as described above, then a decision is made as to whether or not processing has been completed for all of the pixels in the image data (Step S520), and if there are unprocessed pixels remaining (Step S520: N), then processing returns to Step S500, a new group of pixels is generated, and the sequence of processes repeats. These operations are repeated, and once it is determined that processing has been completed for all pixels (Step S520: YES) then the multilevel halftoning resultant values alone, for those groups of pixels that are not split, and the ESC codes indicating the splitting patterns, along with the multilevel halftoning resultant values, for those groups of pixels that are split, are outputted to the color printer 200 (Step S522), thereby completing the process of generating the multilevel halftoning resultant values in the second embodiment, shown in FIG. 33.

Figure 37:
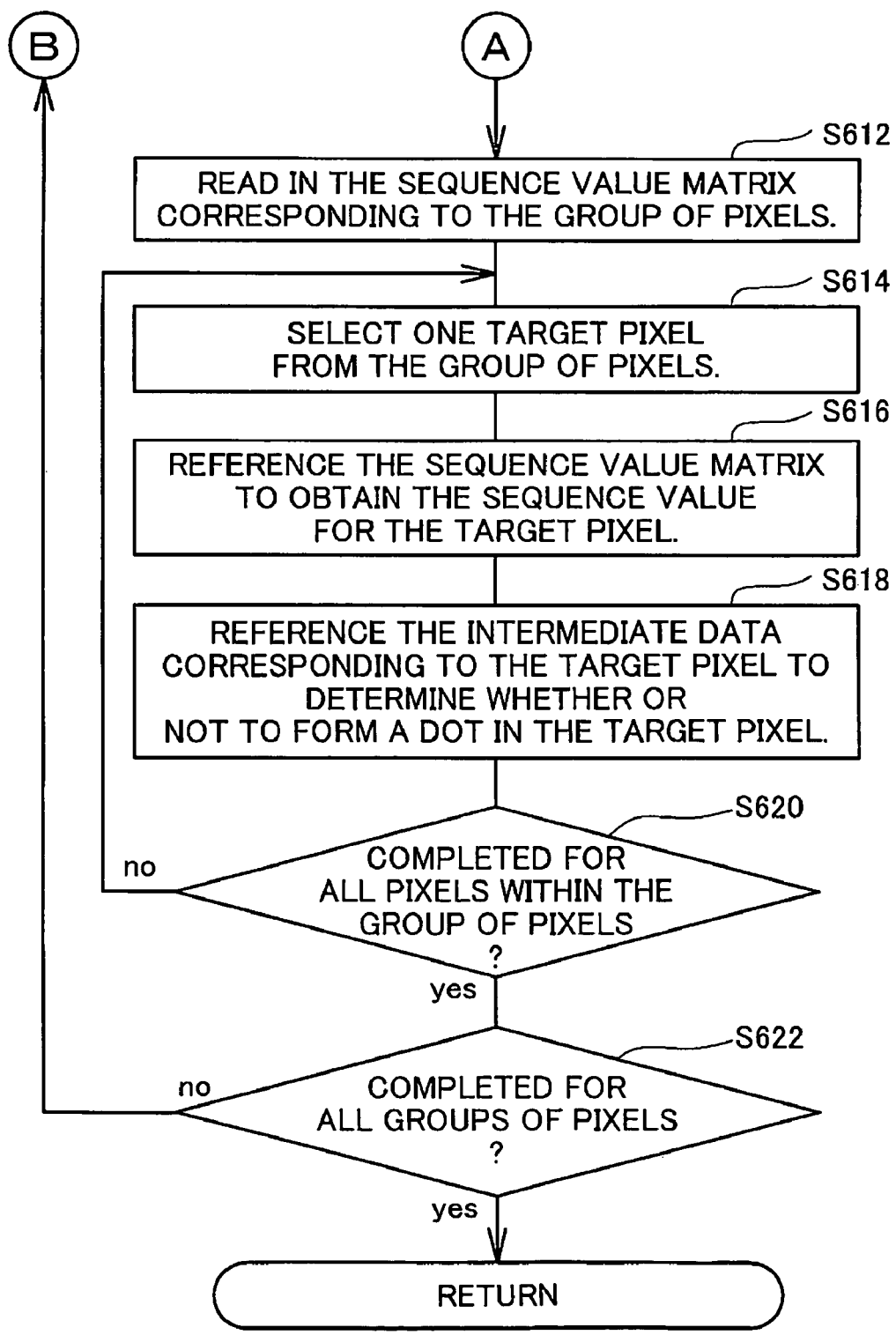
FIG. 37 is a flow chart illustrating the second half of the process for determining whether or not to form a dot in the second example of embodiment.

D-3. Process for Determining Whether or not to Form a Dot According to the Second Embodiment The process for determining whether or not to form the large, medium, and small dots in the color printer 200 after receiving the multilevel halftoning resultant values in the second embodiment will be explained next. FIG. 33 is a flow chart illustrating the process in the first half of the process for determining whether or not to form the dots in the second embodiment. FIG. 37 is a flow chart illustrating the processes in the second half of the process for determining whether or not to form dots in the second embodiment. The overall flow of the process, shown in these figures, is essentially the same as the process for determining whether or not to form dots in the first embodiment, described using FIG. 21. However, in the second embodiment the process is compatible with the ability to print large, medium, and small dots, and thus has a major difference in that the determination as to whether or not to form dots for each of the pixels is made after first converting the multilevel halftoning resultant values into intermediate data corresponding to the numbers of each of the types of dots to be formed in the group of pixels. The process by which to determine whether or not to form dots, in the second embodiment, will be explained below following these flow charts.

When the process for determining whether or not to form dots, in the second embodiment, is started, first one group of pixels to be processed is selected (Step S600), the first data for the multilevel halftoning resultant values supplied for that group of pixels is obtained (Step S602), and a decision is made as to whether or not the data that was obtained was an ESC code (Step S604). Because only a single type of splitting pattern for the groups of pixels is provided here and the ESC code 255 is assigned to the splitting pattern, this unit that a decision is made as to whether or not the data that has been read in Step S604 is 255.

Given this, if the data that has been read in is not an ESC code (Step S604: NO), then the decision is that the group of pixels is not split, and the data that has been read in is read as a multilevel halftoning resultant value (Step S606). On the other hand, if the data that has been read in is an ESC code (Step S604: YES) then it is decided that the group of pixels is split, and the specific number of multilevel halftoning resultant values stored following the ESC code are read in (Step S608).

Following this, the multilevel halftoning resultant value (or values) that have been obtained is converted to intermediate data that corresponds to the numbers of each of the types of dots to be formed within the group of pixels (Step S610). This conversion is performed by referencing a conversion table for the intermediate data. FIG. 38 is an explanatory diagram illustrating, conceptually, the conversion table for the intermediate data that is referenced in the process for determining whether or not to form dots, according to the second embodiment. As is shown in the figure, the conversion table is provided with intermediate data that is associated with the multilevel halftoning resultant values, where each of these intermediate data contains a list of values that indicate the types of dots to be formed, where the number of values in this list is equal to the number of pixels in a group of pixels.

For example, explaining the case wherein the multilevel halftoning resultant value is 1, the multilevel halftoning resultant value 1, as shown in FIG. 32 indicates the state wherein only a single small dot is to be formed within the group of pixels, or in other words, the state wherein there is one pixel, within the group of pixels, for which a small dot will be formed, and seven pixels within the group of pixels for which no dots will be formed at all. Given this, the intermediate data will be a string of seven 0 values, indicating that no dot is to be formed, and only one 1 value, indicating that a small dot is to be formed.

Note that in the intermediate data these values are sorted in ascending order. Consequently, the intermediate data corresponding to the multilevel halftoning resultant value of 1 will be 00000001.

In the case wherein the number of dots corresponding to the multilevel halftoning resultant value is, for example, two large dots, one medium dot, and three small dots, there will be two pixels wherein no dot is formed, so the first two values will be 0 values, indicating that not dot is to be formed, followed by three 1 values indicating that small dots are to be formed, followed by one 2 value, indicating that a medium dot is to be formed, finally followed by two 3 values, indicating that large dots are to be formed. Thus the intermediate data corresponding to this type of multilevel halftoning resultant value will be 00111233.

When there are three types of dots that can be formed, mainly large dots, medium dots, and small dots, each of the values included in the intermediate data can assume one of four values, 0 through 3, and thus each of these values can be expressed using two bits. Consequently, if there are eight pixels included in the group of pixels, then each intermediate data can be expressed using 16 bits.

Intermediate data, generated in this way, are provided corresponding to multilevel halftoning resultant values in the conversion table for the intermediate data, shown in FIG. 38. The multilevel halftoning resultant value for a group of pixels is converted into the intermediate data through referencing this type of conversion table in Step S610 in FIG. 36.

Next the process for reading in the sequence value matrix for the selected group of pixels is performed (Step S612 in FIG. 37). As was explained for the first embodiment, values (sequence values) indicating the order in which dots are formed are established, in the sequence value matrix, for each of the pixels in the group of pixels. A sequence value matrix is provided for each classification number for the groups of pixels.

Once the intermediate data and the sequence value matrix have been obtained for the selected group of pixels, then decision are made as to whether or not to form dots, while selecting one pixel at a time, from the group of pixels, to be the target pixel. This situation is explained in reference to FIG. 39.

Figure 39:
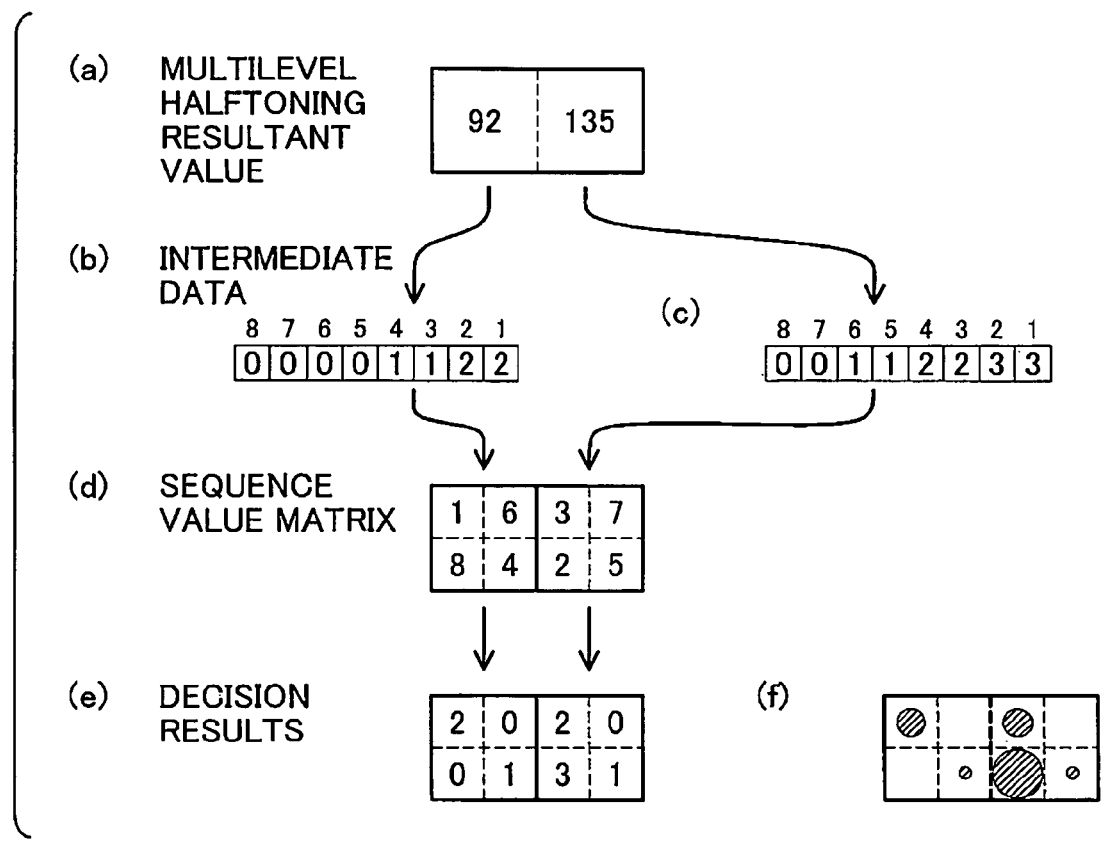
FIG. 39 is an explanatory diagram showing the situation when determining whether or not to form dots using the intermediate data and a sequence value matrix in the process of determining whether or not to form dots in the second embodiment.

FIG. 39 is an explanatory diagram illustrating the situation when determining whether or not to form dots, through the use of the intermediate data and the sequence value matrix, in the process of determining whether or not to form dots in the second embodiment. As one example, the multilevel halftoning resultant values are assumed to be as shown in (*a*) in FIG. 39, or in other words, the group of pixels is split into two regions, where the multilevel halftoning resultant value is assumed to be 92 for the left region and the multilevel halftoning resultant value is assumed to be 135 for the right region. Next these multilevel halftoning resultant values are converted into intermediate values. (*b*) in FIG. 39 and (*c*) in FIG. 39 illustrate the situations wherein the multilevel halftoning resultant values for the respective regions are converted into intermediate data. In the process for determining whether or not to form dots, in the second embodiment, decisions are made as to whether or not to form dots for each individual pixel in the group of pixels through the use of the intermediate data and the sequence value matrix.

The sequence value matrix of the group of pixels being processed is a matrix such as shown in (*d*) in FIG. 29. As described above, sequence values are provided in the sequence value matrix, where the sequence values indicate, for each pixel within the group of pixels, the pixel numbers in which to form dots. Because the group of pixels has been split into two regions, on the left and on the right, at this point the sequence value matrix is also split into two parts, the left and the right. Given this, the sequence values set for the region on the left are combined with the intermediate data for the left side of the group of pixels, and the sequence values for the right side of the matrix is combined with the intermediate data for the right side of the group of pixels.

One pixels is selected at random from the group of pixels, and it is assumed, as an example, that this pixel is the pixel at the upper left corner of the group of pixels. The sequence value of that pixel can be seen to be 1 through referencing the sequence value matrix in (*d*) in FIG. 39. Because the selected pixel is in the region on the left of the group of pixels, the intermediate data obtained for the region on the left is referenced. As was described above, the intermediate data contains values, sorted in a particular order, that indicate "form no dot," "form a small dot," "form a medium dot," and "form a large dot." On the other hand, when forming large, medium, and small dots, the large dots are formed first, followed by the medium dots, followed by the small dots. In other words, the order in which the types of dots are sorted in the intermediate data is opposite from the order in which the dots are actually formed. Consequently, reading the intermediate data from the end first can provide the information as to how many of each of the dots to form, for the large, medium, and small dots. At this point, the sequence value of the selected pixel is 1, and so the value at the end of the intermediate data for the region on the left is read out to obtain the value of 2, and thus the dot to be formed in this pixel can be determined to be a medium dot.

Moreover, when the pixel at the bottom right corner, for example, of the group of pixels is selected, the sequence value of that pixel is found to be 5 through referencing the sequence value matrix. Because the selected pixel is in the region on the right, the intermediate data for the right side of the group of pixels is referenced to readout the fifth value from the end to obtain the value of 1, thus enabling the decision that the dot to be formed for this pixel is a small dot.

In Step S614 through Step S620 in FIG. 37, the decisions as to whether or not to form dots are made while selecting target pixels one at a time from the group of pixels in this way. Simply explained, following the flow chart, first one pixel to be processed is selected from the group of pixels (Step S614 in FIG. 37) and then the sequence value for the pixel to be processed is obtained through referencing the sequence value matrix (Step S616). Next the intermediate data corresponding to the pixel to be processed is referenced to determine which of the dots, large, medium, or small, is to be formed (Step S168). In other words, if the group of pixels is not split, then only a single intermediate data is obtained, and a decision as to whether or not to form a dot is made by referencing this data. Moreover, if the group of pixels is split, then a plurality of intermediate data is obtained, and the decision as to whether or not to form a dot is made through referencing the intermediate data obtained for the region that contains the pixel being processed.

Figure 36:
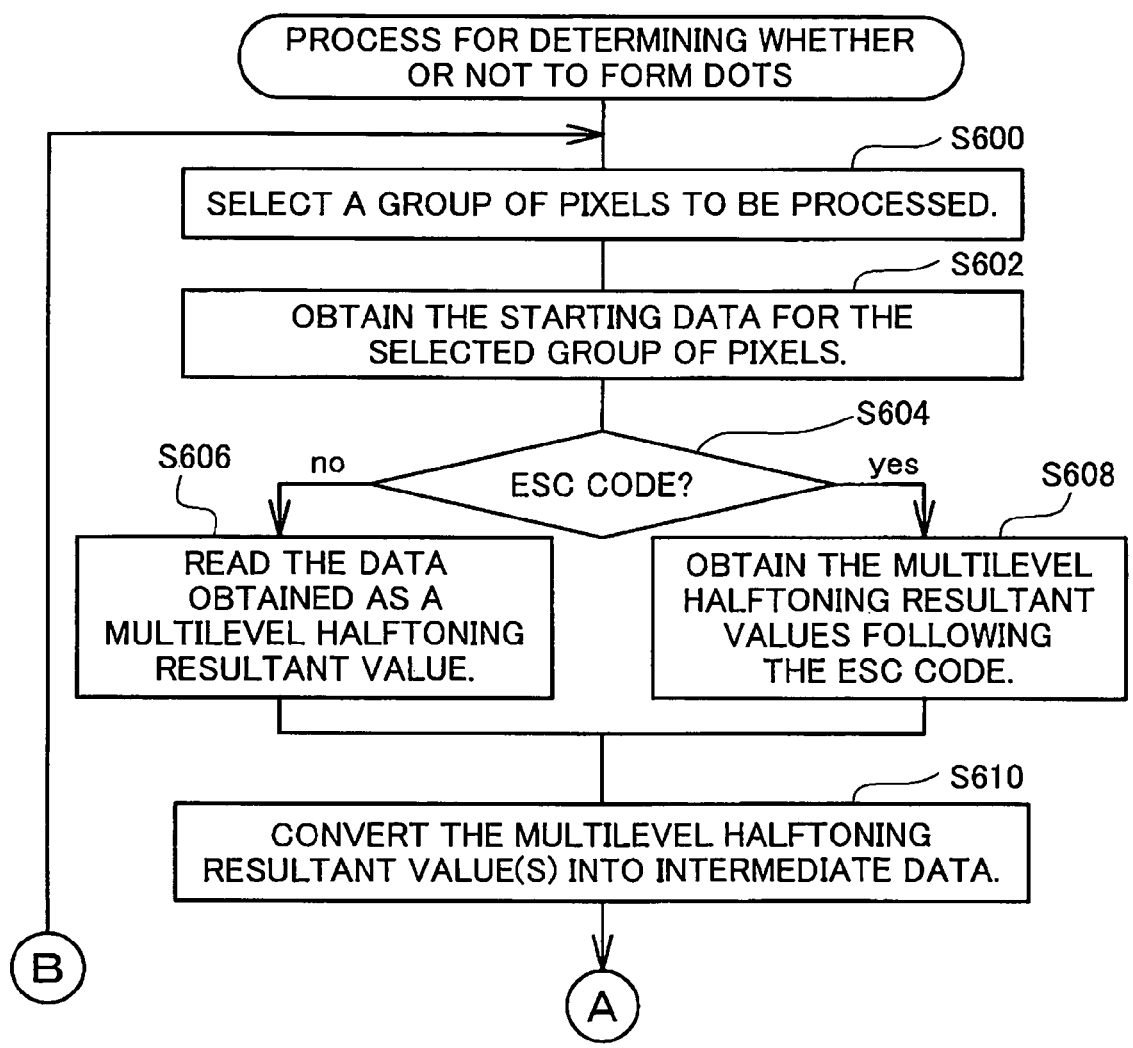
FIG. 36 is a flow chart illustrating the first half of the process for determining whether or not to form a dot in the second example of embodiment.

Once the decision has been made as to whether or not to form a dot for the pixel being processed, a decision is made as to whether or not decisions have been made for all of the pixels within the group of pixels (Step S620). If there is, within the group of pixels, still a pixel remaining for which the decision as to whether or not to form a dot has not been made (Step S620: NO), then processing returns to Step S614, a new pixel is selected, following which the same series of operations is performed to decide whether or not to form a dot. Once these operations have been repeated and it is determined that decisions have been made as to whether or not to form dots for every one of the pixels included in the group of pixels (Step S620: YES), then, at this point, a decision is made as to whether or not the operations described above have been performed for all of the groups of pixels (Step S622), and if there remain groups of pixels that have not yet been processed (Step S622: NO), then processing returns to Step S600, a new group of pixels is selected, and the series of operations described above is performed. Once the decision is made that these operations have been repeated for all of the groups of pixels, and that decisions have been made, for all of the pixels, as to whether or not to form dots (Step S622: YES), then the process by which to determine whether or not to form dots, according to the second embodiment, shown in FIGS. 36 and 37, is complete, and processing returns to the image printing process of FIG. 5.

The process for generating the multilevel halftoning resultant values (FIG. 33) and the process for determining whether or not to form dots (FIG. 36 and FIG. 37) performed in the image printing process according to the second embodiment, were explained above. In the image printing process according to the second embodiment, high quality images can be printed through forming large, medium, and small dots. Because the second embodiment can improve the image quality over that of the first embodiment, better results in terms of image quality can be exhibited more effectively through determining whether or not to form dots after splitting groups of pixels according to the distribution of tone values.

Moreover, in general the process for determining whether or not to form dots becomes more complex the greater the number of types of dots that can be formed, and the amount of data that must be provided from the computer to the printer increases. Because of this, even though printing dots of three different sizes, namely large, medium and small, can produce high quality images, doing so will inevitably have a tendency to slow down the print speed. However, even though the image printing process according to the second embodiment has increased the data length itself of the multilevel halftoning resultant values from four bits to eight bits, relative to the data length in the first embodiment, the process of generating the multilevel halftoning resultant values is unchanged in that all that is done is to reference the table for multilevel halftoning based on the representative tone value and the classification number for the group of pixels, enabling the outputting of the multilevel halftoning resultant values rapidly through an extremely simple process. Moreover, even though the multilevel halftoning resultant values are eight bits long, when compared to the 16 bits that are necessary for expressing whether or not to form the large, medium and small dots for each pixel, the amount of data is cut in half. Consequently, the multilevel halftoning resultant values can be provided rapidly to the color printer 200 from the computer 100, enabling the rapid outputting of high quality images.

On the other hand, even though the multilevel halftoning resultant values in the second embodiment are first converted into intermediate data when determining whether or not to form dots, the decision as to whether or not to form dots for the individual pixels can be made quickly based on the intermediate data and the sequence value matrix. Moreover, the process for converting the multilevel halftoning resultant values into intermediate data can also be performed quickly because of the simple process of merely referencing a table. Consequently, images can be outputted rapidly, without more complicated processes and without a loss of processing speed, despite the formation of the various types of dots (large, medium, and small) that makes it possible to output high quality images.

Additionally, because both the process for generating the multilevel halftoning valuation resultant values and the process for determining whether or not to form dots can be performed using simple processes in the second embodiment, as they can in the first embodiment, they can be performed at completely practical speeds, even on devices that lack the sophisticated processing capabilities of, for example, computers.

Even in the image printing process according to the second embodiment, explained above, the images processes can be performed with the groups of pixels always split, as was the case for processing in the second alternative form according to the first embodiment, explained above. Doing so enables the processing of groups of pixels with essentially fewer pixels while using the table for multilevel halftoning and the sequence value matrices from the groups of pixels that contain, for example, eight pixels without having to modify the table for multilevel halftoning or the sequence value matrices.

In addition, always splitting the groups of pixels so as to produce larger groups of pixels as the actual processing units enables a reduction in the about of data in the table for multilevel halftoning in the same way as the case in the second alternative form according to the first embodiment, described above. For example, as is shown in FIG. 34, the table for multilevel halftoning in the second embodiment, described above, provides multilevel halftoning resultant values for each combination of the 1024 groups of pixels and the 256 possible representative tone values, and because each individual multilevel halftoning resultant value is eight bits, the amount of data in the table for multilevel halftoning is 2 Mb. In other words, when grouping eight pixels into the groups of pixels, 2 Mb of memory capacity is required for storing the table for multilevel halftoning.

On the other hand, in the case wherein four pixels are grouped into the group of pixels, the number of groups of pixels increases to 2048. Because the range of values that can be assumed by the individual multilevel halftoning resultant values has 35 different types, from 0 to 34, the multilevel halftoning resultant values can be expressed with six bits. That is, when compared to the case wherein eight pixels are contained in the group of pixels, the number of groups of pixels is doubled while the data length of the individual multilevel halftoning resultant values is multiplied by a factor of 6/8, and thus the amount of data in the table for multilevel halftoning is multiplied by a factor of 1.5 to be 3 Mb.

Essentially, only 2 Mb is required when eight pixels each are grouped into the groups of pixels and a process is performed to always split the groups of pixels, where 3 Mb would be required for storing the table for multilevel halftoning when four pixels each are compiled into groups of pixels, and thus compiling eight pixels each into the groups of pixels and always performing a process to split the groups of pixels in half enables a reduction in the amount of memory required for storing the table for multilevel halftoning.

E. Third Embodiment

In the first embodiment and the second embodiment, described above, the significance of the multilevel halftoning resultant values was that the resulting values could be interpreted the same way regardless of the groups of pixels from which they were produced. For example, if, in the first embodiment, the multilevel halftoning resultant value was 3, then, regardless of the group of pixels from which that result was achieved, the multilevel halftoning resultant value indicated that three dots would be formed within the group of pixels. In the second embodiment, if the multilevel halftoning resultant value were 125, this would indicate that specific numbers of large dots, medium dots, and small dots were to be formed within the group of pixels according to the correspondence relationships shown in FIG. 32. In this way, if the multilevel halftoning resultant values obtained from different groups of pixels were the same, then the meanings of these resultant values could be interpreted identically. However, the detailed meanings of the multilevel halftoning resultant values can also be caused to differ depending on the group of pixels. Doing so enables the amount of data for the multilevel halftoning resultant values to be reduced. In particular, when the multilevel halftoning resultant values can assume many different values, such as the 165 possibilities in the second embodiment, reducing the amount of data in the multilevel halftoning resultant values can provide the multilevel halftoning resultant values more quickly. An image printing process according to his type of third embodiment will be explained below. Note that, as with the second embodiment, described above, the color printer 200 is capable of forming three different types of dots, large, medium, and small, in the third embodiment as well.

E-1. Process of Generating Multilevel Halftoning Resultant Values According to the Third Embodiment Although process of generating multilevel halftoning resultant values according to the third embodiment has a different table to be referenced for multilevel halftoning than in the process for generating multilevel halftoning resultant values in the second embodiment, described above, the overall flow of the processing is essentially identical. Although, in this way, the image printing process according to the present embodiment has processes that are more complex and more sophisticated, in many cases it is possible to simplify the actual flow of processing through simply modifying the table for multilevel halftoning. The process of generating multilevel halftoning resultant values according to the third embodiment will be explained below using the flow chart for the process of generating the multilevel halftoning resultant values according to the second embodiment, shown in FIG. 33.

When the process for generating multilevel halftoning resultant values, according to the third embodiment, is started, groups of pixels are formed by grouping together a specific number of neighboring pixels (corresponding to Step S500), and classification numbers are determined for the groups of pixels (corresponding to Step S502). Following this, decisions are made as to whether or not to split the groups of pixels, based on the tone values of the individual pixels that are grouped into the group of pixels (corresponding to Step S504). Here, for convenience in the explanation, it is assumed that the only splitting pattern splits the groups of pixels into two equal regions, on the left and on the right. Of course, a plurality of types of splitting patterns may be prepared, and the appropriate pattern may be selected depending on the distribution of tone values. The case wherein there is a plurality of splitting patterns will be explained below. When a decision is made so as to not split the group of pixels, then, after determining the representative tone value of the group of pixels in the same way as in the respective embodiments described above (corresponding to Step S506), the table for multilevel halftoning is referenced to obtain the multilevel halftoning resultant values corresponding to the classification number and representative tone value of the group of pixels.

Figure 40:
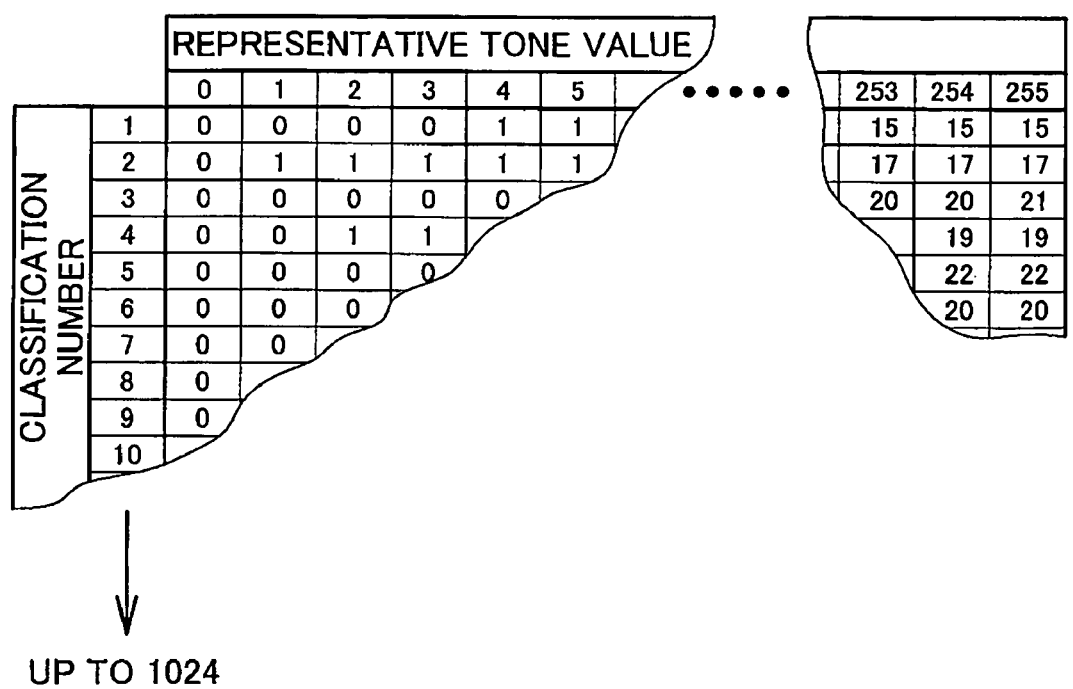
FIG. 40 is an explanatory diagram illustrating conceptually a table for multilevel halftoning, referenced in the process of generating the multilevel halftoning resultant values in a third embodiment.

FIG. 40 is an explanatory diagram illustrating, conceptually, a table for multilevel halftoning that is referenced in the process of generating the multilevel halftoning resultant values according to the third embodiment. As is clear from comparing this table for multilevel halftoning to the table for multilevel halftoning referenced in the process of generating the multilevel halftoning resultant values in the second embodiment, described above (See FIG. 34), the multilevel halftoning resultant values that are provided in the table for multilevel halftoning in the third embodiment are smaller than the multilevel halftoning resultant values in the second embodiment. This is because, when compared to setting, in the second embodiment, values wherein the multilevel halftoning resultant values can be interpreted identically regardless of the group of pixels, in the third embodiment, the values are set such that the multilevel halftoning resultant values can only be interpreted after specifying the groups of pixels from which they were obtained (or more precisely, after specifying the classification numbers for the groups of pixels).

Figure 41:
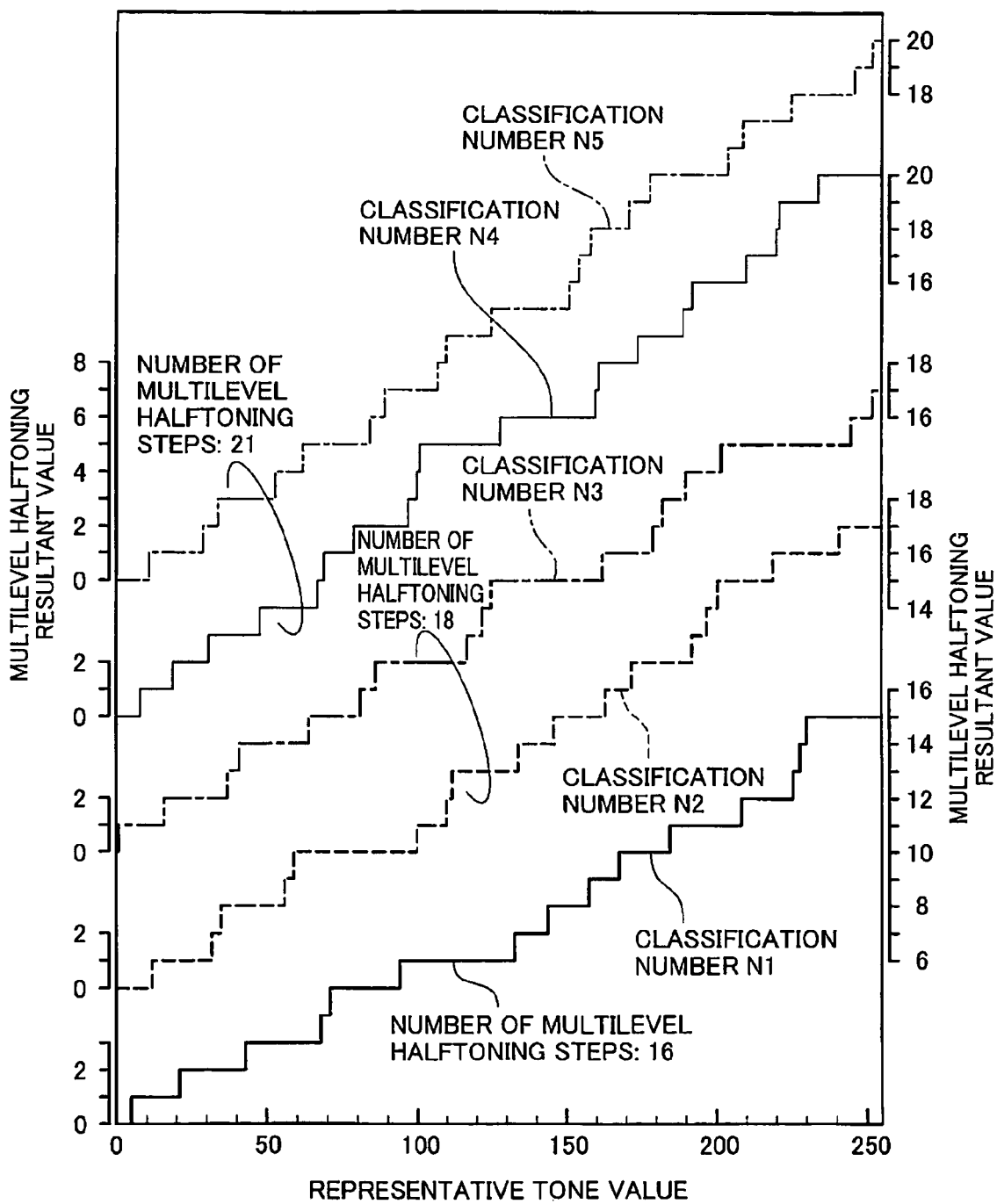
FIG. 41 is an explanatory diagram illustrating the correspondence relationship between the multilevel halftoning resultant values and the representative tone values determined for each classification number of the group of pixels in a table for multilevel halftoning in the third embodiment.

FIG. 41 is an explanatory diagram illustrating the correspondence relationship between the multilevel halftoning resultant values and the representative tone values that are set for each classification number of the groups of pixels in the table for multilevel halftoning according to the third embodiment. In the figure, the multilevel halftoning resultant values, set in relation to the representative tone values, are expressed using a curve in a graph wherein the horizontal axis shows the representative tone values and the vertical axis shows the multilevel halftoning resultant values. In the figure, multilevel halftoning resultant values are shown for five groups of pixels, having different classification numbers N1 through N5, but in order to prevent the curves for these groups of pixels from lying on top of each other and making them difficult to understand, the curves are shown in a state where the positions of the origins for the multilevel halftoning resultant values are shifted somewhat each time in the vertical direction.

The curve shown by the heavy solid line in FIG. 41 shows the correspondence relationship between the multilevel halftoning resultant value and the representative tone value for the groups of pixels in classification number N1, the multilevel halftoning resultant values of 0 is set for representative tone values of 0 to 4. for representative tone values 5 to 20, a multilevel halftoning resultant value of 1 is set. After this point, the multilevel halftoning resultant value increases to 2 when the representative tone value increases into the range of 21 to 42, and when the representative tone value increases into the range of 43 to 69, the multilevel halftoning resultant value increases to 3. In this way, the multilevel halftoning resultant value increases stepwise according to increases in the representative tone value, until, ultimately, the multilevel halftoning resultant value increases to 15. For the groups of pixels in classification number N2, shown by the heavy dotted line in the figure, and the groups of pixels in classification number N3, shown by the heavy single dotted line, the curves are set up similarly so that as the representative tone values increase from 0 to 255, the multilevel halftoning resultant values increase stepwise from 0 to 17. Furthermore, for the groups of pixels in classification number N4, shown by the thin solid line, and the groups of pixels in classification number N5, shown by the thin single dotted line, the curves are setup so that as the representative tone values increase from 0 to 255, the multilevel halftoning resultant value increase stepwise from 0 to 20. The result is that, for example, the groups of pixels in category N1 are subjected to multilevel halftoning such that the multilevel halftoning resultant values will be any of the values from 0 to 15 (in so-called 16-level valuation), the groups of pixels in classification numbers N2 and N3 are subjected to multilevel halftoning such that the multilevel halftoning resultant values will be any of the values from 0 to 17 (in so-called 18-level valuation), and the groups of pixels in classification numbers N4 to N5 will be subjected to multilevel halftoning such that the multilevel halftoning resultant values will be any of the values from 0 to 20 (in so-called 21-level valuation).

In this way, in the process of generating the multilevel halftoning resultant values according to the third embodiment, the number of levels for multilevel halftoning (the number of states that are possible as the result of multilevel halftoning) are not the same for all groups of pixels, but rather multilevel halftoning is performed with a particular number of levels depending on the classification number of the group of pixels. The result is that multilevel halftoning is performed so that the resultant values will be different, even if the multilevel halftoning is performed on identical representative tone values, if the classification numbers of the groups of pixels are different so that the numbers of levels for multilevel halftoning are different.

Moreover, even if the number of levels for multilevel halftoning are the same, this does not mean that identical multilevel halftoning resultant values will be obtained. For example, as is clear when comparing the groups of pixels in classification number N2 and the groups of pixels in classification number N3, shown in FIG. 41, even though the representative tone values for each of these groups of pixels are subjected to 18-level valuation, in most cases the representative tone values at which the multilevel halftoning resultant values change are not identical. The same is true for the groups of pixels in classification number N4 and the groups of pixels in classification number N5, where even though the representative tone values for both of these groups of pixels are subjected to 21-level valuation, the representative tone values wherein the multilevel halftoning resultant values change are usually not the same. Given this, even though the same number of levels are used in the multilevel halftoning of the groups of pixels, if the classification numbers are different, different multilevel halftoning resultant values will be obtained.

In this way, the multilevel halftoning resultant values that are provided in the table for multilevel halftoning in the third embodiment shown in FIG. 40, have different correspondence relationships between the representative tone values and the multilevel halftoning resultant values for each of the classification numbers for the groups of pixels.

In other words, the multilevel halftoning resultant values in the third embodiment are values that can only be interpreted after specifying the classification numbers of the groups of pixels for which the resultant values are obtained. Using values wherein the multilevel halftoning resultant values are dependent on the group of pixels in this way makes it possible to reduce the number of different possible values in the multilevel halftoning resultant values. In the example shown in FIG. 41, there are only 21 different possibilities, 0 to 21, for the multilevel halftoning resultant values, even in the groups of pixels in classification number N4 and the groups of pixels in classification number N5 which are the groups of pixels that have the greatest number of different multilevel halftoning resultant values. Actually, the possible values for the multilevel halftoning resultant values will not exceed 30 different possibilities, even when estimating on the high side, and if there are 30 possibilities, then the multilevel halftoning resultant values can be expressed completely using five bits. When compared to the eight bits that were required for expressing the multilevel halftoning resultant values in the second embodiment, this reduces the amount of data for the multilevel halftoning resultant values by a factor of ⅝. Note that the method of setting up the table for multilevel halftoning in the third embodiment, shown in FIG. 40, will be discussed below.

In the process for generating the multilevel halftoning resultant values in the third embodiment, after obtaining the multilevel halftoning resultant values through referencing the table for multilevel halftoning shown in FIG. 40 (corresponding to Step S508 in FIG. 33) for those groups of pixels for which the decision was to not perform splitting, the multilevel halftoning resultant values obtained are then stored (corresponding to Step S510).

On the other hand, in the process for generating the multilevel halftoning resultant values in the third embodiment when there has been a decision to split the groups of pixels (corresponding to Step 504: YES in FIG. 33), after the representative tone values have been determined for each of the regions generated through splitting the groups of pixels (corresponding to Step S512), the table for multilevel halftoning is referenced based on the classification numbers for the groups of pixels and on the respective representative tone values to obtain the multilevel halftoning resultant values for each of the regions (corresponding to Step S514). In other words, the number of multilevel halftoning resultant values generated equals the number of regions produced through splitting the groups of pixels. Following this, an ESC code that indicates the splitting pattern is stored, following which the multilevel halftoning resultant values generated for each of the regions is stored (corresponding to Steps S516 and S518).

FIG. 42 is an explanatory diagram illustrating the situation wherein a correspondence is defined between the multilevel halftoning resultant values and the splitting patterns in 5-bit data. As was explained above, in the third embodiment, values that are unique to the classification numbers for the groups of pixels are established for the multilevel halftoning resultant values, and thus, estimating on the high side, there will be no more than 30 possibilities for the multilevel halftoning resultant values for each of the classification numbers, so the multilevel halftoning resultant values can be expressed in five bits. Given this, the data indicating 31, which is not used as a multilevel halftoning resultant value, is assigned to the ESC code. Because, at this point, there is only a single splitting pattern for the groups of pixels, a single ESC code can be used to both split the group of pixels and to indicate the splitting pattern at the same time.

Once the multilevel halftoning resultant value has been stored for a group of pixels, as described above, a decision is made as to whether or not the processing has been completed for all of the pixels in the image data (corresponding to Step S520), and if there are remaining pixels that are yet to be processed, a new group of pixels is generated, after which the series of processes is repeated. Once these operations have been repeated and processing has been completed for all of the pixels, then, for the groups of pixels that are not split, the multilevel halftoning resultant values alone are outputted to the color printer 200, and for those groups of pixels that have been split, the multilevel halftoning resultant values are outputted together with the ESC code that indicates the splitting pattern (corresponding to Step S522) to complete the process for generating the multilevel halftoning resultant functions according to the third embodiment.

FIG. 43 is an explanatory diagram illustrating the situation when converting into multilevel halftoning resultant values the image data that is grouped into groups of pixels in the process for generating multilevel halftoning resultant values according to the third embodiment. (a) in FIG. 34 shows the situation wherein eight pixels are grouped into a group of pixels. The group of pixels A has tone values of 97 for all of the pixels. The group of pixels B has tone values 97 for the pixels in the region on the left half, and has tone values of 135 for the pixels in the right half. The adjacent group of pixels C has tone values of 135 for all of the pixels. (b) in FIG. 43 illustrates the situation wherein the representative tone values are determined in these groups of pixels. For the group of pixels A, a representative tone value of 97 is obtained. For the group of pixels B, the group of pixels is split into two regions, on the left and on the right, where the representative value of 97 is obtained for the region on the left, and the representative value of 135 is obtained for the region on the right. For the group of pixels C, a representative value of 135 is obtained.

(c) in FIG. 43 illustrates the situation wherein these representative tone values have been converted into multilevel halftoning resultant values, and these multilevel halftoning resultant values that have been obtained have been stored. The first value 15 is the multilevel halftoning resultant value for the group of pixels A. The following value, 31 is the ESC code that indicates that the group of pixels B, which follows the group of pixels A, has been split. Here there is only one splitting pattern, where the group of pixels is split into two equal regions, on the left and on the right, and thus by merely indicating that the group of pixels has been split, the splitting pattern is indicated at the same time. The two values following the ESC code of 31 indicate, respectively, the multilevel halftoning resultant value for the region on the left and the multilevel halftoning resultant value for the region on the right. Fundamentally, this unit that, for the group of pixels D, the multilevel halftoning resultant values are shown through the use of three values, including the ESC code. Note that even though the group of pixels A and the region on the left in the group of pixels B have the same representative tone values, the classification numbers are different for the respective groups of pixels, and thus the multilevel halftoning resultant values obtained are also different.

Following the three values that indicate the multilevel halftoning resultant values for the group of pixels B, the multilevel halftoning resultant value for group of pixels C is stored. Because this value 18 is not an ESC code, it can be seen that the group of pixels C is not split. Consequently, it is decided that the multilevel halftoning resultant value for this group of pixels is only the value 18, and the next value will indicate the multilevel halftoning resultant value for the group of pixels D. In the process of generating the multilevel halftoning resultant values according to the third embodiment, these types of multilevel halftoning resultant values are generated and outputted to the color printer.

Note that even though in the above there was a description of preparing only one type of splitting pattern for the groups of pixels, the preparation of a greater number of splitting patterns is also possible. For example, while in the description above the value 31, which was not used in the multilevel halftoning resultant values, was used as an ESC code, the value 30 is also an unused value, as shown in FIG. 42. Given this, the value 30 can be assigned to an ESC code that indicates a second splitting pattern. For example, the ESC code 30 may be used to indicate a pattern wherein the group of pixels is split into two equal regions, a top region and a bottom region, where, if the group of pixels is split into the two equal regions, that is, a top region and a bottom region, the multilevel halftoning resultant values for the respective regions may be stored following the ESC code 30.

Moreover, providing a greater number of splitting patterns enables the following. For example, as described above, even though the multilevel halftoning resultant values are 5-bit data, as shown in FIG. 41, these values may be increased by one bit to form 6-bit data. Because 6-bit data enables the expression of values from 0 to 63, the values from 30 to 63 can be assigned to different splitting patterns.

Conversely, the splitting patterns may be expressed through combinations of multiple ESC codes, as follows. For example, because the groups of pixels in the present embodiment are groups of pixels that are longer in the horizontal direction, grouping together four pixels in the primary scan direction (the horizontal direction in the figure) and two pixels in the secondary scan direction (the vertical direction in the picture), when splitting the groups of pixels, the most common case can be considered to be splitting into two regions, on the left and on the right. Given this, of the two ESC codes 30 and 31, one of these codes (for example, 31) can be assigned to the splitting pattern that can be expected to appear most often. Given that, the other splitting patterns may then be expressed as a combination of the other ESC code (for example 30) with another five bits of data. In other words, as in the example in (*d*) of FIG. 43, the first data for the group of pixels B being 30 may indicate that the group of pixels is split in a pattern other than two equal parts on the left and on the right, and that the specific splitting pattern is indicated by the data that follows (the 0 in the case shown in the figure). Of course, if the first data for the group of pixels B is 31, a decision may be made that the group of pixels is split into two equal regions, on the left and on the right, with the interpretation that the next two multilevel halftoning resultant values are the multilevel halftoning resultant values that were obtained for the respective left region and right region. Doing so enables the suppression of increases in the overall data size when the number of splitting patterns is increased, while allowing the use of a greater number of splitting patterns.

E-2. Process for Determining Whether or not to Form a Dot According to the Third Embodiment As was described above, in the process for generating the multilevel halftoning resultant values according to the third embodiment, multilevel halftoning resultant values that are unique to the classification numbers of the groups of pixels are generated, and outputted to the color printer 200, in order to reduce the amount of data for the multilevel halftoning resultant values. In other words, the meaning of the multilevel halftoning resultant values can only be interpreted after specifying the classification number of the group of pixels. Consequently, when this type of multilevel halftoning resultant value is received by the color printer 200 in the third embodiment, the process by which to determine whether or not to form dots, as described below, is performed to determine whether or not to form dots for each of the individual pixels within the group of pixels.

Figure 44:
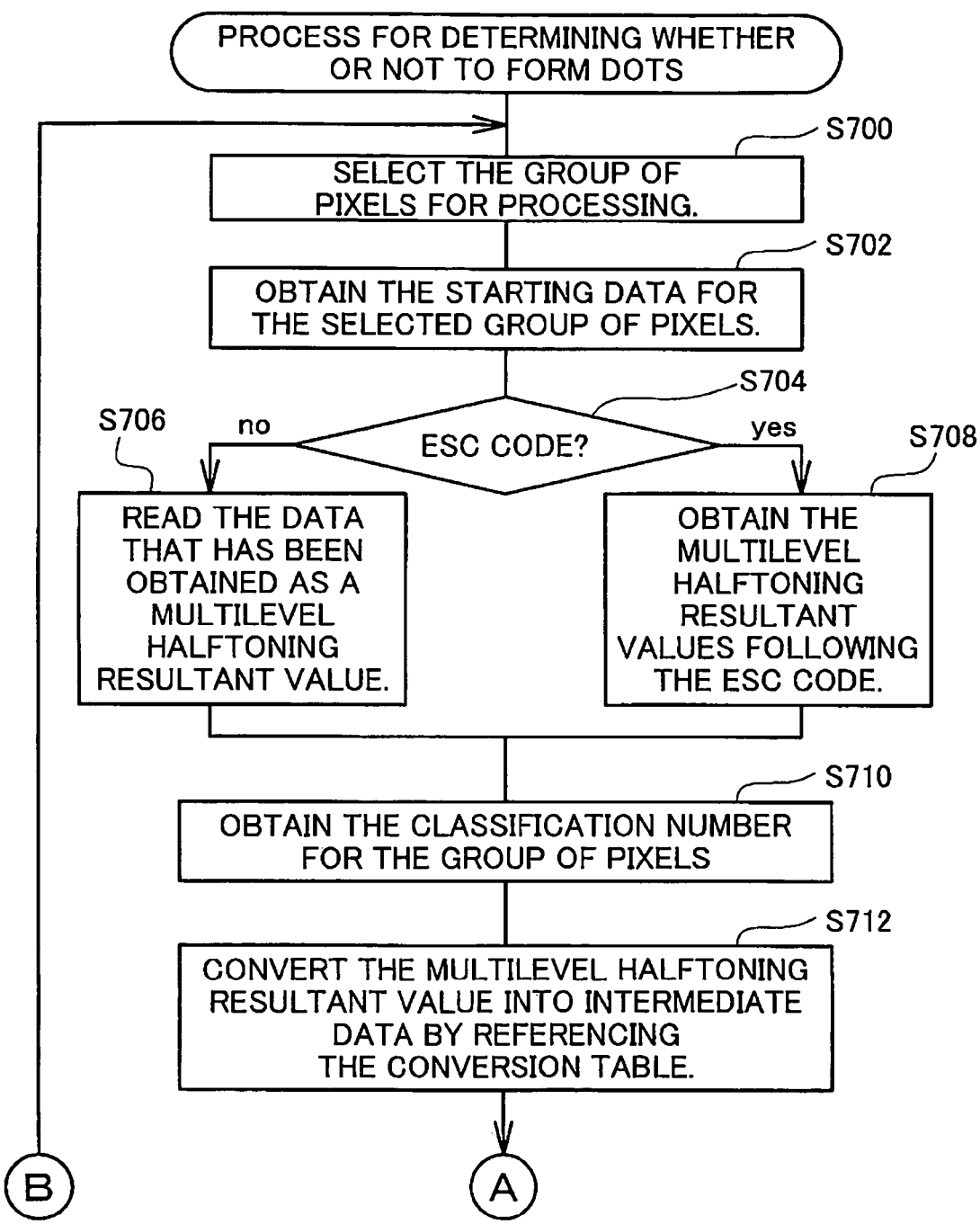
FIG. 44 is a flow chart illustrating the first half of the process for determining whether or not to form a dot in the third embodiment.
Figure 45:
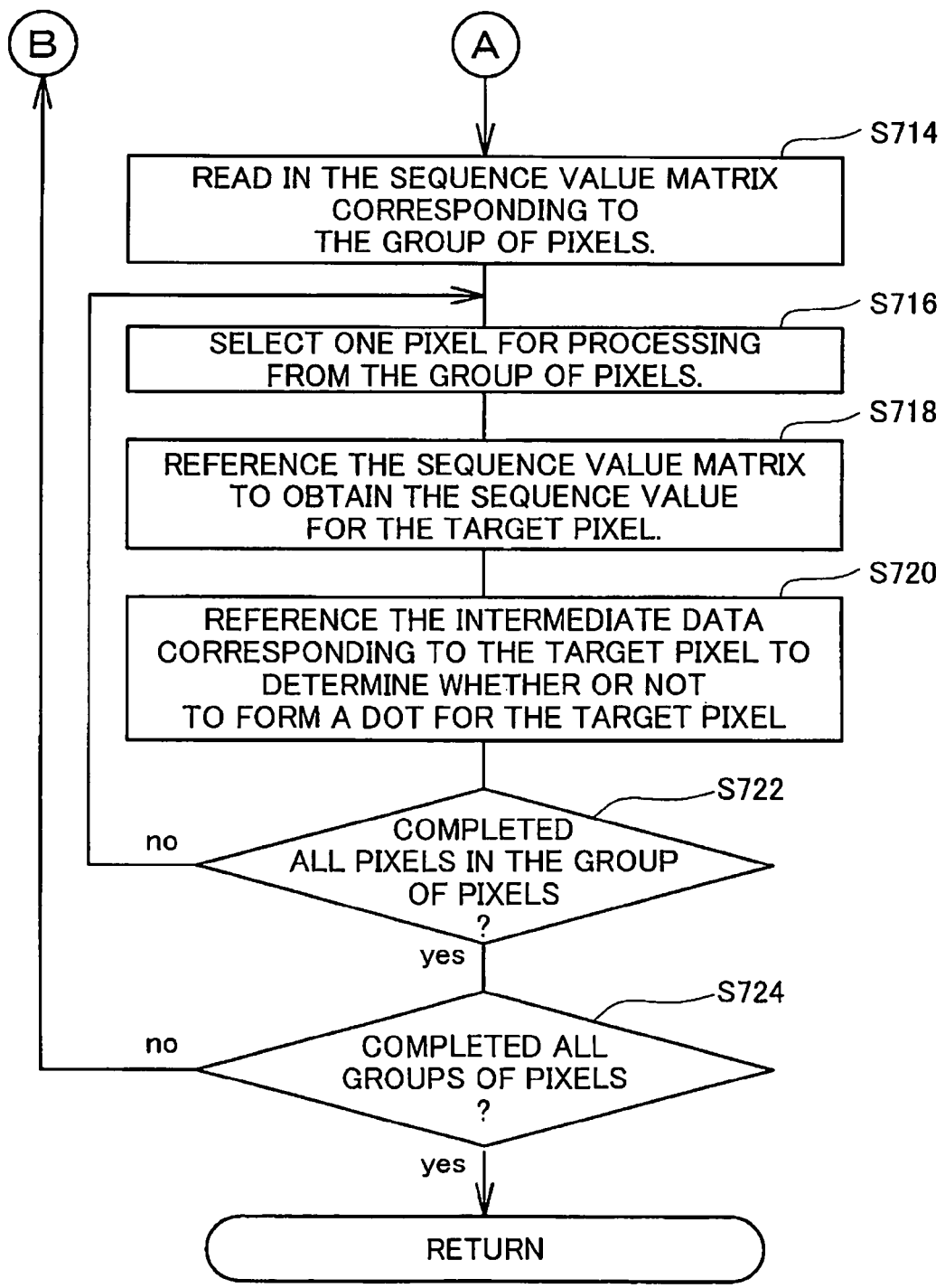
FIG. 45 is a flow chart illustrating the second half of the process for determining whether or not to form a dot in the third embodiment.

FIG. 44 is a flow chart illustrating the processes in the first half of the process for determining whether or not to form dots according to the third embodiment. FIG. 45 is a flow chart that illustrates the processes in the second half of the process for determining whether or not to form dots according to the third embodiment. The process for determining whether or not to form dots, according to the third embodiment, shown in the figures are, greatly different from the processes according to the second embodiment, explained above using FIG. 36 and FIG. 37, in the points that the multilevel halftoning resultant values received from the computer 100 are dependent upon the groups of pixels, and that the decisions as to whether or not to form dots for the individual pixels are made after converting these multilevel halftoning resultant values into intermediate data that do not depend on the groups of pixels. The processes for determining whether or not to form dots, according to the third embodiment, will be explained below, focusing on these points of difference relative to the second embodiment.

In the process for determining whether or not to form dots, according to the third embodiment, when the process is started a group of pixels to be processed is selected first, as was the case for the second embodiment, described above (Step S700).

Next the first data for the multilevel halftoning resultant values, provided for that group of pixels is obtained (Step S702) and a decision is made whether or not the data that was obtained is an ESC code (Step S704). If the data that has been read in is no an ESC code (Step S704: NO) it is determined that the group of pixels is not split, and the data that has been read in is taken to be a multilevel halftoning resultant value (Step S706). On the other hand, if the data that has been read in is an ESC code (Step S704: YES), then it is determined that the group of pixels is split, and a specific number of multilevel halftoning resultant values that are stored following the ESC code are obtained (Step 708).

In contrast to the case of the second embodiment, in the third embodiment the multilevel halftoning resultant values that have been read in this way can only be interpreted after specifying the classification number of the group of pixels for which the values were obtained. Here, in the process for determining whether or not to form dots, according to the third embodiment, the multilevel halftoning resultant value is first converted into data that does not depend on the classification number of the group of pixels, and then the decisions as to whether or not to form dots are made for the individual pixels in the group of pixels. In preparation for the conversion of the multilevel halftoning resultant value into data that does not depend on the classification number, first a process is performed by which to obtain the classification number of the group of pixels (Step S710). The classification number of the group of pixels can be obtained as follows, based on the position of the group of pixels in the image.

FIG. 46 is an explanatory diagram illustrating the method of determining the classification number of a group of pixels. At this point, the group of pixels for which it is to be determined whether or not to form dots shall be assumed to be the ith group of pixels in the primary scan direction and the jth group of pixels in the secondary scan direction, defining as the reference the upper leftmost corner of the image. Moreover, this type of position for the group of pixels can be expressed as the coordinate value (i, j). Moreover, because normally the size of the dithering matrix is not as large as that of the image, the dithering matrix is used repetitively as it is moved across the image in the primary scan direction, as described above using FIG. 14.

Because a single dithering matrix includes 32 blocks in both the direction of the primary scan and the direction of the secondary scan (see FIG. 13b), defining the position of the applicable group of pixels within the dithering matrix as row I and column J enables I and J to be calculated using the following formulas:

$$I = i - int(i/32) \times 32$$

$$J = j - int(j/32) \times 32$$

In these formulas, "int" is the arithmetic operator, described above, that indicates integerizing by truncating all digits after the decimal point. Consequently, calculating I and J through the application of the equations above to the coordinate value (i, j) of the group of pixels shown that the group of pixels is at the I row and J column in the dithering matrix. Given this, the classification number can be calculated as follows:

$$I + (J-1) \times 32 \qquad (1)$$

The values I and J that indicate the position of the group of pixels within the dithering matrix can be calculated extremely easily, even without performing the calculations described above, by extracting the data of specific bits from the binary expressions of i and j. FIG. 47 is an explanatory diagram illustrating specifically the method for calculating the position of a group of pixels within the dithering matrix from the coordinate value (i, j) of the group of pixels. (a) in FIG. 47 illustrates, conceptually, data that indicates the value i in a 10-bit binary notation. Note that in (a) in FIG. 47, serial numbers from 1 to 10 are assigned, associated with the most significant bit through the least significant bit, to identify the individual bits.

When calculating the value I, which indicates the position of the group of pixels, int (i/32) is calculated first. This calculation can be performed by shifting the binary data for i by five bits to the right (see (b) in FIG. 47). Int (i/32)×32 is calculated next. This calculation can be performed by shifting the binary data for int (i/32) by five bits to the left (see (c) in FIG. 47). Finally, the value for 1 can be obtained by subtracting the value for i from int (i/32)×32. This operation is, essentially, none other than simply extracting the five least significant bits from the binary expression for the value i, so the value of I can be obtained extremely easily. Similarly by merely extracting the five least significant bits from the binary expression for the value of j allows the value for J to be obtained extremely easily. Calculating these values for 1 and J enables the calculation of the classification number using equation (1), above.

In Step S710 of the process for determining whether or not to form dots according to the third embodiment, shown in FIG. 44, the classification number for the group of pixels to be processed is obtained in this way. Following this, the conversion table, set up in advance, is referenced to convert the multilevel halftoning resultant value, which is expressed in a form that is dependent on the group of pixels, into intermediate data, which is expressed in a form that is not dependent on the group of pixels (Step S712).

FIG. 48 is an explanatory diagram illustrating, conceptually, the conversion table that is referenced when converting the multilevel halftoning resultant values into intermediate values. As is shown in the figure, the conversion table that is referenced in the process of determining whether or not to form dots, in the third embodiment is provided with intermediate data, in association with combinations of multilevel halftoning resultant values and the classification numbers of the groups of pixels. The DD (n, m) shown in the figure indicates the intermediate data when the classification number of the group of pixels is n and the multilevel halftoning resultant value of the group of pixels is m. Moreover, this intermediate data is expressed in a format, as shown in FIG. 38, that indicates the types of dots to be formed in that group of pixels, and the quantities of each type of dot. Given this, this intermediate data, as described above, can be interpreted identically regardless of the group of pixels to which the data applies. Consequently, referencing the conversion table shown in FIG. 48 enables the multilevel halftoning resultant values, which are dependent on the groups of pixels, to be converted into intermediate data, which expresses, in a format that is not dependent on the group of pixels, the types and numbers of the dots to be formed in that group of pixels.

Once a multilevel halftoning resultant value is converted into intermediate data in this way, then next the process for reading in the sequence value matrix associated with the selected group of pixels is performed (Step S714 in FIG. 45). As described above, the sequence value matrix is provided with values (sequence values) that indicate the order in which the dots are to be formed for the individual pixel within the group of pixels. Following this, the intermediate data and the sequence values, provided in the sequence value matrix, are referenced for the selected group of pixels, in the same manner as in the second embodiment, described above, while selecting one target pixel at a time from the group of pixels to determine whether or not to form a dot for the selected pixel. In other words, one pixel to be processed (the target pixel) is selected from the group of pixels (Step S716) and the sequence value matrix is referenced to obtain the sequence value for the target pixel (Step S718). Following this, the intermediate data that applies to the target pixel is referenced to determine which of the dots, large, medium, or small, is to be formed (Step S720). At this time, if the group of pixels is split, then a plurality of intermediate data will be obtained, so the determination of whether or not to form dots is performed through referencing the intermediate data obtained for the region that includes the target pixel. On the other hand, there is only a single intermediate data for a group of pixels that is not split, and so the determination as to whether or not to form the dot is performed referencing this data.

While selecting individual target pixels in this way from the group of pixels, the operations described above are repeated (Step S722) until decisions as to whether or not to form dots have been made for all of the pixels, and once decisions as to whether or not to form dots have been made for all of the pixels, then a decision is made as to whether or not the operations described above have been performed for all of the groups of pixels (Step S724). If there are remaining groups of pixels that have not yet been processed, then processing returns to Step S700, a new group of pixels is selected, and the series of operations, describe above, is performed again. Once these operations have been performed for all of the groups of pixels so that decisions have been made as to whether or not to form dots for every one of the groups of pixels, then the process for determining whether or not to form dots, according to the third embodiment shown in FIG. 44 and FIG. 45 has been completed.

In the image printing process according to the third embodiment, described above, multilevel halftoning resultant values that are dependent on the groups of pixels are generated when perform multilevel halftoning on the representative tone values of the groups of pixels, making it possible to reduce the amount of data that must be outputted to the color printer 200 from the computer 100. Because of this, even when groups of pixels are split, in a given proportion, it is still possible to control the increase in the amount of data due to the splitting, enabling the multilevel halftoning resultant values to be outputted quickly. Moreover, the process of generating multilevel halftoning resultant values in this way can be performed easily through referencing a multilevel halftoning table in the same manner as in the other embodiments, described above. As a result, it is possible to provide the multilevel halftoning resultant values for the individual groups of pixels rapidly. Additionally, the decision as to whether or not to form dots can be made appropriately for the individual pixels within the groups of pixels through splitting the groups of pixels depending on the distributions of tone values within the groups of pixels enabling the outputting of high quality images.

E-3. Method of Setting Up the Table for Multilevel Halftoning According to the Third Embodiment The method of setting up the table for multilevel halftoning (see FIG. 40), referenced in the process of generating the multilevel halftoning resultant values in the third embodiment, will be explained next. As described above, the table for multilevel halftoning is provided with multilevel halftoning resultant values corresponding to the representative tone values, for each classification number of group of pixels, and the representative tone values are converted into multilevel halftoning resultant values, which depend on the classification number of the group of pixels as shown in FIG. 41, through performing multilevel halftoning while referencing the table for multilevel halftoning.

The table for multilevel halftoning in the present embodiment is set up based on the method disclosed in Japanese Patent 3292104, described above using FIG. 27 through FIG. 30, or in other words, set up based on a procedure wherein the dithering method is deployed so as to enable the decision as to whether or not to form dots with a plurality of different sizes.

As described above, in the process for generating multilevel halftoning resultant values, groups of pixels are formed and multilevel halftoning is performed through expressing, in the form of a representative tone value, the image data of all of the individual pixels included within the group of pixels. First it will be assumed that there is image data for which every one of the pixels within the group of pixels has the same tone value as the representative tone value, and the decisions as to whether or not to form dots will be considered for the large, medium, and small dots for each of the individual pixels. The decision as to whether or not to form dots, for each type of dot, is performed using the halftone process described using FIG. 28.

Figure 49:
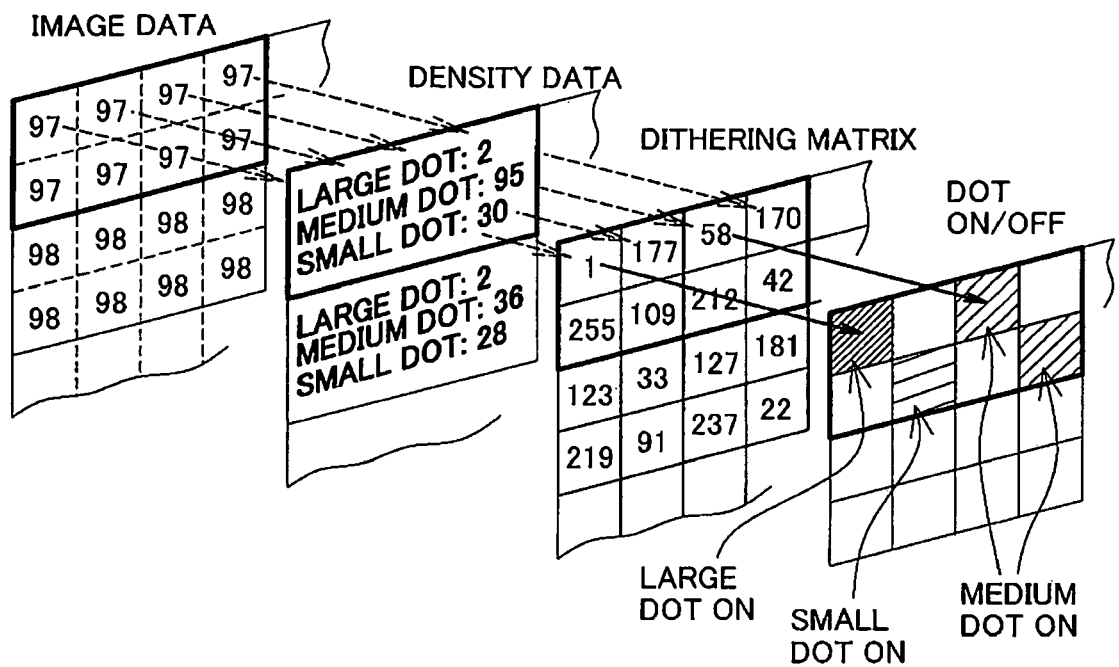
FIG. 49 is an explanatory diagram illustrating conceptually the situation when determining whether or not to form large, medium, or small dots for each pixel in a group of pixels.

FIG. 49 is an explanatory diagram indicating, conceptually, the situation wherein decisions are made as to whether or not to form large, medium, and small dots for each of the individual pixels within a group of pixels. In the figure, the group of pixels that is targeted for performing the half tone process is shown surrounded by the heavy solid line. The group of pixels consists of eight individual pixels, and the image data in each of the individual pixels has the same tone value as the representative tone value (where, in the example in the figure, this tone value is 97). In order to determine whether or not to form dots for each of the large, medium, or small dots, the image data is converted into density data for each type of dot. The conversion into density data is performed through referencing the dot density conversion table, described above using FIG. 29. Here all of the pixels within the group of pixels have the same image data, and so the density data for each type of dot is also identical for each individual pixel. In the example shown in the figure, a case is shown wherein the tone value of the density data for large dots is 2, the tone value for the density data for medium dots is 95, and the tone value for density data for small dots is 30.

Next, as was described above using FIG. 28, the density data for the large dots, the intermediate data for the medium dots, or the intermediate data for the small dots are compared to the threshold values that are provided in the dithering matrix to determine, for each pixel, whether or not to form each type of dot. Here the threshold value from the dithering matrix used in the comparison uses the threshold value that is provided in the location in the dithering matrix that corresponds to the group of pixels being processed. In the example shown in FIG. 49, the group of pixels is in the upper left corner of the image, and so, for the threshold values, the threshold values provided for the group of pixels in the upper left corner of the dithering matrix are used.

Moreover, the decision is made to form large dots for those pixels wherein the threshold values, of the eight threshold values that are provided for the group of pixels, are less than the density data for the large dots. Here the density data for the large dots is the tone value of 2, and so the only pixel for which a large dot will be formed is the pixel that has the threshold value of 1. FIG. 49 shows, with thin diagonal lines, the pixel for which the decision was made to form a large dot. Decisions are made to form medium dots in the pixels for which there are threshold values that are smaller than the intermediate data 97 for medium dots, which is obtained through adding the density data for medium dots to the density data for large dots, and which is larger than the density data of 2 for large dots. There are only two of these pixels, the pixel wherein the threshold value is 42 and the pixel wherein the threshold value is 58. In FIG. 49, the pixels for which the decision has been made to form medium dots are marked with the somewhat sparse diagonal lines. Moreover, finally the decision is made to form small dots in the pixels wherein there are threshold values that are smaller than the intermediate data of 127 for small dots, obtained through adding the intermediate data for medium dots to the density data for small dots, and which is larger than the intermediate data 97 for medium dots. There is only one of such pixels, the pixels for which the threshold value is 109. In FIG. 49, the pixel for which the decision is to form a small dot is indicated by the sparse diagonal lines. In this way, the results of the determinations as to whether or not to form large dots, medium dots, and small dots was that one large dot, two medium dots, and 1 small dot will be formed when the representative tone value of the group of pixels being processed is 97.

If the representative tone value is very different, then the numbers of large dots, medium dots, and small dots to be formed within the group of pixels will be different as well. Moreover, if the representative tone values vary between 0 and 255, then the numbers of large dots, medium dots, and small dots that would result would vary over a variety of steps. Moreover, if the classification number of the group of pixels is different, then the threshold values in the dithering matrix would also be different, and thus the way in which the numbers of dots change should different as well. The table for multilevel halftoning, shown in FIG. 40, is set up by investigating, for each classification number, the behavior when the number of each of the types of dots changes in a stepwise fashion when varying the representative tone value from 0 to 255.

Figure 50:
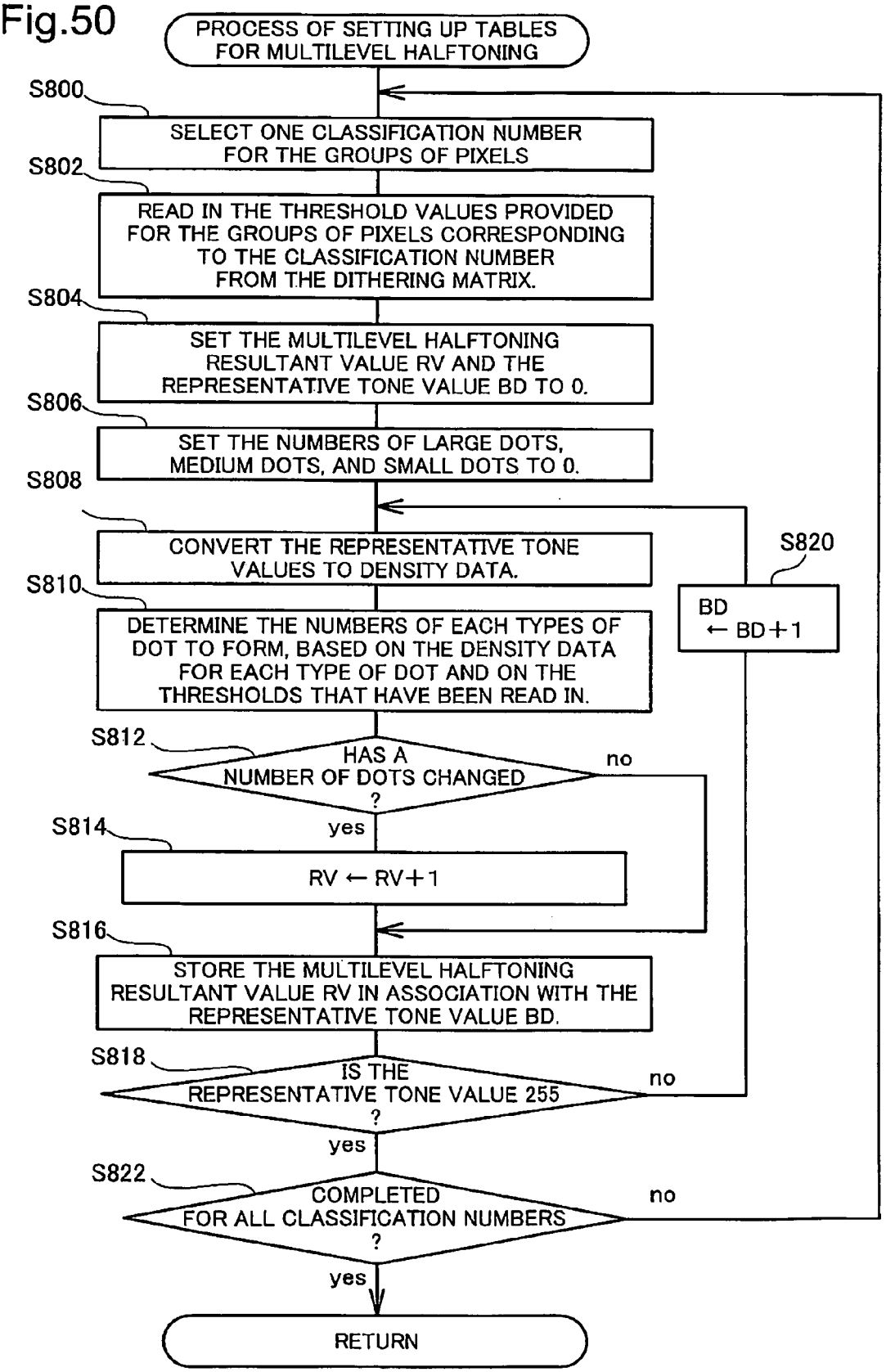
FIG. 50 is a flow chart illustrating the flow of the process for setting the table for multilevel halftoning that is referenced in the process of generating the multilevel halftoning resultant values in the third embodiment.

FIG. 50 is a flow chart illustrating the flow of the process for setting up the table for multilevel halftoning that is referenced in the process of generating the multilevel halftoning resultant values in the third embodiment. The explanation below will follow the flow chart. When the process for setting up the table for multilevel halftoning is started, first a single classification number for groups of pixels is selected (Step S800). For example, it is assumed here that classification number 1 is selected.

Next, the threshold values corresponding to the groups of pixels for the selected classification number are read out from the dithering matrix (Step S802). For example, because classification number 1 is selected here, the eight threshold values setup in the block unit marked as block 1 in FIG. 13*b* are read out from the dithering matrix illustrated in FIG. 6.

Following this the multilevel halftoning resultant value RV and the representative tone value BD are set to 0 (Step S804) after which the numbers of large dots, medium dots, and small dots to be formed are all set to 0 (Step S806).

Next, after the representative tone values have been converted to density data for large dots, medium dots, and small dots through referencing the dot density conversion table shown in FIG. 29 (Step S808), the number of dots to be formed for the large dots, medium dots, and small dots are determined based on these density data and on the threshold value that have already been read in (Step S810). In other words, as was explained using FIG. 28 through FIG. 30, the number of threshold values that are smaller than the large dot density value is calculated, and this number that is obtained is used as the number of large dots to be produced. Moreover, the number of threshold values that are higher than the density data for large dots and lower than the intermediate data for medium dots is calculated, and this number is defined as the number of medium dots to form. Finally, the number of threshold values that are higher than the intermediate data for medium dots and lower than the intermediate data for small dots is calculated, and this number is defined as the number of small dots to be formed.

A decision is made as to whether or not the numbers of dots to form, for each of these dots, obtained in this way, have changed relative to the numbers of dots to be formed, which had already been set up (Step S812). If the decision is that there has been a change to the number of dots to be formed (Step S812: YES), then the multilevel halftoning resultant value RV is increased by 1 (Step S814) and the multilevel halftoning resultant value RV, thus obtained is stored along with the representative tone value BD (Step S816). On the other hand, if the decision is that there is no change in the numbers of dots to be formed (Step S812: NO), then the multilevel halftoning resultant value RV is not incremented, and the existing value is stored in association with the representative tone value BD (Step 816).

Once the multilevel halftoning resultant value corresponding to a specific representative tone value has been stored, as described above, then a decision is made as to whether or not the representative tone value BD has achieved a tone value of 255 (Step S818). If the tone value of 255 has not been reached (Step S818: NO), then the representative tone value BD is incremented by 1 (Step S820), and processing returns to Step S808, after which the representative tone value BD is again converted into density data, the series of processes is performed again, and the multilevel halftoning resultant value RV is stored in association with a new representative tone value BD (Step S816). These operations are performed until the representative tone value BD reaches the tone value of 255. Once the representative tone value BD has reached the tone value of 255 (Step S816: YES), then all of the multilevel halftoning resultant values will have been set up for the selected group number.

After this, decisions are made, for all of the classification numbers, as to whether or not the processes such as described above been performed (Step S822) and if there are classification numbers remaining to be processed (Step S822: NO), processing returns to Step S800, and the processes described above are performed again. Once the processes have been repeated and it has been determined that all of the multilevel halftoning resultant values have been setup for all of the classification numbers (Step S822: YES), then the process of setting up the table for multilevel halftoning, shown in FIG. 50 is complete.

As is clear from the explanations above, the multilevel halftoning resultant values are determined by the density data for the large, medium, and small dots obtained by converting the representative tone values, and from the threshold values stored in a position in the dithering matrix corresponding to the group of pixels. Because, with the dot density conversion table shown in FIG. 29, the same table is referenced even if the classification number of the group of pixels is different, the density data for each dot, in relation to the representative tone values, will also be provided as identical density data, regardless of the classification number. However, the set of threshold values read out from the dithering matrix will be different for each classification number. The reason for this is that the dithering matrix is set up to distribute the threshold values a broadly as possible, and to be as random as possible, to avoid negative effects on image quality that occurs due to specific patterns appearing in the dots in the image or dots grouping together in adjacent locations. Because of this, when a plurality of threshold values, included in a group of pixels, is viewed as a set, the probability of having an exactly identical combination of threshold values can be considered to be extremely low. For this reason, the tables for multilevel halftoning, referenced in the process of generating multilevel halftoning resultant values in the third embodiment, will have different relationships between the representative tone values and the multilevel halftoning resultant values, and the frequency of changes in the multilevel halftoning resultant values (the number of steps in multilevel halftoning shown in FIG. 41) will also vary depending on the classification numbers.

E-4. Alternative Form According to the Third Embodiment

The tables for multilevel halftoning, which store the multilevel halftoning resultant values corresponding to each of the representative tone values from tone value 0 through tone value 255, are used in a process of generating multilevel halftoning resultant values according to the third embodiment. However, because the multilevel halftoning resultant values increase in a stepwise manner according to the increase in the representative tone values, storing only the representative tone values at which there are changes in the multilevel halftoning resultant values enables the multilevel halftoning resultant values to be calculated for the representative tone values. The process of generating multilevel halftoning resultant values for this type of alternative form of the third embodiment will be explained below.

Figure 51:
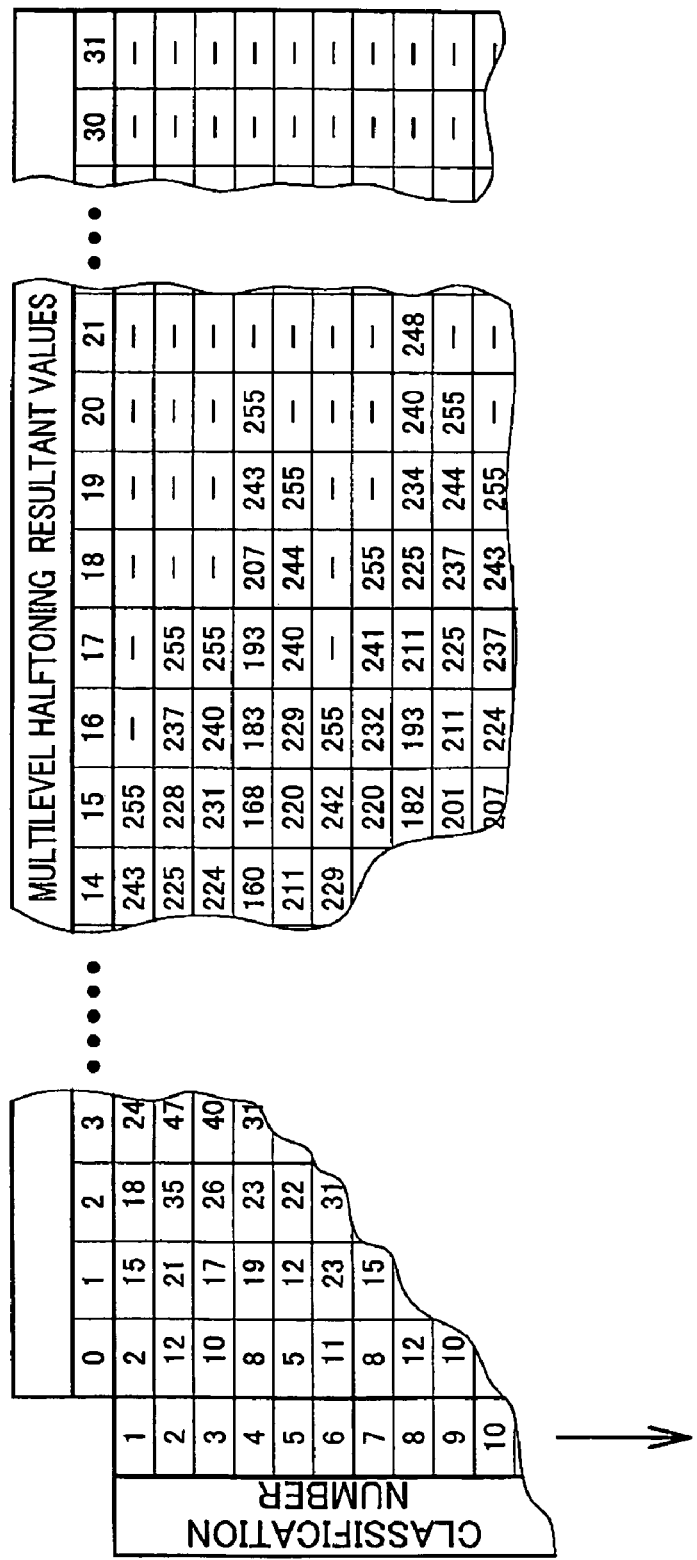
FIG. 51 is an explanatory diagram illustrating conceptually a threshold table that is referenced in the process of generating the multilevel halftoning resultant values in a alternative form of the third embodiment.

FIG. 51 is an explanatory diagram illustrating, conceptually, a threshold table that is referenced in the process of generating the multilevel halftoning resultant values in the alternative form of the third embodiment. As is shown in the Figure, threshold values corresponding to the multilevel halftoning resultant values are provided in the table for each of the classification numbers. These threshold values represent the largest representative tone values for a multilevel halftoning resultant value as the representative tone values are incremented from tone value 0 through tone value 255. An example will be explained for a group of pixels with the classification number 1. For the classification number 1, the threshold value for the multilevel halftoning resultant value is set to 2. If the representative tone value is in the range from 0 to 2, in a group of pixels with classification number 1, then the multilevel halftoning resultant value will be 0. Moreover, the threshold value for the multilevel halftoning resultant value of 1 is set to 15. This indicates that, for a group of pixels with a classification number of 1, the multilevel halftoning resultant value will be 1, if the representative tone value is in the range of 3 through 15. Similarly the threshold value of 243 for the multilevel halftoning resultant value of 14, and the threshold value 255 is set for the multilevel halftoning resultant value 15. This indicates that if the representative tone value is in the range of 244 through 255, then the multilevel halftoning resultant value will be 15, and that the maximum value for the multilevel halftoning resultant value will be 15 for a group of pixels in classification number 1.

Note that in FIG. 51 the threshold values for each of the classification numbers are set corresponding to the individual multilevel halftoning resultant values. However, rather than being associated with the multilevel halftoning resultant values in particular, sets of threshold values alone may be stored for each classification number. In such a case, the multilevel halftoning resultant values can be found by counting the threshold values that are lower than the representative tone value. This will be explained below, again using the example of the group of pixels of classification number 1. As an example, the representative tone value is assumed to be 20. The threshold values that are smaller than the tone value of 20, in the set of threshold values provided for classification number 1 are the three values of 2, 15, and 18. From this, the multilevel halftoning resultant value of 3 can be found for the representative tone value of 20.

After finding the representative tone value and the classification number for a group of pixels in the process of generating the multilevel halftoning resultant value in the alternative form of the third embodiment, described above, the threshold value table illustrated in FIG. 51 is referenced to generate the multilevel halftoning resultant value. The threshold table can be stored using less data than the table for multilevel halftoning (see FIG. 40) that is referenced in the process of generating multilevel halftoning resultant values in the third example, described above. Because of this, the amount of memory used can be conserved in the process of generating multilevel halftoning resultant values in this alternative form when compared to the process in the third embodiment. In contrast, in the process of generating the multilevel halftoning resultant values in the third embodiment, described above, the multilevel halftoning resultant values can be found immediately by merely referencing the tables for multilevel halftoning using the classification number and the representative tone value. In other words, the multilevel halftoning can be performed quickly because there is no need to compare the representative tone values to the threshold values as there is in the process in the alternative form.

Moreover, in the image printing process according to the third embodiment, explained above, the image processing can be performed while always splitting the groups of pixels, similar to the processes in the second alternative form in the first embodiment, described above. Doing so essentially allows processing of groups of fewer pixels while using the tables for multilevel halftoning and the sequence value matrices for groups of pixels that comprise, for example, eight pixels. Additionally, always splitting the groups of pixels and generating larger groups of pixels than the actual processing unit enables a reduction in the amount of data in the tables for multilevel halftoning, in the same manner as was true for the second alternative form of the first embodiment, described above. For example, a case will be described wherein a group of pixels will be split in two for processing, instead of generating groups of pixels that are half as large. In this case, the number of groups of pixels included in the tables for multilevel halftoning will be reduced by half. On the other hand, the length of the data for the individual multilevel halftoning resultant values will increase in size with the increase in size of the groups of pixels. Explaining the third example of embodiment, described above, briefly, when the number of pixels included in a group of pixels in 4, the individual multilevel halftoning resultant values are expressed in four bits, but when the number of pixels included in the group of pixels is increased to eight, the multilevel halftoning resultant values will be 5-bit data. However, the proportion by which the number of groups of data is decreased is greater than the proportion by which the length of the data in the multilevel halftoning resultant value is increased. Fundamentally, instead of producing small groups of pixels, the process of having large groups of pixels that are always divided in half can reduce, by a factor of ⅝, the amount of memory required for storing the tables for multilevel halftoning.

While descriptions have been provided above for various forms of embodiment according to the present invention, the present invention is in no wise limited to the forms of embodiment described above, but rather may be implemented in a variety of forms within a range that does not deviate from the intent thereof.

For example, while the embodiments above describe printing an image by forming dots on printer paper, the scope of application of the present invention is not limited to printing images. For example, the present invention may be applied well to a liquid crystal display, for example, that displays images by changing continuously the tone values by scattering light, with an appropriate density, in a liquid crystal display screen.

What is claimed is:

1. An image processing system for performing specific image processing on image data and for outputting dot data for forming dots on a recording medium based on the results of said image processing system, comprising:

correspondence relationship preparation unit that prepares in advance, for each group of pixels, each comprising a plurality of pixels, a correspondence relationship between a representative tone value, which is a tone value that represents said group of pixels, and a multilevel halftoning resultant value that represents the results of performing multilevel halftoning on each individual pixel that structures said group of pixels, wherein each of a plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations;

representative tone value determining unit that splits said groups of pixels, sequentially extracted from said image, into a plurality of regions and, for each region, determining a representative tone value for representing the tone value of said region;

multilevel halftoning unit that uses said determined representative tone values for each region to obtain a multilevel halftoning resultant value, for each of said regions, through referencing said correspondence relationships assigned to said groups of pixels belonging to said regions;

sequence value specifying unit that specifies sequence values that indicate the sequence in which will be formed the dots in each pixel in said pixel groups according to the correspondence relationships referenced when obtaining said multilevel halftoning resultant values;

dot data generating unit that generates dot data indicating whether or not to form a dot for each pixel within each of said regions based on said specified sequence value for said group of pixels to which region belongs and on said multilevel halftoning resultant values obtained for each of said regions; and output unit that outputs said dot data.

2. An image processing system in accordance with claim 1, wherein:

said representative tone value determining unit comprises:

split determining unit that determines whether or not to split said group of pixels based on specific conditions; and unit that determines, as said representative tone value, a tone value that represents said group of pixels, instead of said representative tone value for each of said regions, when said split determining unit has determined that said group of pixels will not be split; wherein said multilevel halftoning unit outputs said multilevel halftoning resultant value for said group of pixels, instead for each of said regions, when said group of pixels will not be split; and wherein said dot data generating unit generates said dot data based on said sequence values and on said multilevel halftoning resultant values for said groups of pixels when said groups of pixels will not be split.

3. An image processing system in accordance with claim 2, wherein said split determining unit determines said splitting based on the tone value of each pixel within said group of pixels.

4. An image processing system in accordance with claim 1, comprising:

dot forming unit that forms dots on a medium whereon said image can be formed; and image forming unit that forms said image on said medium by receiving said dot data that has been generated and drives said dot forming unit in accordance with said dot data.

5. An image processing system in accordance with claim 4, wherein at least each unit from said correspondence relationship preparing unit through said image forming unit are housed in a single casing as a printing device.

6. An image processing system in accordance with claim 4, wherein:

each of the unit from said multilevel halftoning unit and earlier are housed in a single casing as an image processing device;

each of the unit from said sequence value specifying unit and later are housed in a single casing as a printing device; and said image processing device and said printing device are connected, either with or without wires, so as to enable the communications of, at least, said multilevel halftoning resultant values.

7. An image processing device in accordance with claim 1, wherein, in said plurality of said correspondence relationships, classification numbers that specify correspondence relationships are assigned according to the positions in which said threshold values were extracted from said dithering matrix; and said sequence value specifying unit specifies said sequence value according to a correspondence relationship established by said classification number by discriminating said classification number of said correspondence relationship used in generating said multilevel halftoning resultant value of said group of pixels according to the position of said group of pixels within said image.

8. An image processing device for generating, and outputting to an image outputting device, control data that is used for said image outputting device, for forming dots to output images, to determine the form of said dots; comprising:

correspondence relationship preparation unit that prepares in advance, for each group of pixels, each comprising a plurality of pixels, a correspondence relationship between a representative tone value, which is a tone value that represents said group of pixels, and a multilevel halftoning resultant value that represents the results of performing multilevel halftoning on each individual pixel that structures said group of pixels, wherein each of a plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations;

representative tone value determining unit that splits said groups of pixels, sequentially extracted from said image, into a plurality of regions and, for each region, determining a representative tone value for representing the tone value of said region;

multilevel halftoning unit that uses said determined representative tone values for each region to obtain a multilevel halftoning resultant value, for each of said regions, through referencing said correspondence relationships assigned to said groups of pixels belonging to said regions; and control data output unit that outputs said obtained multilevel halftoning resultant values, as said control data, to said image outputting device.

9. An image processing device in accordance with claim 8, wherein:
  said representative tone value determining unit comprises:
    split determining unit that determines whether or not to split said group of pixels based on specific conditions; and
    unit that determines, as said representative tone value, a tone value that represents said group of pixels, instead of said representative tone value for each of said regions, when said split determining unit has determined that said group of pixels will not be split; wherein
    said multilevel halftoning unit outputs said multilevel halftoning resultant value for said group of pixels, instead for each of said regions, when said group of pixels will not be split.

10. An image processing device in accordance with claim 8, wherein said correspondence relationship preparing unit comprises:
  classification number assigning unit that assigns classification numbers to each of said groups of pixels by categorizing said groups of pixels into a plurality of categories according to the positions of said groups of pixels within said image; and
  unit that stores, as said correspondence relationship, a combination of said representative tone values and said classification numbers, with an association to said multilevel halftoning resultant values; wherein
  said multilevel halftoning unit references said correspondence relationships using said tone values and said classification numbers that have been specified by the position of said groups of pixels in said image.

11. An image processing device in accordance with claim 8, wherein said multilevel halftoning unit obtains, as said multilevel halftoning resultant values, data indicating the number of dots that are to be formed in said group of pixels through referencing said correspondence relationships based on said representative tone values.

12. An image processing device in accordance with claim 8, wherein said representative tone value determining unit splits said groups of pixels into a plurality of regions that each have identical sizes.

13. An image processing device in accordance with claim 8, wherein said representative tone value determining unit splits said groups of pixels into a plurality of regions that each have different sizes.

14. An image processing device in accordance with claim 8, comprising:
  split pattern storage unit that stores a plurality of split patterns for indicating the state in which said groups of pixels have been split; wherein
  said representative tone value determining unit splits said groups of pixels into a plurality of regions according to one pattern or a plurality of patterns selected from a plurality of said splitting patterns that have been stored, and determines said representative tone value for each of said regions; and
  said control data output unit outputs said selected splitting patterns along with said obtained multilevel halftoning resultant values.

15. An image processing device in accordance with claim 10, wherein said correspondence relationship preparing unit categorizes said groups of pixels into at least 100 types and assigns classification numbers, and prepares said correspondence relationships for each group of pixels to which said classification numbers have been assigned.

16. An image processing device in accordance with claim 10, wherein the arithmetic product of the number of types of groups of pixels for which said correspondence relationship preparing unit has prepared said correspondence relationships multiplied by the number of pixels included per group of pixels is at least 1,000.

17. A dot data processing device for converting image data, which expresses an image that is expressed in a specific number of tones, into data for dots to be formed on a medium through the use of groups of pixels, comprising a plurality of pixels, through receiving multilevel halftoning resultant values that are the results of performing multilevel halftoning; wherein
  said multilevel halftoning resultant values are generated through referencing, based on representative tone values of various regions wherein said groups of pixels are split into a plurality of regions, a single correspondence relationship selected from a plurality of correspondence relationships that have been prepared in advance regarding the multilevel halftoning resultant values that express the results of multilevel halftoning for each pixel that comprises said groups of pixels and the representative tone values that are tone values that represent said groups of pixels, wherein said plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations;
  said dot data processing device comprising:
  resultant value receiving unit that receives said multilevel halftoning resultant values for each of the plurality of regions into which said groups of pixels are divided for each of said groups of pixels;
  sequence value specifying unit that specifies sequence values, which are sequences of pixels for forming dots within said groups of pixels, according to correspondence relationships referenced when generating said multilevel halftoning resultant values for said groups of pixels; and
  dot data generating unit that generates dot data that indicates whether or not a dot will be formed for each pixel within each of said regions based on said specified sequence value for said group of pixels to which said region belongs and on said multilevel halftoning resultant values obtained for each of said regions.

18. A dot data processing device in accordance with claim 17, comprising:
  dot forming unit that forms dots on said medium; and
  image forming unit that forms said image on said medium by receiving said generated dot data and driving said dot forming unit in accordance with to said dot data.

19. A dot data processing device in accordance with claim 17 wherein:
  said resultant value receiving unit receives at least of said multilevel halftoning resultant values for each of said groups of pixels; and
  said dot data generating unit determines whether or not to form said dots for each of said groups of pixels based on said multilevel halftoning resultant values and said sequence values for a group of pixels that has received only one of said multilevel halftoning resultant values.

20. A dot data processing device in accordance with claim 17, wherein:
said resultant value receiving unit receives, as said multilevel halftoning resultant values, individual data indicating the number of dots to be formed in said group of pixels.

21. An image processing method for performing specific image processes on image data to output dot data for forming dots on a recording medium based on the results of said image processing, the method comprising:
preparing correspondence relationships in advance for each group of pixels between representative tone values, which are tone values for representing groups of pixels, comprising a plurality of pixels, and multilevel halftoning resultant values for expressing the results of multilevel halftoning for each pixel that comprises said group of pixels, wherein each of a plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations;
splitting said groups of pixels, extracted sequentially from said image, into a plurality of regions, and a representative tone value for representing a tone value for said region is determined for each of said regions;
using said representative tone value established for each of said regions to obtain a multilevel halftoning resultant value for each of said regions through referencing said correspondence relationship assigned to said group of pixels to which said region belongs;
specifying sequence values for indicating the sequence in which dots are formed in each pixel within said group of pixels according to the correspondence relationships referenced when extracting said multilevel halftoning resultant values;
generating dot data for indicating whether or not to form dots for each of the pixels within each of said regions based on said specified sequence values for said groups of pixels belonging to said regions and said multilevel halftoning resultant values obtained for each of said regions; and
outputting said dot data to an image outputting device for outputting an image by forming dots on a recording medium.

22. An image processing method for generating control data, to be used, by an image outputting device for outputting images by forming dots, when determining the formation of said dots, and outputting said control data to said image outputting device, the method comprising:
preparing correspondence relationships in advance for each group of pixels between representative tone values, which are tone values for representing groups of pixels, comprising a plurality of pixels, and multilevel halftoning resultant values for expressing the results of multilevel halftoning for each pixel that comprises said group of pixels wherein each of a plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations;
splitting said groups of pixels, extracted sequentially from said image, into a plurality of regions, and a representative tone value for representing a tone value for said region is determined for each of said regions;
using said representative tone value established for each of said regions to obtain a multilevel halftoning resultant value for each of said regions through referencing said correspondence relationship assigned to said group of pixels to which said region belongs; and
outputting said obtained multilevel halftoning resultant values to said image outputting device as said control data.

23. A dot data processing method for receiving multilevel halftoning resultant values, which are results of multilevel halftoning using groups of pixels, comprising a plurality of pixels, for image data for expressing images expressed in a specific number of tones and converting into dot data to be formed on a medium, the method comprising:
generating said multilevel halftoning resultant values through referencing, based on representative tone values of various regions wherein said groups of pixels are split into a plurality of regions, a single correspondence relationship selected from a plurality of correspondence relationships that have been prepared in advance regarding the multilevel halftoning resultant values that express the results of multilevel halftoning for each pixel that comprises said groups of pixels and the representative tone values that are tone values that represent said groups of pixels, wherein said plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations;
receiving said multilevel halftoning resultant values for each individual region of the plurality of regions for splitting said groups of pixels for each of said groups of pixels;
specifying the sequence values for indicating the sequence of pixels for forming dots within said groups of pixels according to correspondence relationships referenced when generating multilevel halftoning resultant values for said groups of pixels; and
generating dot data for indicating whether or not to form dots for the individual pixels in each of said regions based on said multilevel halftoning resultant values obtained for each of said regions and on said specified sequence values for said groups of pixels in said regions;
wherein each operation of the dot data processing method is executed by an integrated circuit.

24. A program for executing specific image processing on image data for performing, on a computer, processes that output dot data for forming dots on a recording medium based on the results of said image processing, comprising:

program code and a storage medium that stores said program code, wherein
said program code includes:
a first program code for preparing, in advance and for each group of pixels, a correspondence relationship between representative tone values, which are tone values for representing groups of pixels comprising a plurality of pixels and multilevel halftoning resultant values for expressing the results of multilevel halftoning for each pixel comprising said group of pixels, wherein each of a plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations;
a second program code for splitting said group of pixels, extracted sequentially from said image, and determining, for each of said regions, representative tone values for representing the tone values of said regions;
a third program code for obtaining multilevel halftoning resultant values for each of said regions through using said determined representative tone values for each of said regions to reference said correspondence relationships assigned to said groups of pixels in said regions;
a fourth program code for specifying sequence values for indicating sequences in which dots are formed for each pixel in said group of pixels according to a correspondence relationship referenced when obtaining said multilevel halftoning resultant values;
a fifth program code for generating dot data indicating whether or not to form dots for the individual pixels within each of said regions based on said determined sequence values for said groups of pixels in said regions and based on said multilevel halftoning resultant values obtained for each of said regions; and
a sixth program code for outputting said dot data,
each of the first, second, third, fourth, fifth, and sixth program codes being stored readably in said computer.

25. A program product for executing, on a computer, processes for forming control data for use in determining dot formation by an image outputting device for outputting images by forming dots, and for outputting said control data to said image outputting device, comprising
program code and a storage medium for storing said program code, wherein
correspondence relationships between representative tone values, which are tone values for representing groups of pixels, comprising a plurality of pixels, and multilevel halftoning resultant values, which express the results of said multilevel halftoning for each pixel comprising said groups of pixels, are stored as data for each of said groups of pixels, wherein each of a plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations, wherein
said program code includes:
a first program code for splitting said group of pixels, extracted sequentially from said image, and determining, for each of said regions, representative tone values for representing the tone values of said regions;
a second program code for obtaining multilevel halftoning resultant values for each of said regions through using said determined representative tone values for each of said regions to reference said correspondence relationships assigned to said groups of pixels in said regions; and
a third program code for outputting to said image outputting device said obtained multilevel halftoning resultant values as said control data,
each of the first, second, and third program codes being stored readably in said computer.

26. A program product for receiving multilevel halftoning resultant values, which are results of multilevel halftoning using groups of pixels, comprising a plurality of pixels, for image data that expresses an image expressed in a specific number of tones, to perform, using a computer, processes to convert said multilevel halftoning resultant values into data for dots to be formed on a medium, comprising
program code and a storage medium for storing said program code, wherein
said multilevel halftoning resultant values are generated through referencing, based on representative tone values of various regions wherein said groups of pixels are split into a plurality of regions, a single correspondence relationship selected from a plurality of correspondence relationships that have been prepared in advance regarding the multilevel halftoning resultant values that express the results of multilevel halftoning for each pixel that comprises said groups of pixels and the representative tone values that are tone values that represent said groups of pixels, wherein said plurality of correspondence relationships is defined as groups of threshold values that group together a number of threshold values equal to the number of pixels included in said group of pixels, and said plurality of correspondence relationships is prepared comprising threshold values with different values from a plurality of individual threshold values selected from a global dithering matrix having included therein a number of threshold values that is larger than a number of tones in an image, laid out following specific characteristics, while varying the order of the extraction locations; wherein
said program code includes:
a first program code for receiving said multilevel halftoning resultant values for each individual region of the plurality of regions for splitting said groups of pixels for each of said groups of pixels;
a second program code for specifying the sequence values for indicating the sequence of pixels for forming dots within said groups of pixels, according to correspondence relationships referenced when generating multilevel halftoning resultant values for said groups of pixels; and
a third program code for generating dot data for indicating whether or not to form dots for the individual pixels in each of said regions, based on said multilevel halftoning resultant values obtained for each of said regions and on said specified sequence values for said groups of pixels in said regions,
each of the first, second, and third program codes being stored readably in said computer.

* * * * *